June 3, 1930.  F. L. FULLER  1,761,718
CASH REGISTER
Filed May 23, 1919   27 Sheets-Sheet 1
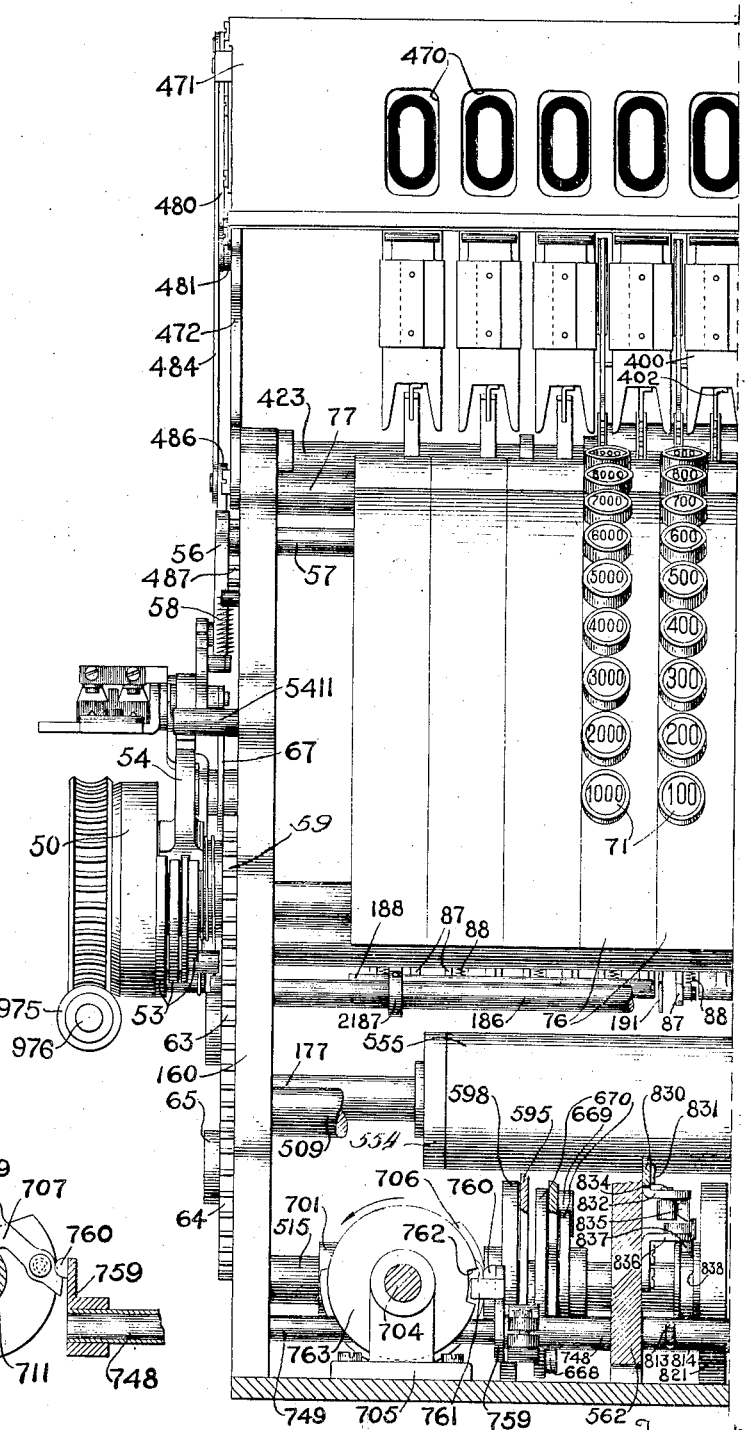
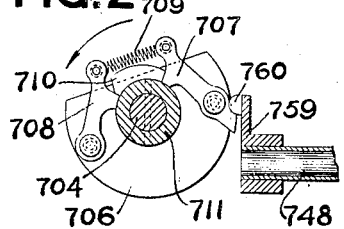
FIG. 2
FIG. 1A
Inventor
FREDERICK L. FULLER
Carl Benst
Henry E. Stauffer
Attorneys June 3, 1930. F. L. FULLER 1,761,718
CASH REGISTER.
Filed May 23, 1919 27 Sheets-Sheet 3
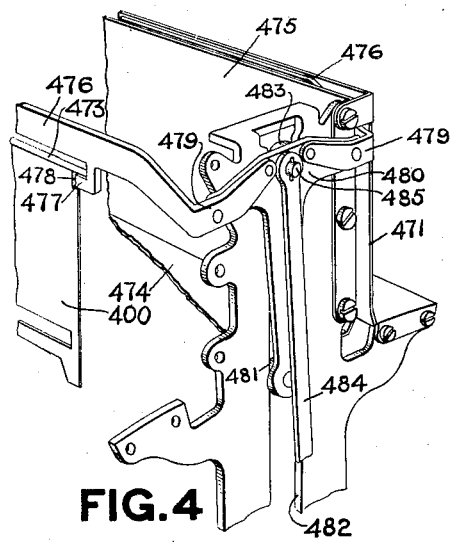
FIG.4
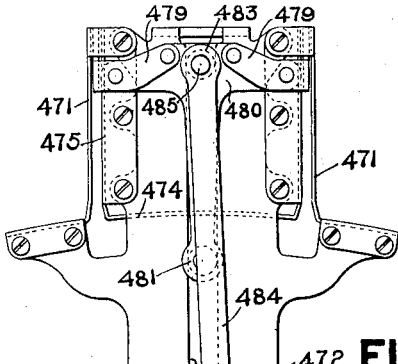
FIG.3
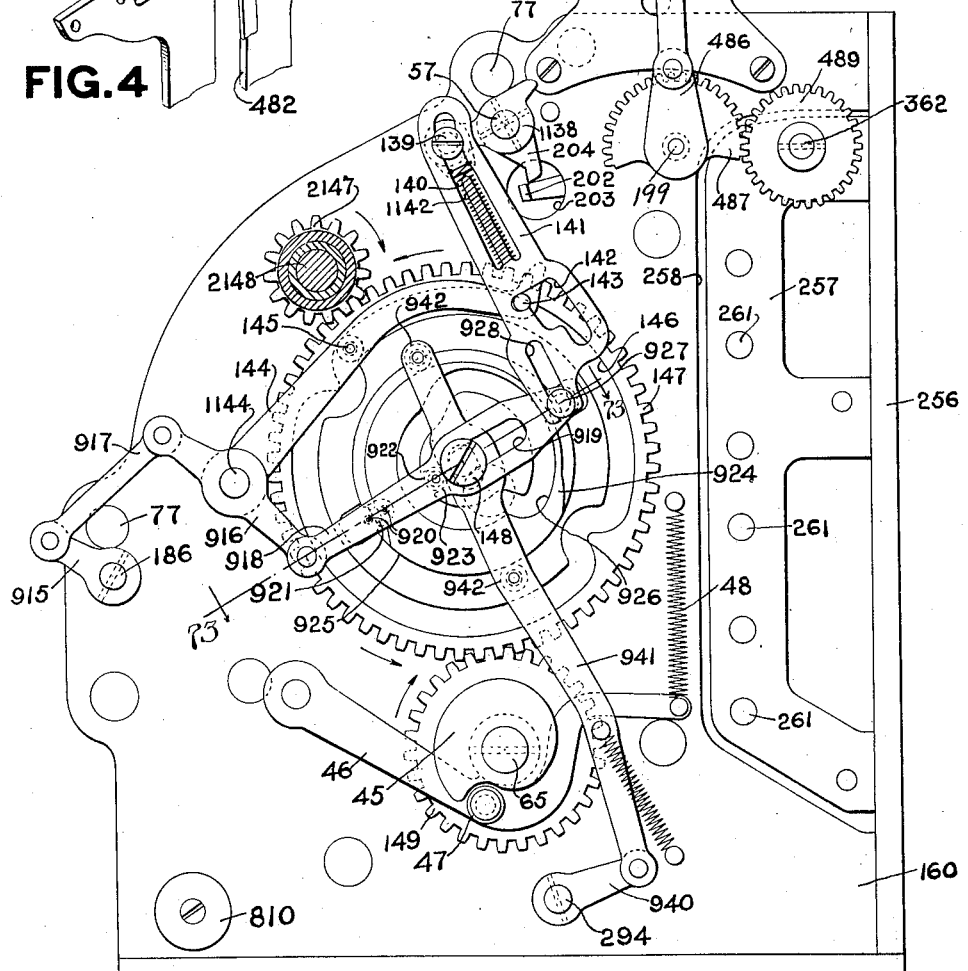
Inventor
FREDERICK L. FULLER
Attorneys.

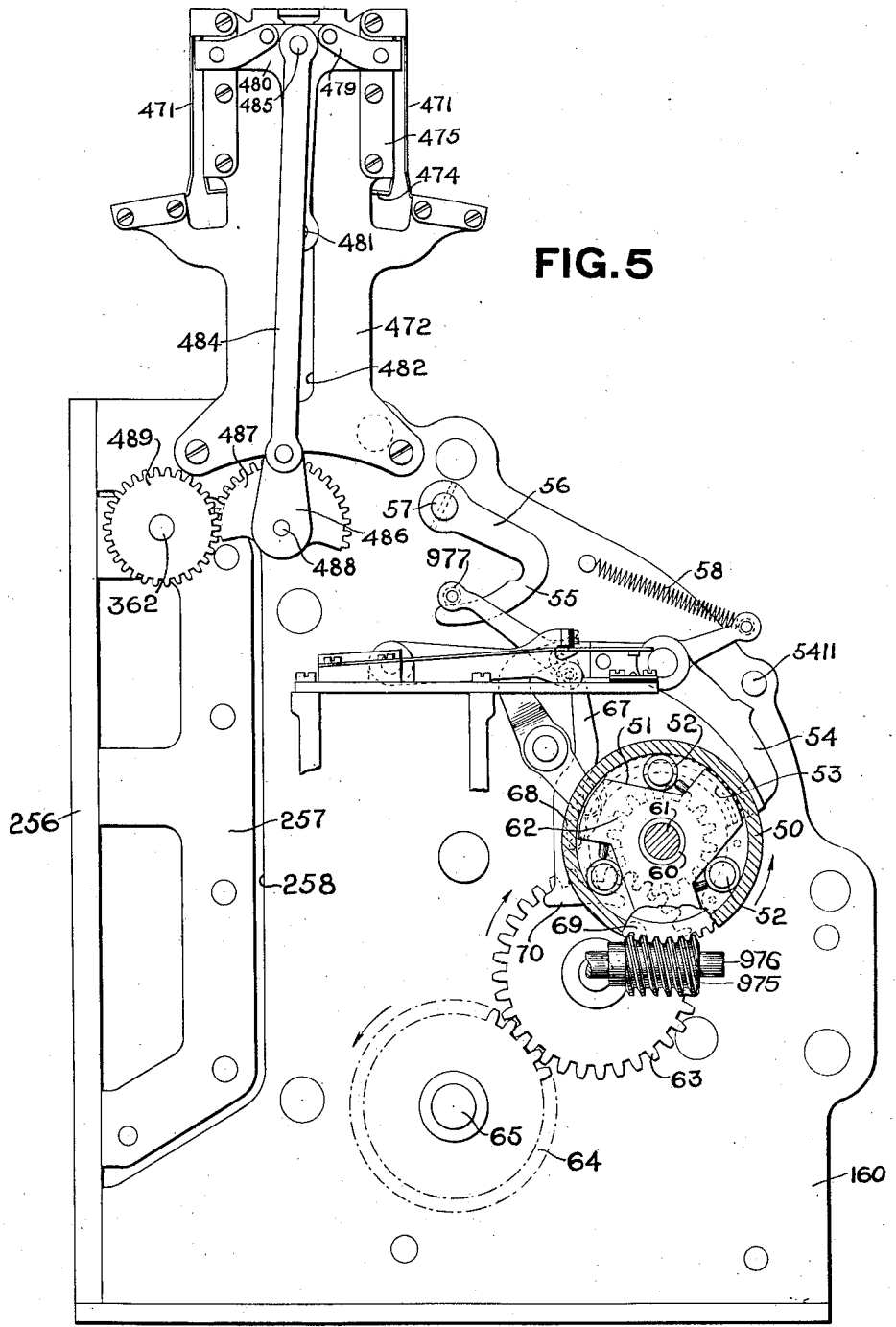

June 3, 1930.    F. L. FULLER    1,761,718
CASH REGISTER
Filed May 23, 1919    27 Sheets-Sheet 5

Inventor
FREDERICK L. FULLER
Attorneys.

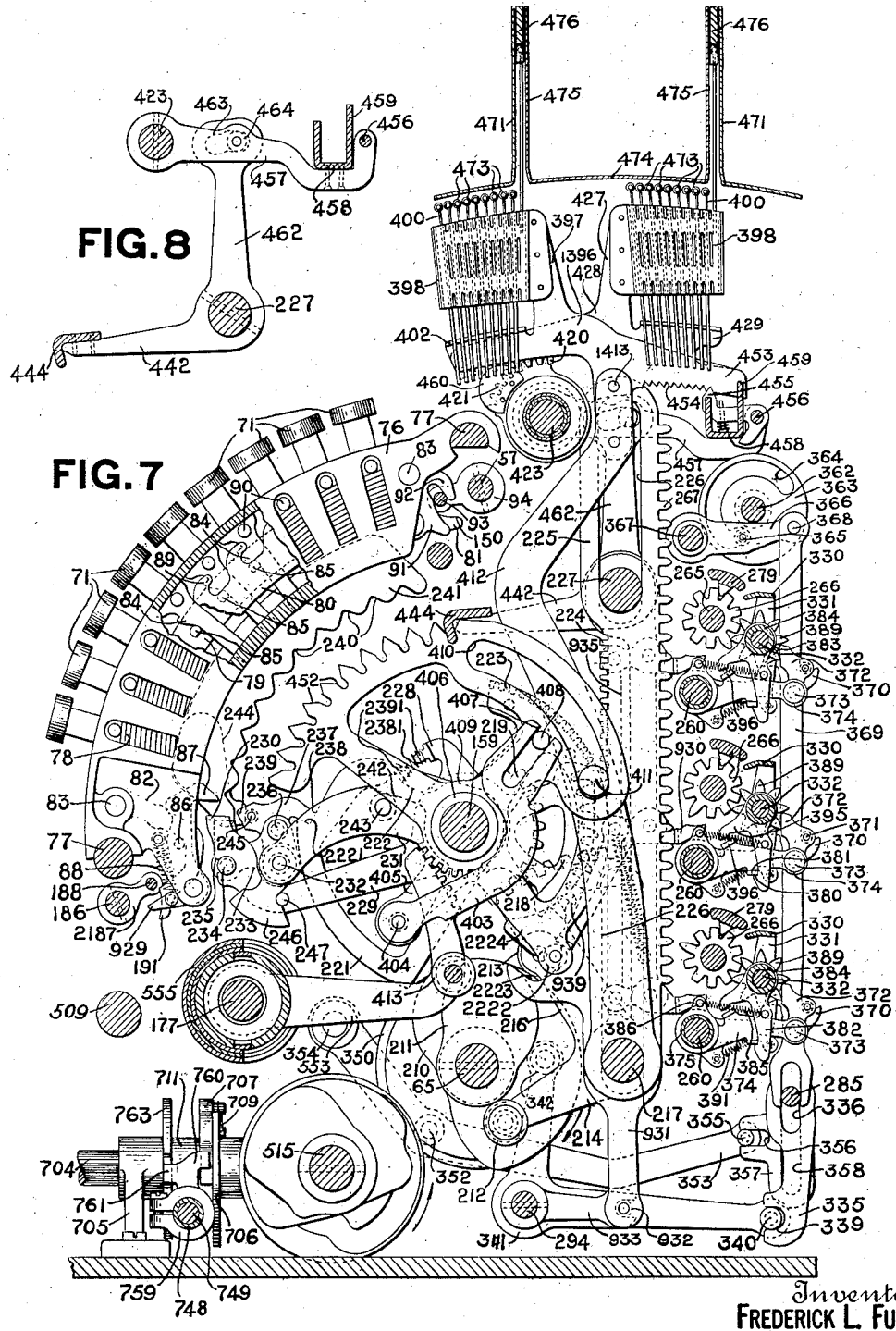

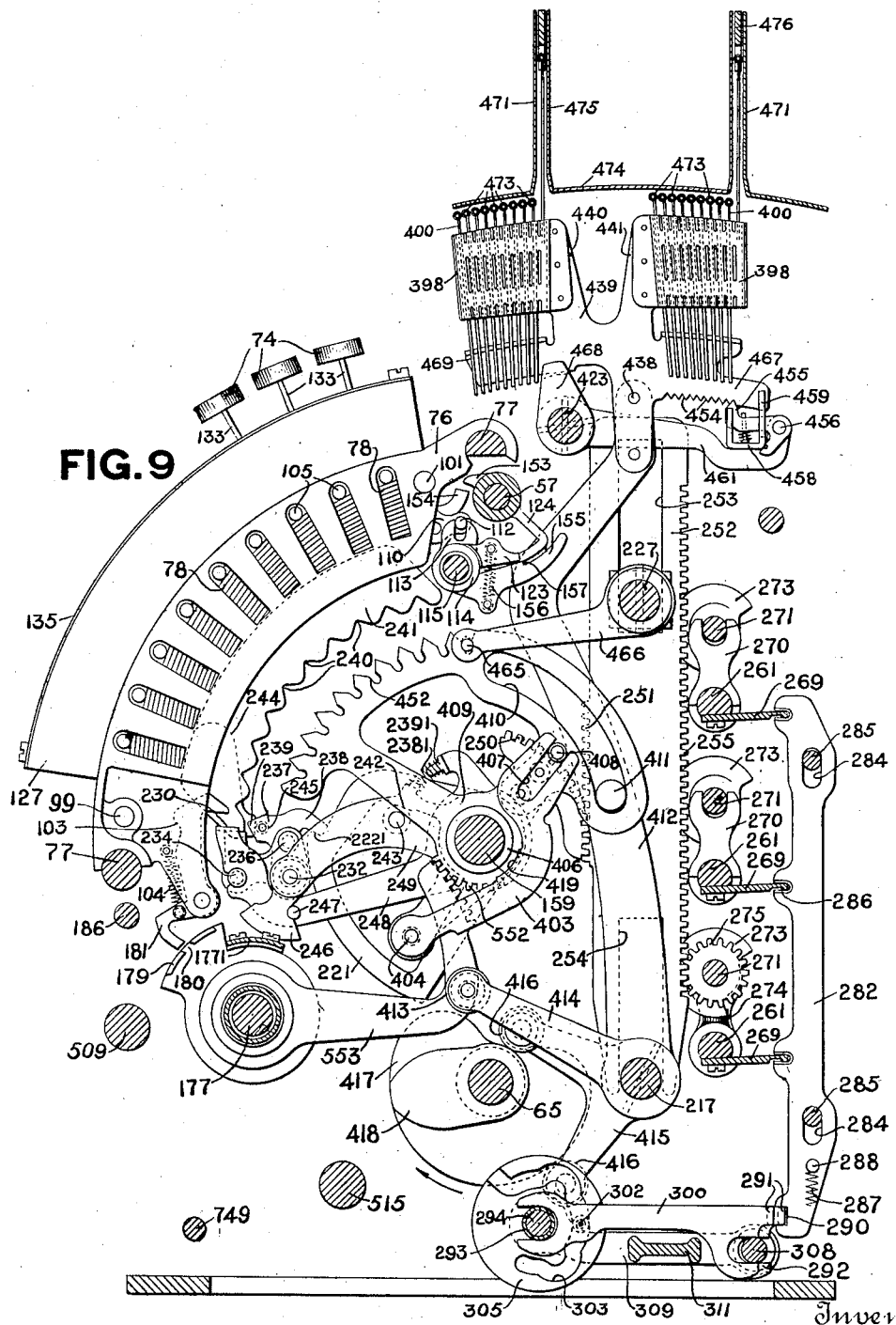

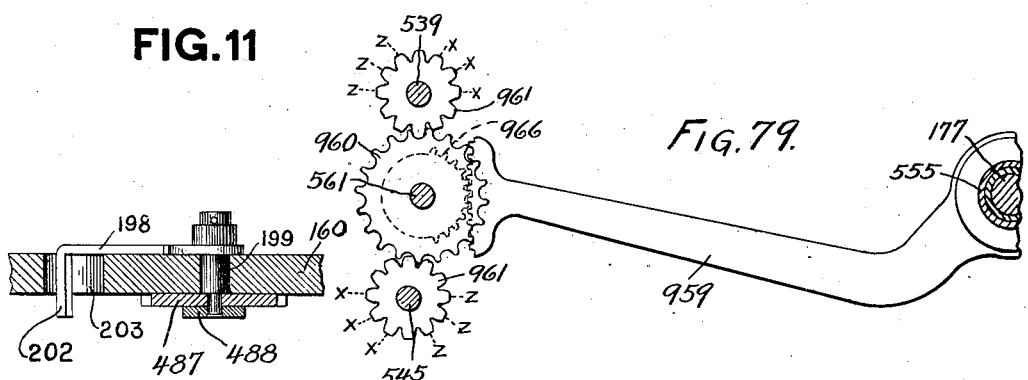
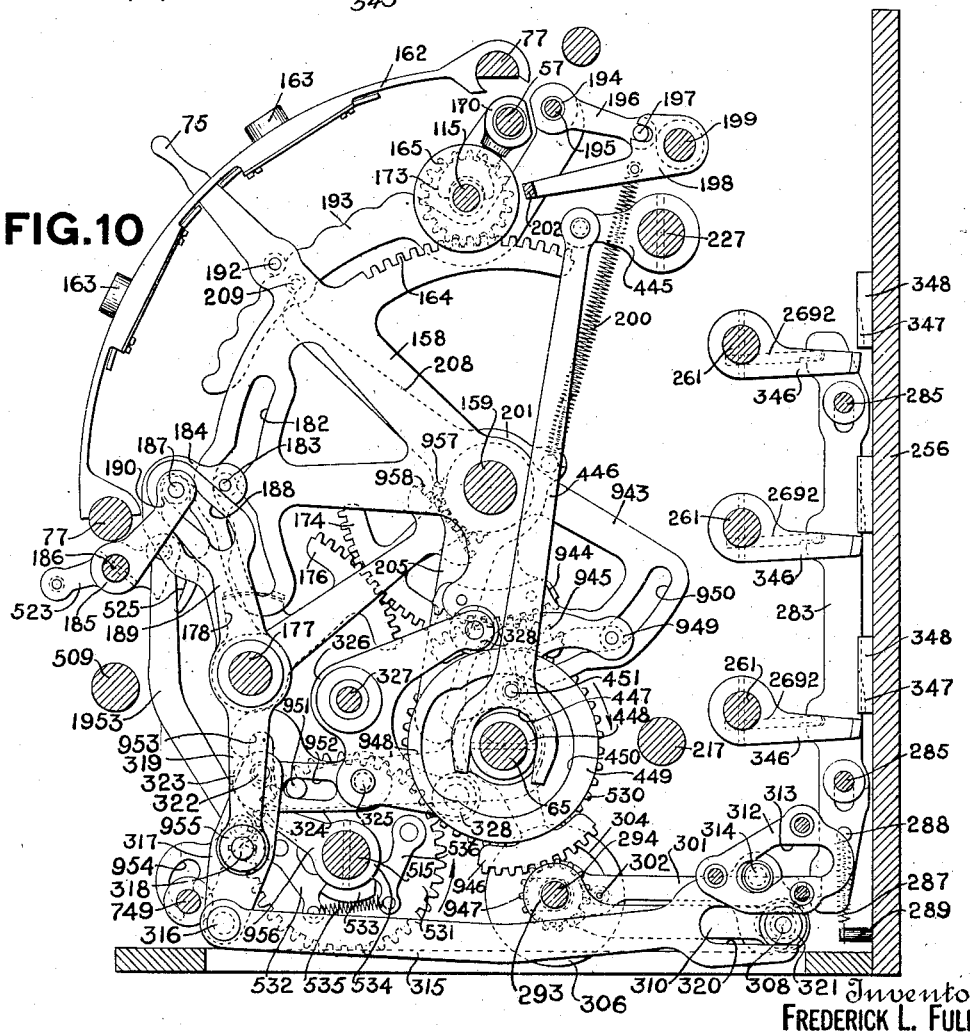

June 3, 1930.  F. L. FULLER  1,761,718
CASH REGISTER
Filed May 23, 1919   27 Sheets-Sheet 9
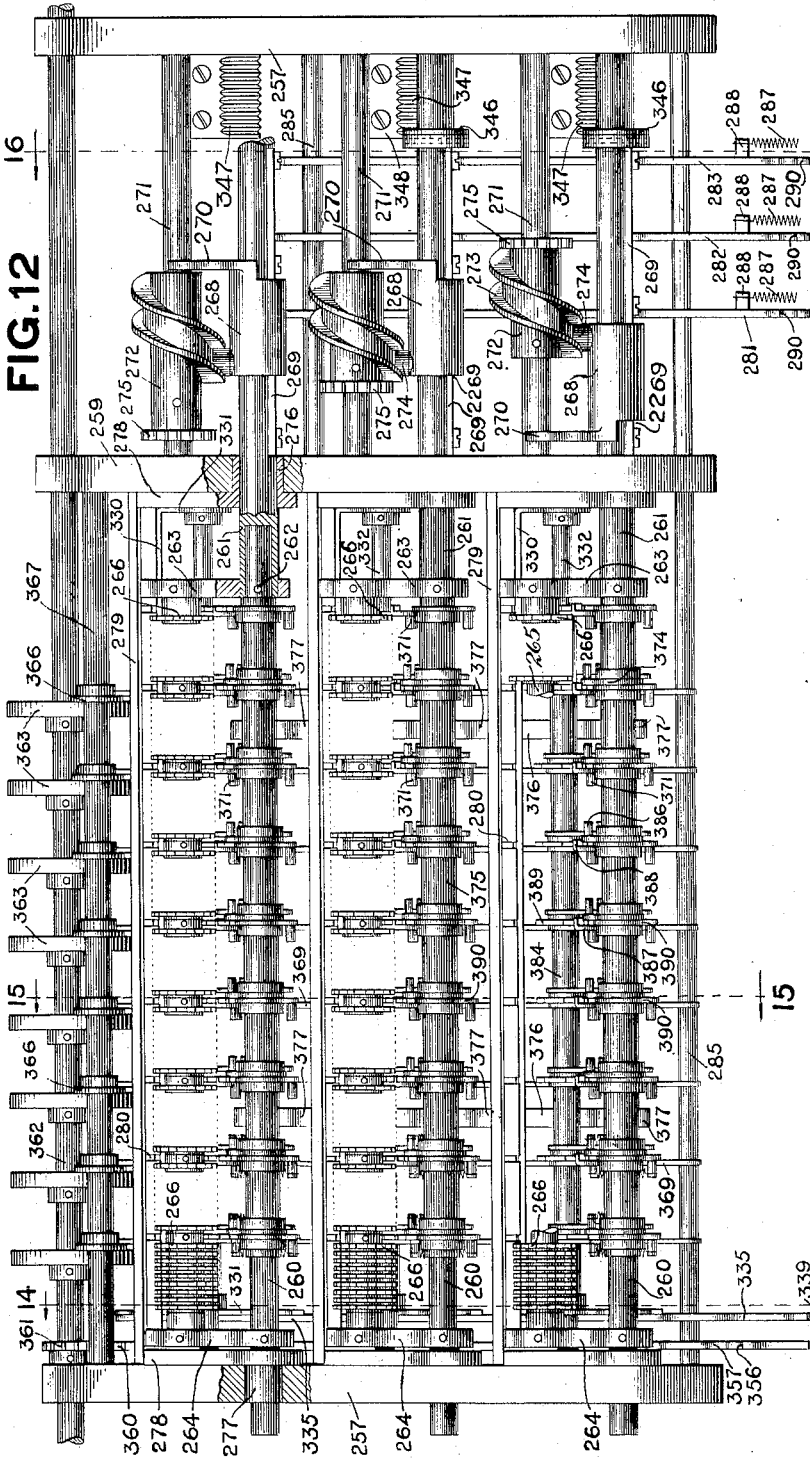
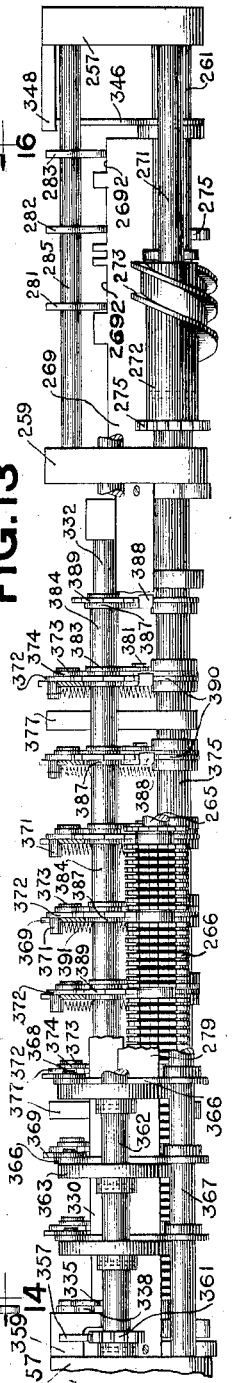
Inventor
FREDERICK L. FULLER
Attorneys.

June 3, 1930.　　　　F. L. FULLER　　　　1,761,718
CASH REGISTER
Filed May 23, 1919　　　27 Sheets-Sheet 10
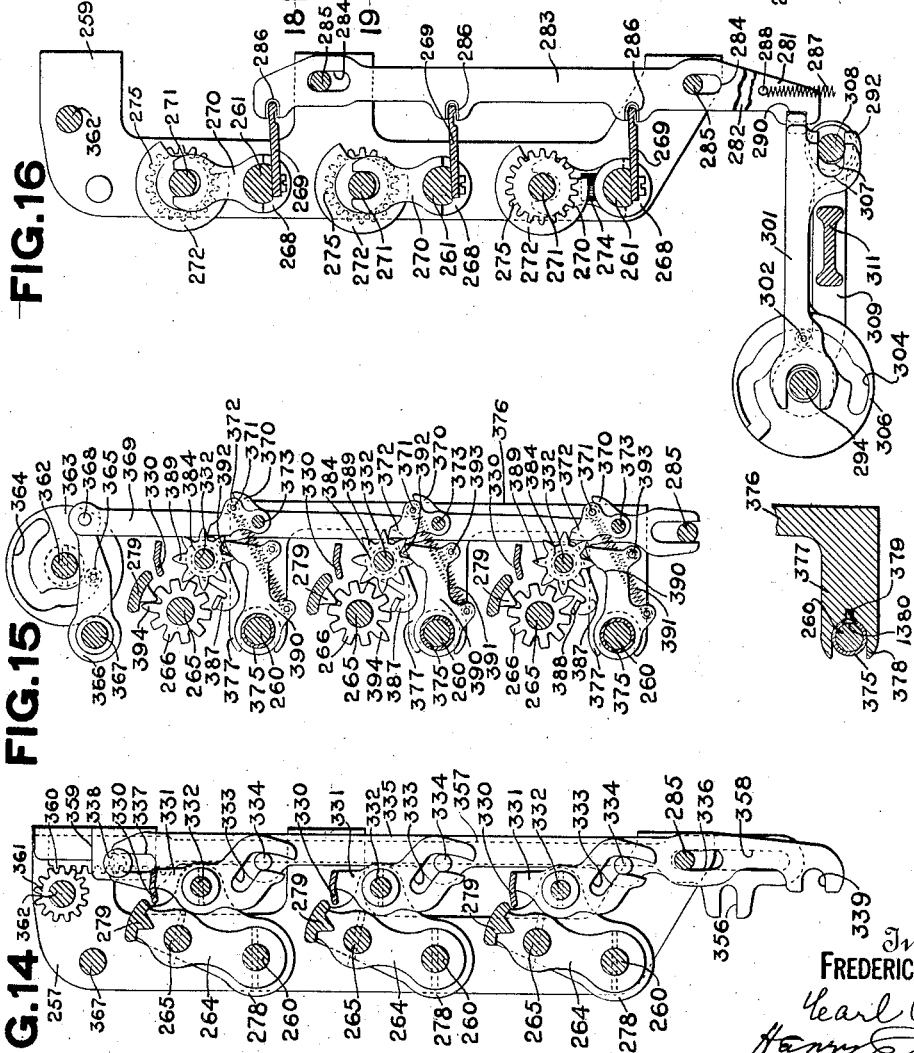
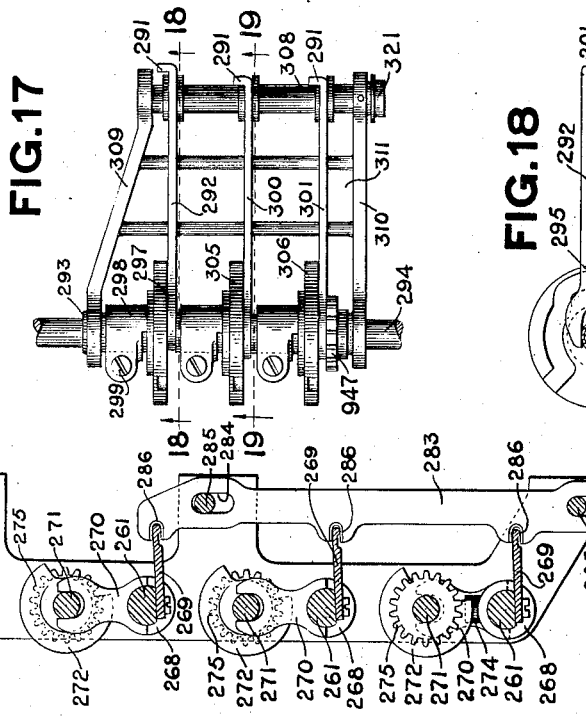
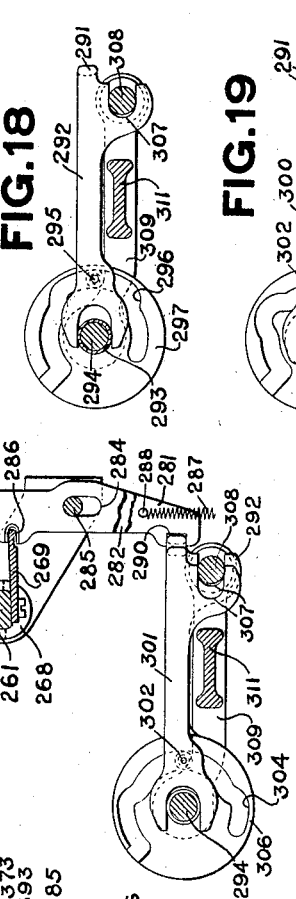
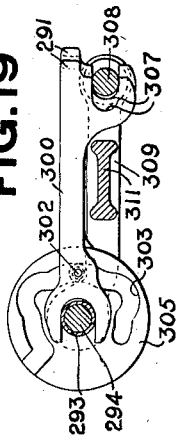

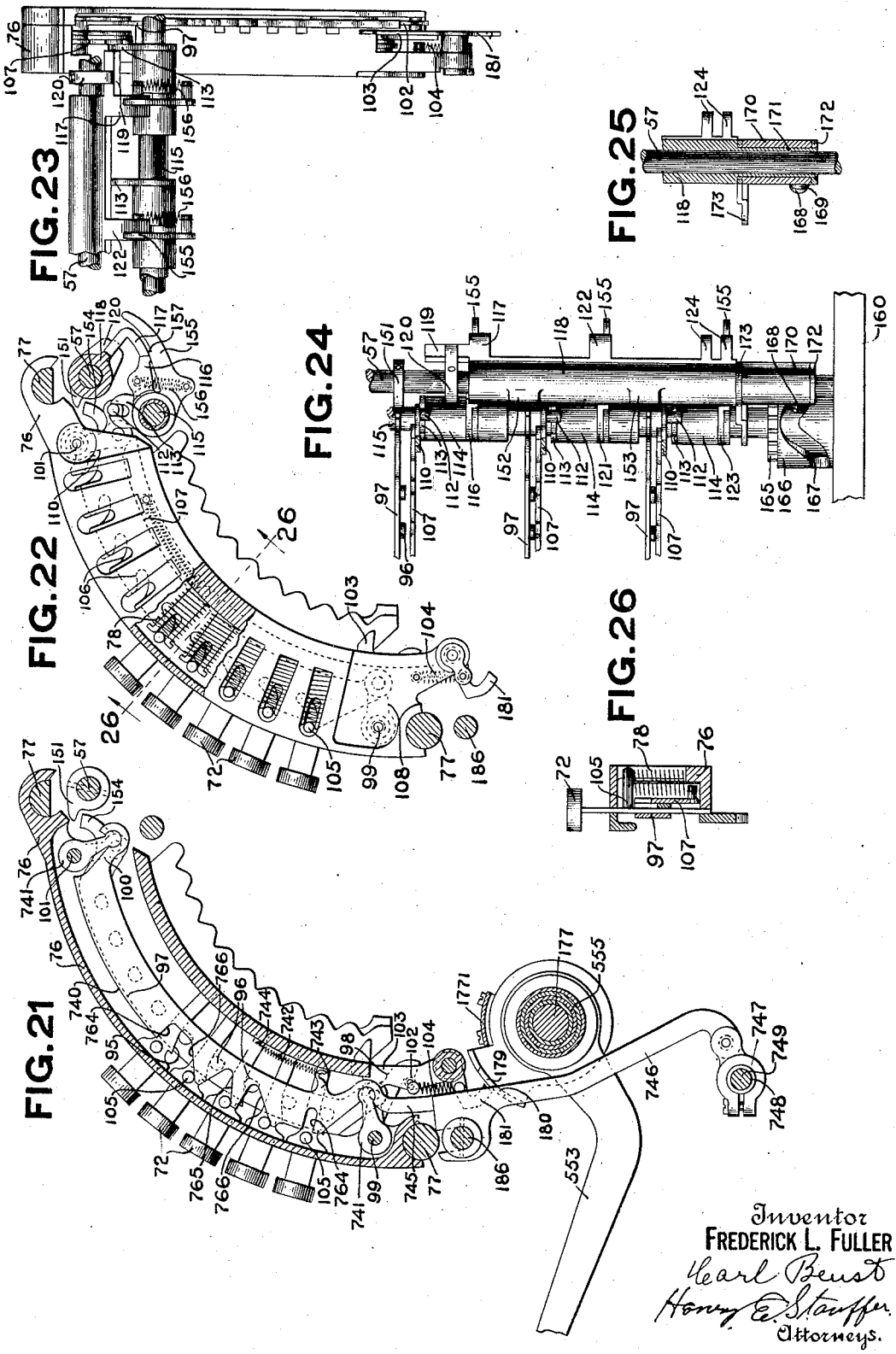

June 3, 1930. F. L. FULLER 1,761,718
CASH REGISTER
Filed May 23, 1919 27 Sheets-Sheet 12
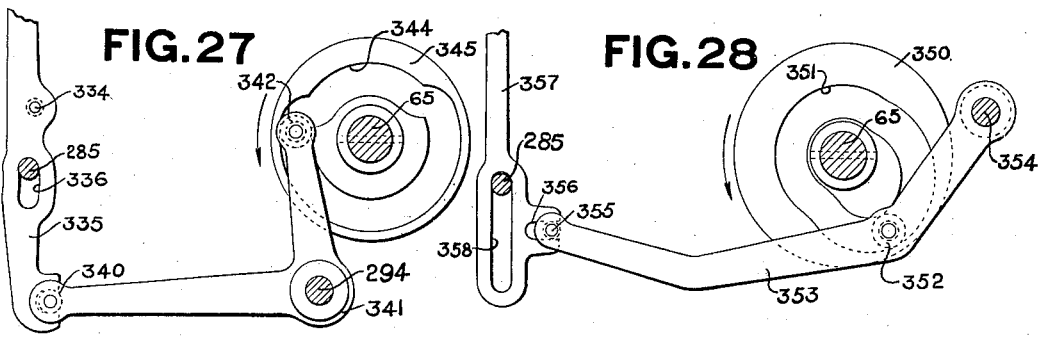
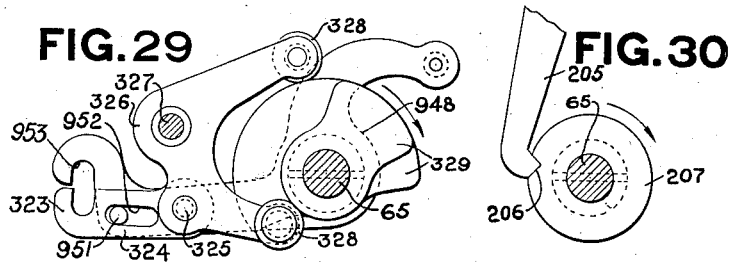
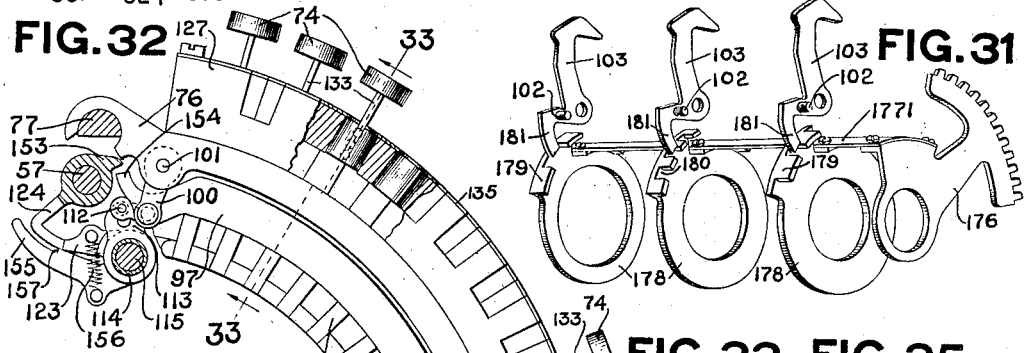
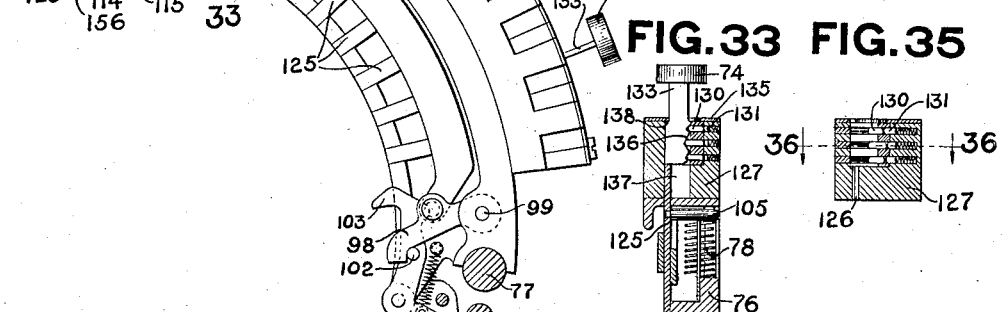
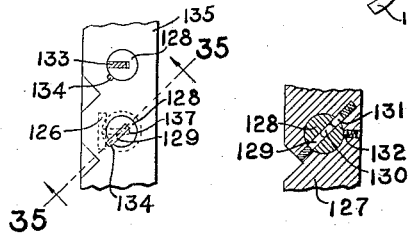
Inventor
FREDERICK L. FULLER
Earl Beust
Henry E. Stauffer
Attorneys

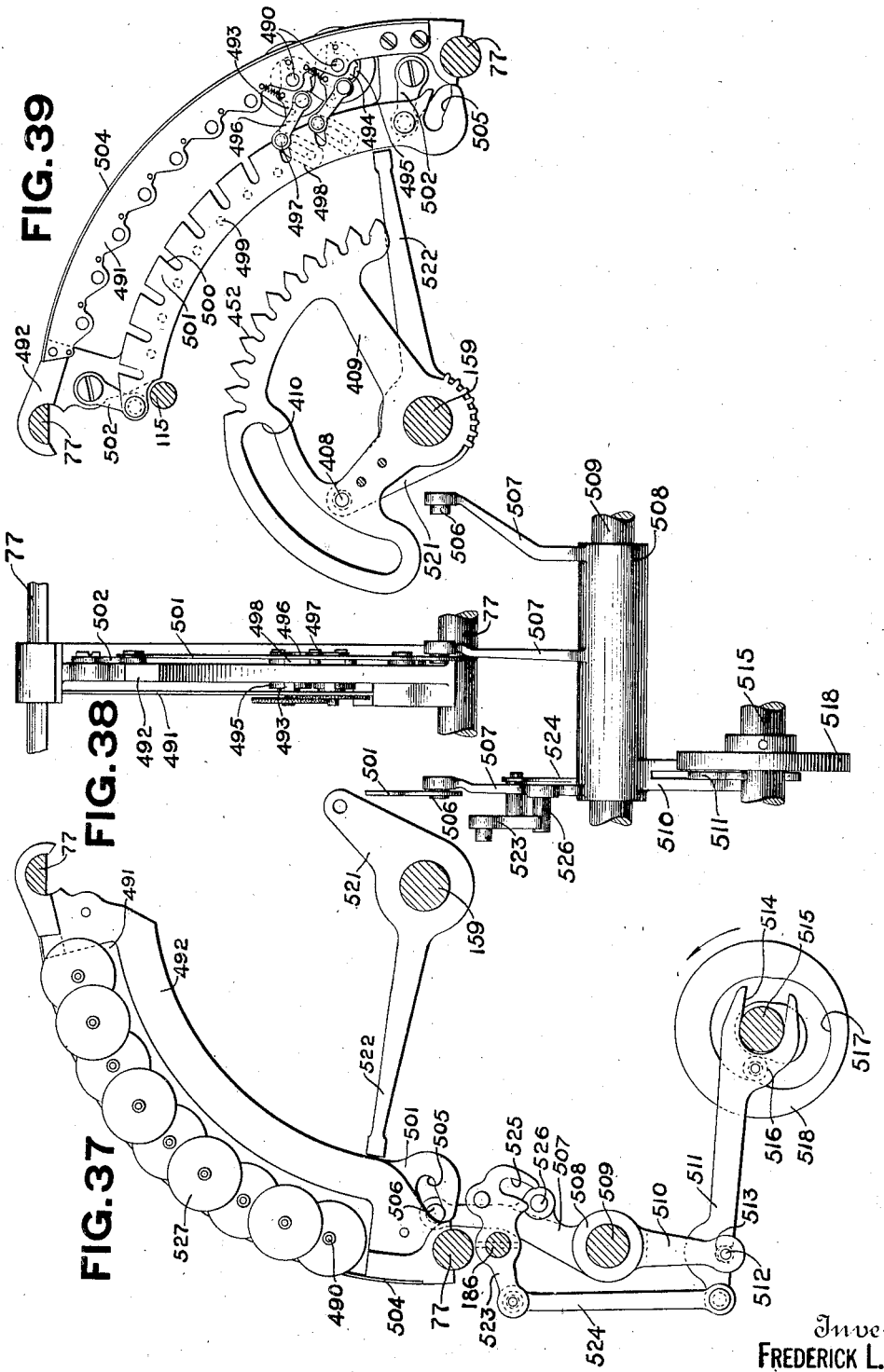

June 3, 1930.     F. L. FULLER     1,761,718
CASH REGISTER
Filed May 23, 1919     27 Sheets-Sheet 14
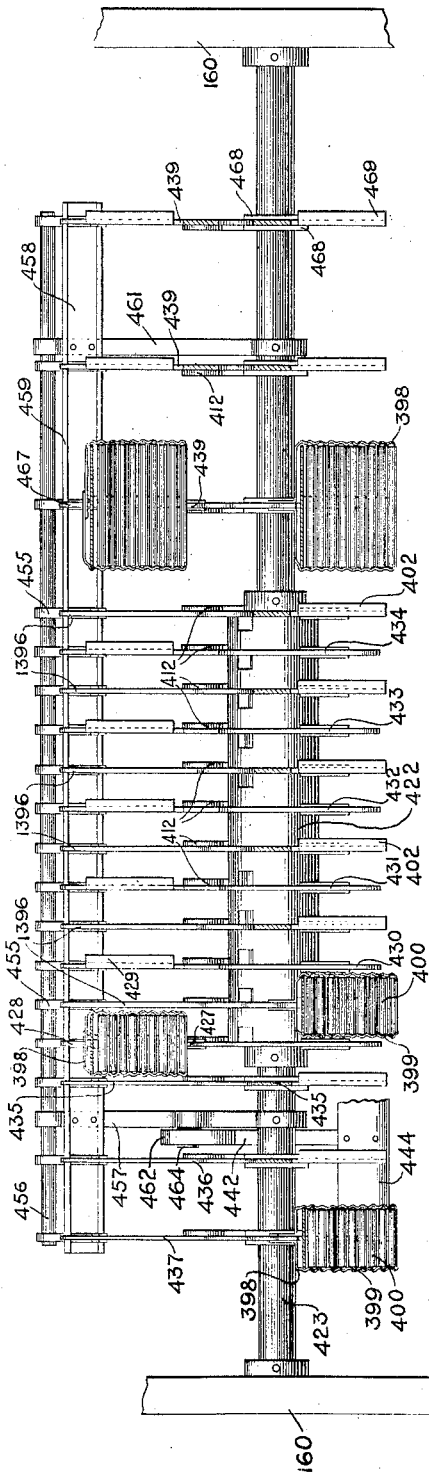
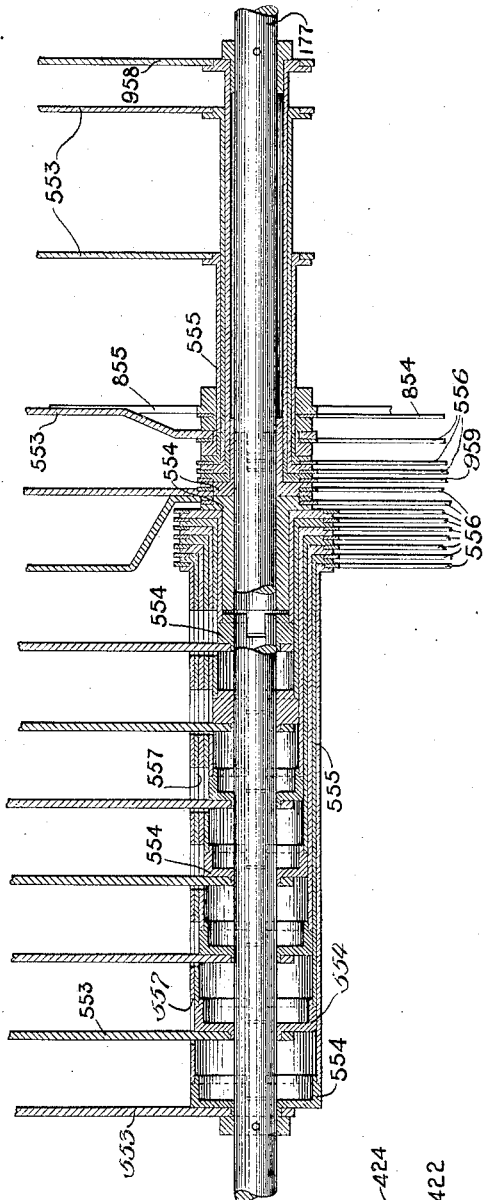
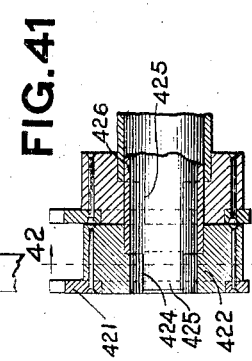
Inventor
FREDERICK L. FULLER
Attorneys.

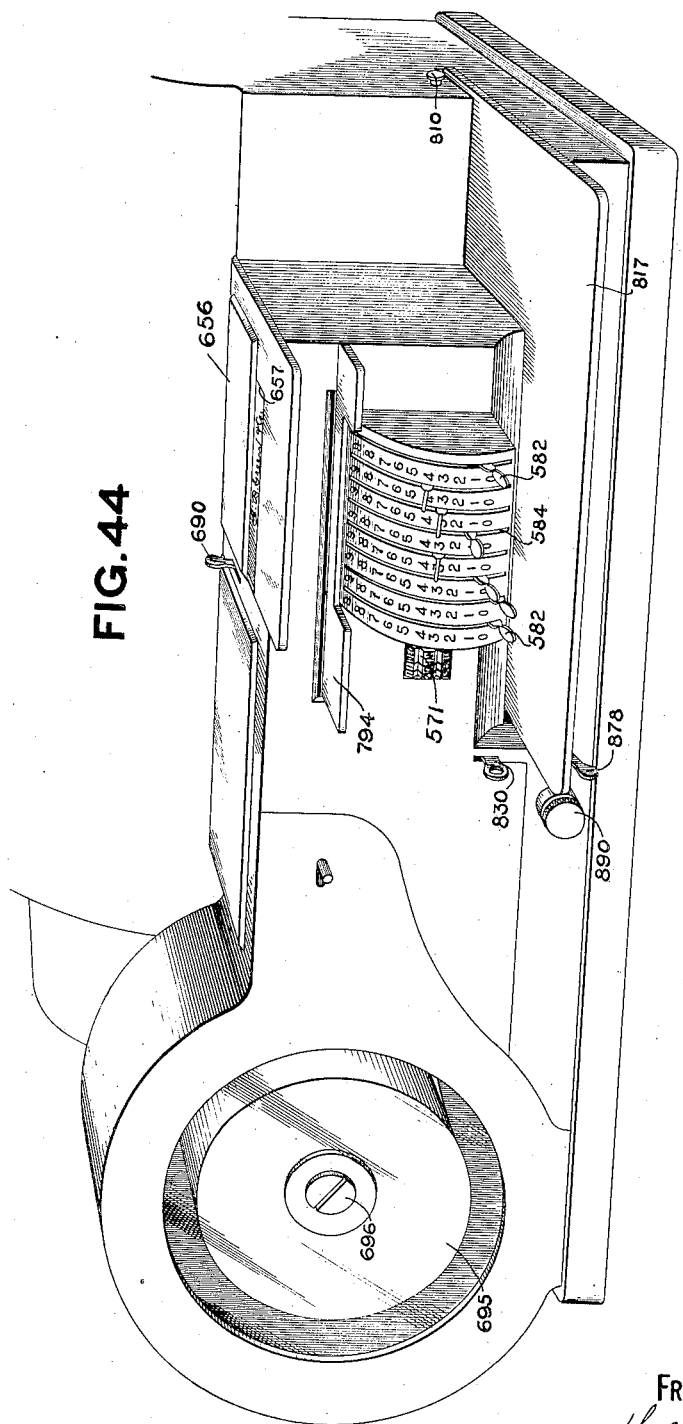

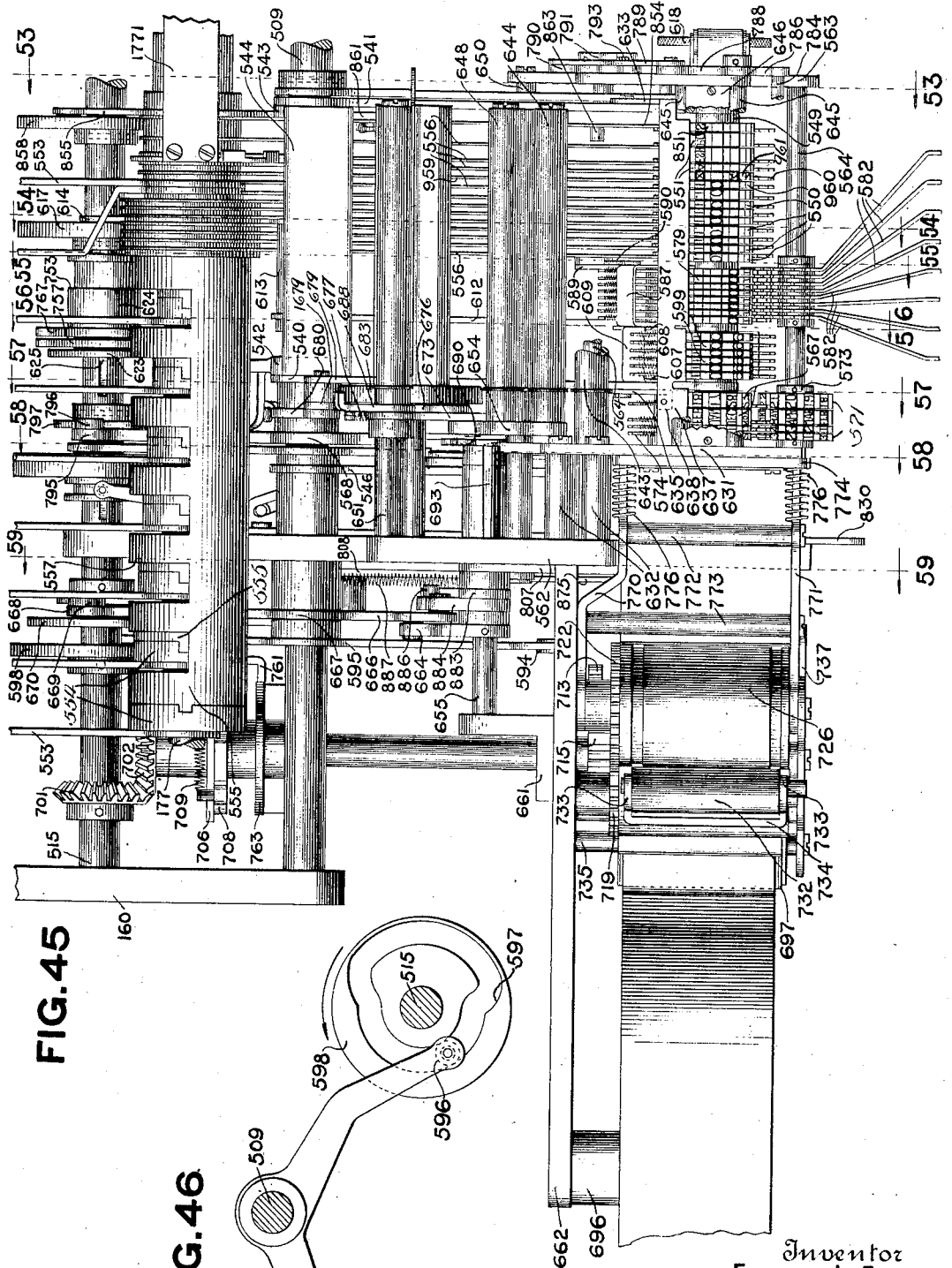

June 3, 1930.  F. L. FULLER  1,761,718
CASH REGISTER
Filed May 23, 1919  27 Sheets-Sheet 17
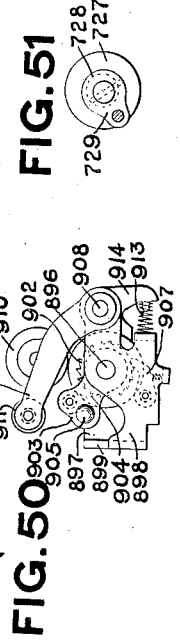
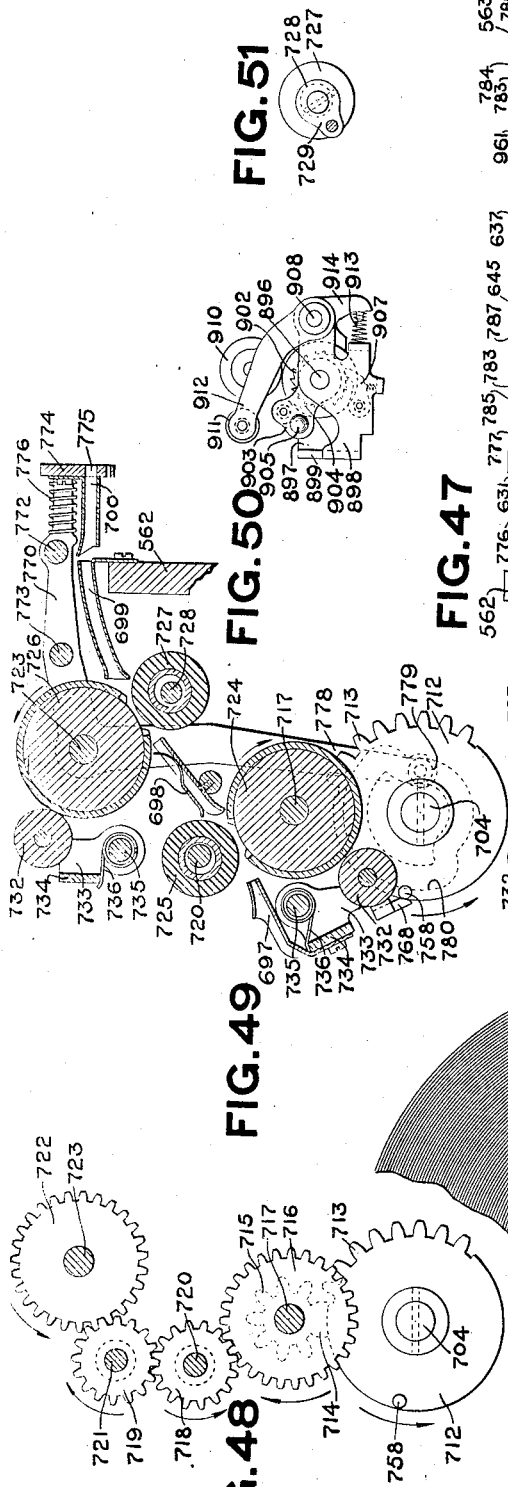
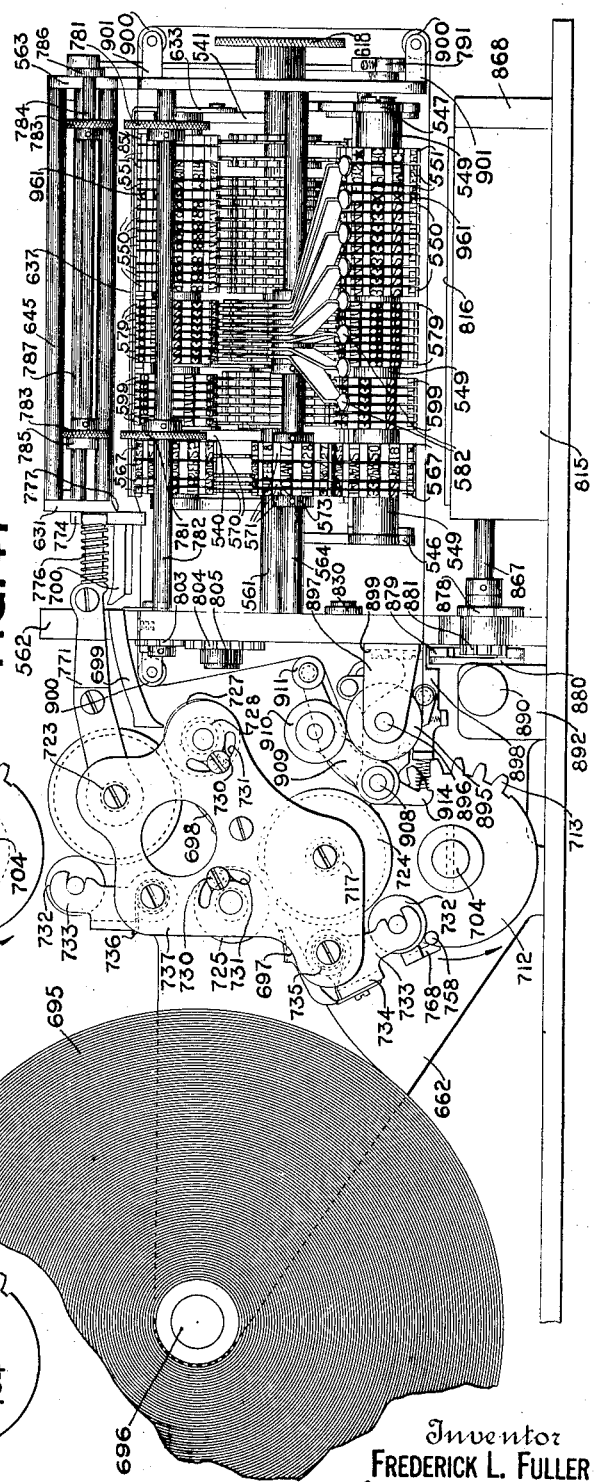
Inventor
FREDERICK L. FULLER
Attorneys.

June 3, 1930.　　　　F. L. FULLER　　　　1,761,718
CASH REGISTER
Filed May 23, 1919　　　27 Sheets-Sheet 18

Inventor
FREDERICK L. FULLER
Carl Beust
Henry E. Stauffer
Attorney

June 3, 1930.　　　F. L. FULLER　　　1,761,718
CASH REGISTER
Filed May 23, 1919　　　27 Sheets-Sheet 19

Inventor
FREDERICK L. FULLER
Carl Beust
Henry E. Stauffer
Attorneys

June 3, 1930.  F. L. FULLER  1,761,718
CASH REGISTER
Filed May 23, 1919  27 Sheets-Sheet 20

Inventor
FREDERICK L. FULLER
Carl Beust
Henry E. Stauffer
Attorneys

June 3, 1930.  F. L. FULLER  1,761,718
CASH REGISTER
Filed May 23, 1919   27 Sheets-Sheet 21

Inventor
FREDERICK L. FULLER
Attorneys

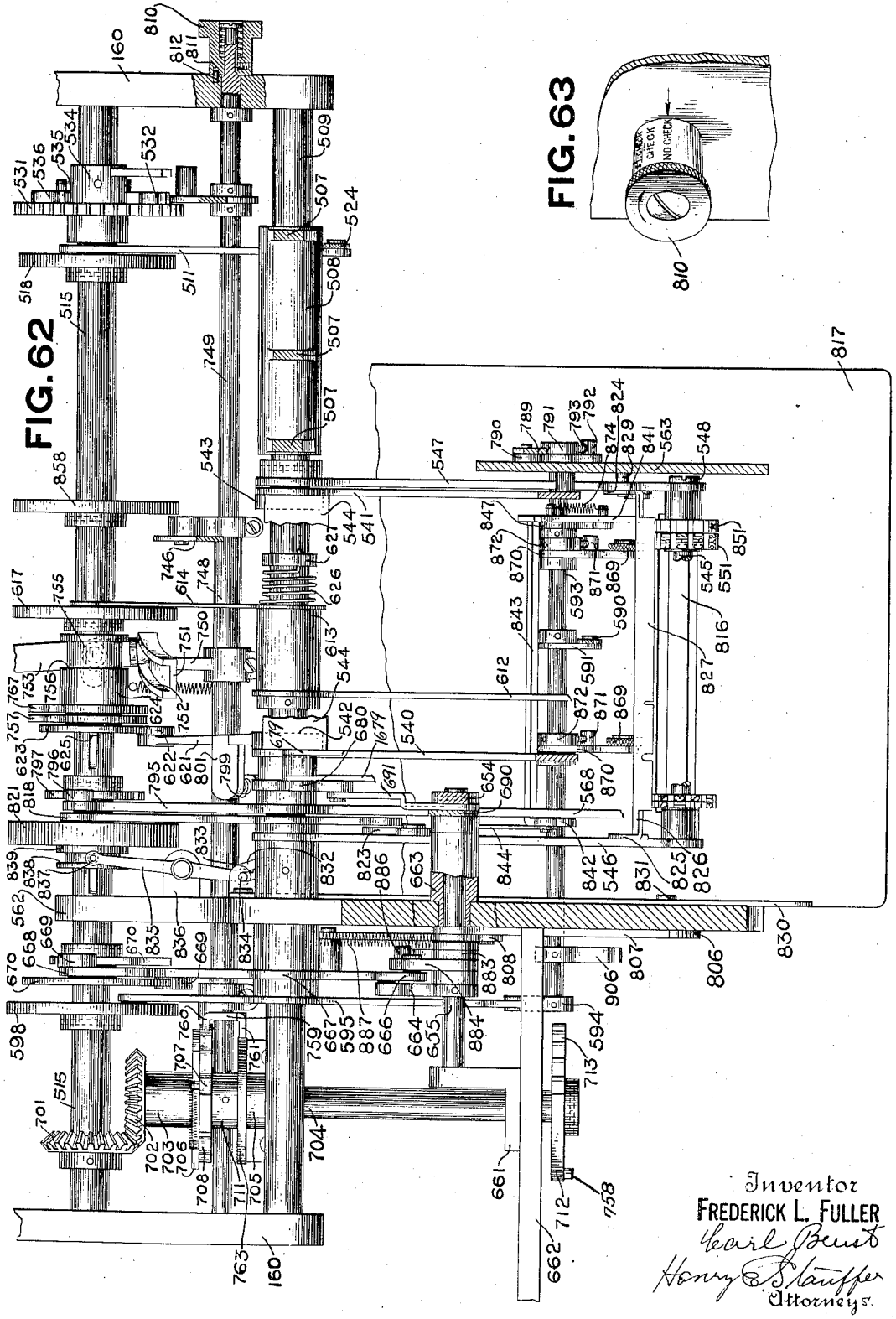

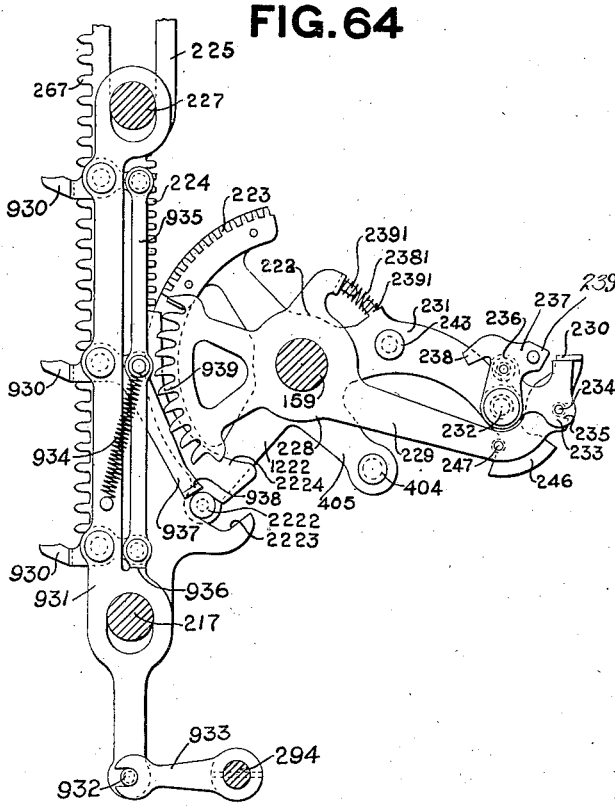

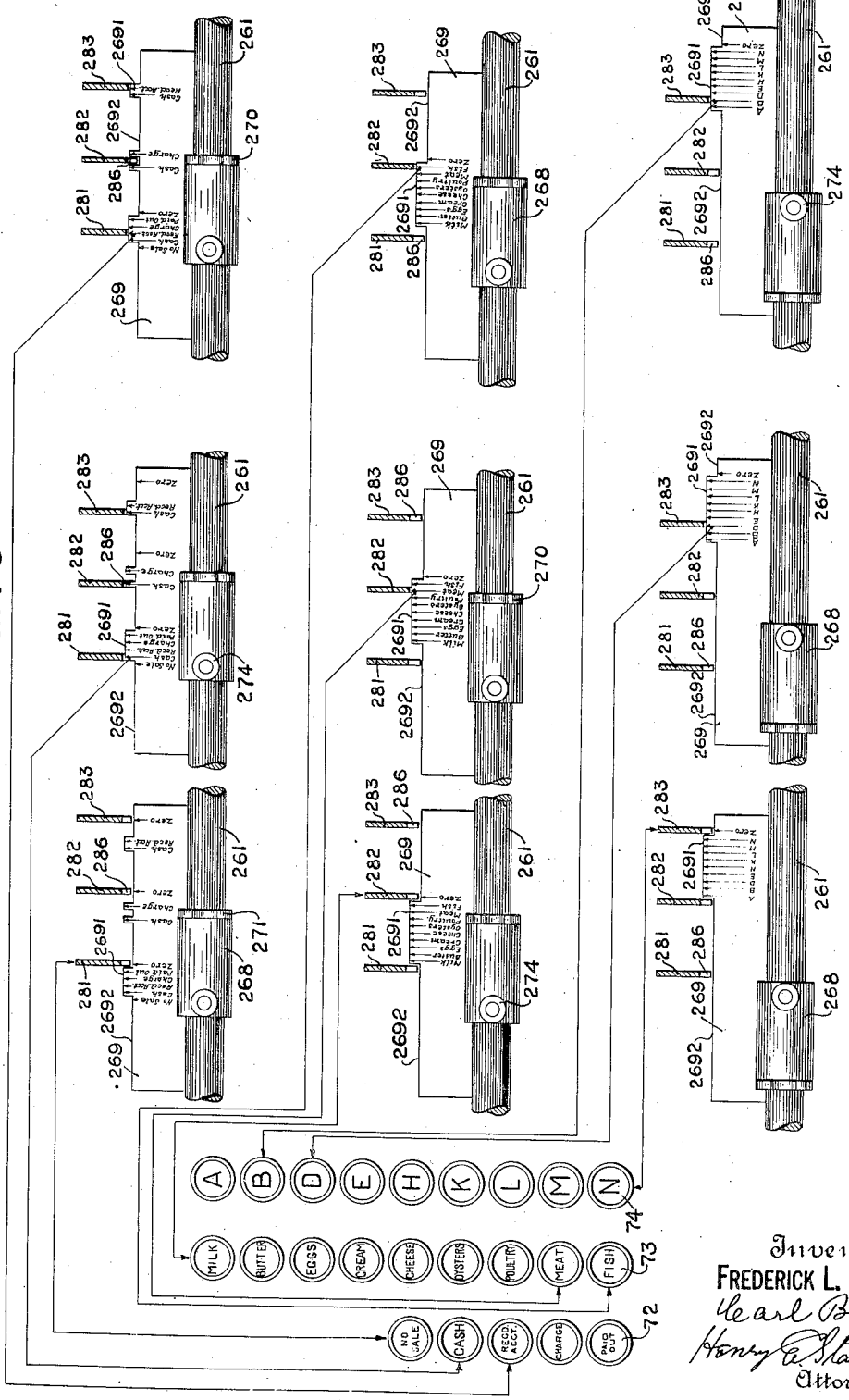

June 3, 1930.   F. L. FULLER   1,761,718
CASH REGISTER
Filed May 23, 1919   27 Sheets-Sheet 25

Inventor
FREDERICK L. FULLER
by Earl Beust
Henry E. Stauffer
Attorneys

June 3, 1930.    F. L. FULLER    1,761,718
CASH REGISTER
Filed May 23, 1919    27 Sheets-Sheet 26
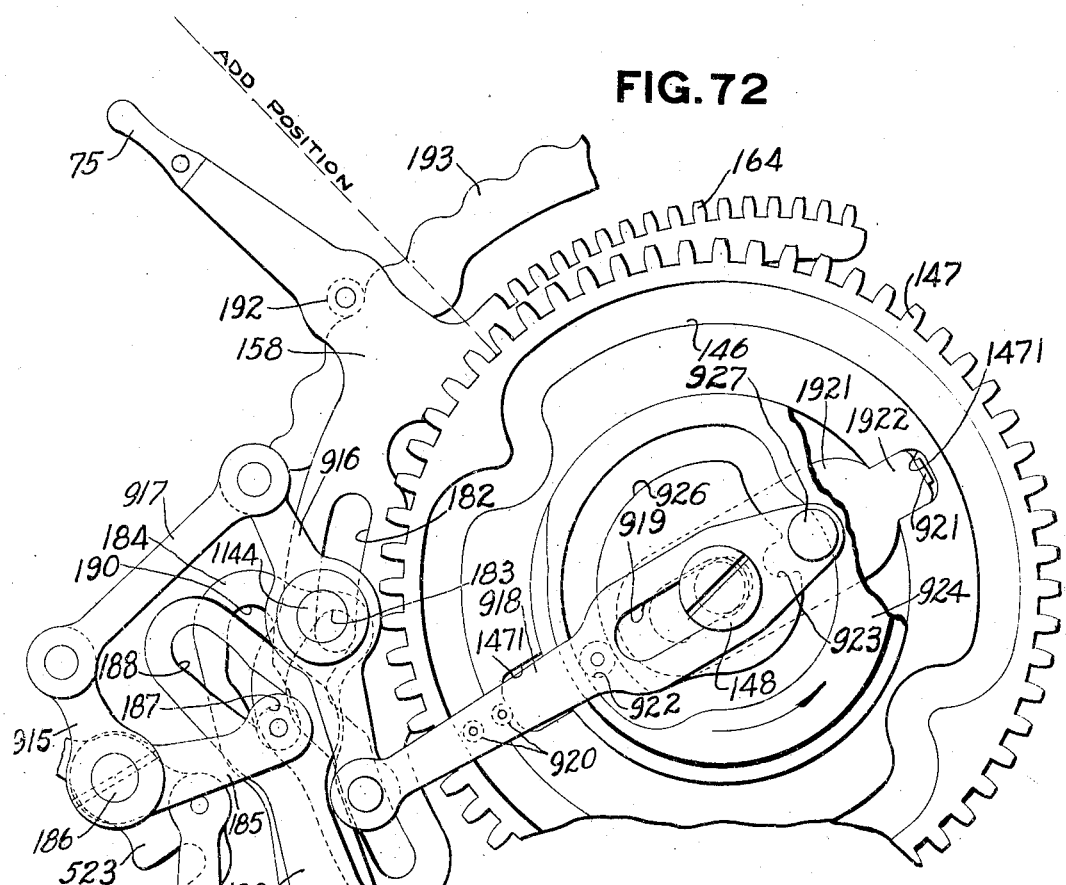
FIG. 72
FIG. 73
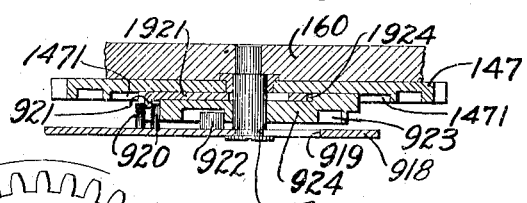
FIG. 74
Inventor
FREDERICK L. FULLER
by Earl Benst
Henry E. Stauffer
Attorneys June 3, 1930.  F. L. FULLER  1,761,718
CASH REGISTER
Filed May 23, 1919  27 Sheets-Sheet 27
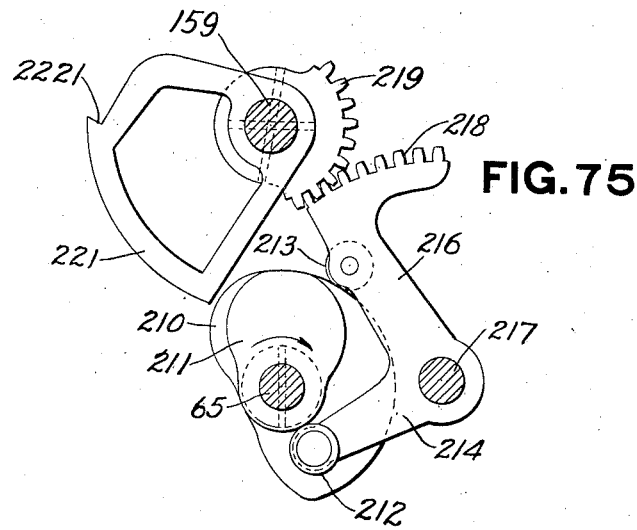
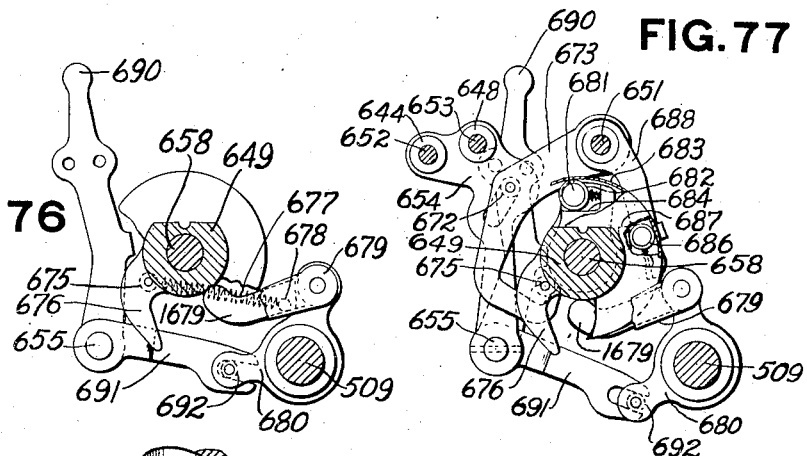
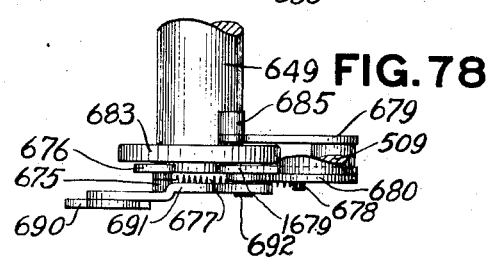
Inventor
FREDERICK L. FULLER
by Carl Beust
Henry E. Stauffer
Attorneys Patented June 3, 1930

1,761,718

UNITED STATES PATENT OFFICE

FREDERICK LINCOLN FULLER, OF BRIDGEPORT, CONNECTICUT, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed May 23, 1919. Serial No. 299,112.

This invention relates to improvements in cash registers and the like, the primary object of which is to devise a machine having registering, indicating and printing mechanisms capable of performing a great variety of functions rendering it adaptable for use in nearly an unlimited number of different businesses and at the same time so to construct the machine that it is relatively simple, durable, has a minimum number of parts, and may be manufactured at a cost sufficiently low to render it thoroughly commercial.

The following divisional applications of this case have been filed as follows: Serial No. 173,391, filed March 7, 1927; Serial No. 174,858, filed March 12, 1927, issued into Patent No. 1,725,859, on August 27, 1929; Serial No. 178,433, filed March 25, 1927; and Serial No. 187,861, filed April 30, 1927.

The objects of the present improvement are to provide:

A novel machine release mechanism controlled by various manipulative devices so constructed that a certain predetermined number of manipulative devices must be actuated before the release of the machine is effected.

A novel form of key bank in which the keys are removable from the bank and insertable for purposes of operation, the sockets receiving the keys being in the form of lock barrels whereby each key is only operable in its appropriate barrel.

To combine with the release mechanism heretofore mentioned, a device actuated by the total lever so that upon movement thereof to control the machine during a total or subtotal operation a manipulative device in any bank selected by the total lever may be actuated to effect the release of the machine, the manipulative devices in the other banks being locked against operation.

An improved form of oscillating differential mechanism controlling reciprocating actuators for positioning the indicators and various totalizers commensurate with the values of the keys depressed.

An improved form of accumulating mechanism comprising a plurality of individual totalizers arranged in groups, the said groups being carried by a frame which is easily removable from the machine and its connection with the operating elements for the totalizers rendering them accessible for repair and providing a simple and cheap assembly.

A novel form of transfer mechanism for the individual totalizers.

An improved mechanism for selecting various individual totalizers for actuation by the differential actuators, and a novel mechanism cooperating with the selecting mechanism for controlling the engagement of the various totalizers with the actuators as determined by the manipulative devices.

A novel aligning mechanism for the differential actuators, indicator mechanism, individual totalizers, and the totalizer lines.

For combining the total lever control for the machine with the totalizer selecting and engaging mechanism whereby the said mechanisms are controlled jointly by the total lever and by the manipulative devices.

An improved form of interlocking mechanism controlled by the total lever and cooperating with the zero stop pawls of the various control banks of manipulative devices.

A printing mechanism having various novel features and so constructed that a record strip, check and inserted slip may be printed during one operation of the machine, and with means wherein either the check or slip may when desired receive a double impression.

A severing device and a perforating device cooperating with the printing mechanism whereby a check issued by the printing mechanism is severed from the strip and perforated intermediate of its ends so that when it receives a double impression it may be used as a stub check and when receiving one impression is adaptable for use as a plain check.

A novel mechanism for setting the various type wheels commensurate with the values of the keys depressed, and an impression device constructed so that the platens for taking impressions on the various printing mediums are held stationary and the type wheels themselves are moved thereagainst to make impressions.

A novel form of feeding mechanism for the record strip, check and inserted slip, and also a novel mechanism for ejecting the printed check from the machine.

A manually operable device for setting type wheels associated therewith whereby ledger members and the like may be set up and printed upon the record strip, check and inserted slip.

Means for preventing a contact of the type wheels with the platen when no slip is inserted to receive an impression therefrom and also to provide a novel mechanism for printing a character on the record strip to indicate when a slip was inserted and received an impression from the said impression device.

A novel slip feed adjustable to feed the slip any desired distance between two impressions it receives, this distance determinable by the setting of a lever manually.

With these and incidental objects in view, the invention consists in certain novel features of construction and combinations of parts the essential elements of which are set forth in the appended claims, and a preferred form or embodiment of which is hereafter described with reference to the drawings which accompany and form part of the specification.

Of said drawings:

Figures 1A and 1B taken together are a front elevation of the entire registering mechanism and some elements of the printing mechanism, the cabinet being removed.

Figure 2 is a detail view of the clutch mechanism for the check feeding and severing mechanisms.

Figure 3 is a right hand elevation of the registering mechanism, the cabinet being removed, and illustrates the control of the driving mechanism for adding, sub-total and grand total operations.

Figure 4 is a fragmentary detail perspective view of the target lifting devices of the indicating mechanism.

Figure 5 is a left hand elevation of the registering mechanism, the cabinet being removed, showing the motor drive, connecting gears, clutch, and switch for controlling the motor.

Figure 7 is a vertical sectional view taken on the line 7—7 of Figure 6 and looking in the direction indicated by the arrows.

Figure 8 is a detail view of the aligner mechanism for the differential mechanism and the indicator mechanism.

Figure 9 is a vertical sectional view taken on the line 9—9 of Figure 6 and looking in the direction indicated by the arrows, illustrating the differential mechanism and its connection with the totalizer selecting mechanism and the indicating mechanism.

Figure 10 is a vertical sectional view taken on the line 10—10 of Figure 6 and looking in the direction indicated by the arrows.

Figure 11 is a sectional detail view, parts shown in elevation, of the controlling device actuated by the total lever for the release mechanism of the machine.

Figure 12 is a front elevation of the totalizers and their supporting frame, after their removal from the machine.

Figure 13 is a top plan view of a group of totalizers.

Figure 14 is a vertical sectional view taken on the line 14—14 of Figure 12 and looking in the direction indicated by the arrows.

Figure 15 is a vertical sectional view taken on the line 15—15 of Figure 12 and looking in the direction indicated by the arrows.

Figure 16 is a vertical sectional view taken on the line 16—16 of Figure 12 and looking in the direction indicated by the arrows.

Figure 17 is a detail view in top plan of the totalizer engaging mechanism.

Figure 18 is a vertical sectional view taken on the line 18—18 of Figure 17 and looking in the direction indicated by the arrows.

Figure 19 is a vertical sectional view taken on the line 19—19 of Figure 17 and looking in the direction indicated by the arrows.

Figure 20 is a fragmentary detail view in vertical section illustrating one of the supporting brackets for a totalizer supporting shaft.

Figure 21 is a detail view in vertical section of the transaction key bank, part of the key frame being cut away more clearly to show the parts, and illustrates the controlling mechanism for the printing of the detail strip and receipt, and the feeding and severing of the receipt.

Figure 22 is a detail view in right hand elevation of the transaction key bank by the key frame being broken away and illustrates the controlling mechanism for the machine release mechanism.

Figure 23 is a rear elevation of the elements illustrated in Figure 22.

Figure 24 is a detail plan view of the control mechanism for the machine release mechanism.

Figure 25 is a detail sectional view illustrating the construction of the sliding release pawl.

Figure 26 is a detail vretical sectional view taken on the line 26—26 of Figure 22 and looking in the direction indicated by the arrows.

Figure 27 is a detail view of the cam and associated lever for actuating the totalizer aligner mechanism.

Figure 28 is a detail view of the cam and associated lever for actuating the totalizer transfer mechanism and lifting mechanism for the indicator targets.

Figure 29 is a detail view of the cam and associated lever for engaging the totalizer with the differential mechanism.

Figure 30 is a detail view of the cam and a fragmentary part of the associated lever for locking the total lever against movement during the operation of the machine.

Figure 31 is a perspective view of the interlock mechanism for the control key banks, said mechanism being actuated by the total lever.

Figure 32 is a left hand elevation, partly broken away, of the clerk's key bank, and illustrates the locks for the individual clerk's keys.

Figure 33 is a vertical sectional view taken on the line 33—33 of Figure 32 and looking in the direction indicated by the arrows.

Figure 34 is a fragmentary view in top plan and partly in section of the clerk's key bank.

Figure 35 is a vertical sectional view taken on the line 35—35 of Figure 34 and looking in the direction indicated by the arrows.

Figure 36 is a fragmentary horizontal sectional view taken on the line 36—36 of Figure 35 and looking in the direction indicated by the arrows.

Figure 37 is a detail view in right hand elevation of the special counters and shows the means for controlling and actuating the same.

Figure 38 is a rear elevation of the mechanism illustrated in Figure 37.

Figure 39 is a detail view in left hand elevation of the special counters, the actuating means, and its connection with the differential mechanism.

Figure 40 is a top plan view of the indicating mechanism.

Figure 41 is an enlarged fragmentary detail view in vertical section of the indicator tube line.

Figure 42 is a vertical sectional view taken on the line 42—42 of Figure 41 and looking in the direction indicated by the arrows.

Figure 43 is a horizontal sectional view of the tube line for the type wheel driving segments.

Figure 44 is a perspective view of the section of the machine containing the printing mechanism.

Figure 45 is a top plan view of the printing mechanism with the cabinet removed.

Figure 46 is a detail view of the cam and associated lever for feeding the ink ribbon.

Figure 47 is a front elevation of the printer, the cabinet being removed.

Figure 48 is a detail view of the gear train for actuating the feed rolls and printing cylinders.

Figure 49 is a detail view in central vertical section through the receipt feed rolls, electro cylinders and severing mechanism.

Figure 50 is a detail view in end elevation of the ink ribbon feeding mechanism.

Figure 51 is a detail view of the eccentric adjustment for the receipt impression rolls.

Figure 62 is a top plan view partly in section with parts of the printer drive line and the actuating mechanism for the type wheels removed.

Figure 63 is a detail perspective view of the adjustable knob of the printing mechanism.

Figure 64 is a detail view of a differential unit and its connection with its associated totalizer actuating rack.

Figure 65 is a fragmentary detail view of a detail strip issued during adding operations of the register.

Figure 66 is a fragmentary detail view of a detail strip issued during grand total and sub-total taking operations of the register.

Figure 67 is a detail view of a sales slip printed by the machine.

Figure 68 is a detail view of a stub receipt issued by the machine.

Figure 69 is a detail view illustrating the back of the receipt, shown in Figure 68.

Figure 70 is a diagrammatic view illustrating the totalizer selecting mechanism and its control by the keys in the transaction, department and clerk's key banks.

Fig. 72 is a view showing the total lever in the same position as in Fig. 71 and also a part of the drive control mechanism in the position which it occupies at the end of the first revolution of the main cam shaft during totalizing operations and illustrates how said mechanism moves the totalizer engaging cam control mechanism and the crippling device for the printer drive shaft.

Fig. 73 is a detail section on line 73—73 of Fig. 3, looking in the direction of the arrows.

Fig. 74 is a detail perspective of the plate for coupling together the gear and cam plate shown in Figs. 3 and 72.

Fig. 75 is a detail view of the mechanism for oscillating the actuator shaft.

Fig. 76 is a detail view showing the autographic lever in the position whereby the detail strip is advanced to receive autographic notations and illustrates how said lever co-operates with the receiving roll mechanism.

Fig. 77 is a detail view showing the detail strip feed mechanism, the autographic lever being in the non-autographic position.

Fig. 78 is a bottom view of the mechanism shown in Fig. 76.

Fig. 79 is a detail view showing the total lever type wheels and the means for setting them to print X or Z.

Figure 1B:
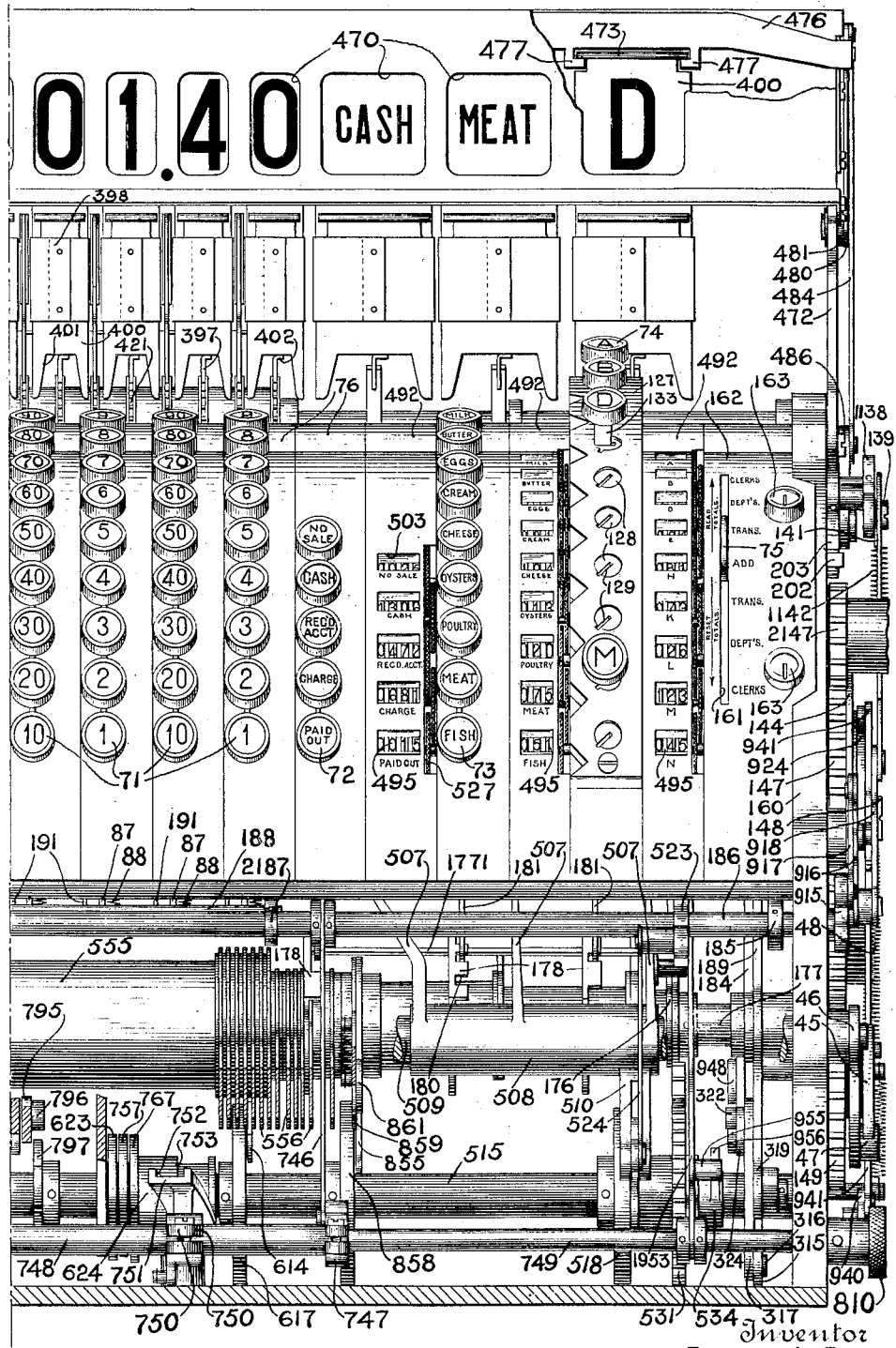

The machine in the illustrative form disclosed herein is designed more especially for use in markets and the like, the key-board being arranged suitable for such a type of mercantile business, and the printing mechanism so constructed that it meets all the requirements thereof. However, the fundamental features of the keyboard arrangement, the functions and construction of the registering mechanism, and the design and functions of the printing mechanism may be used in various other mercantile lines, and although the accompanying drawings show the invention adapted to the particular requirements of a market, it is to be understood that it is not intended to limit the invention to such use, as it may be adapted for use in any other line of business. In fact the parts and construction of the machine are so designed that by mere substitution of some of the parts such as key heads, type wheel inscriptions, cams, etc., the mechanism may be changed to fit the requirement of any mercantile line.

Described in general terms the machine includes three groups of totalizers mounted in frames located at the back of the machine and removable therefrom without dissembling any of the parts. To accomplish this result all of the operative elements of the registering mechanism which are associated with the actuating elements of the three groups of totalizers have slotted connections with each other so that they may be readily separated from each other without disturbing the positions of each with respect to the other elements with which they are associated.

The frames supporting the groups of totalizers are adjustable so that any one individual totalizer or a plurality of them may be moved into cooperative relation with the differential actuators controlled by manipulative means such as banks of depressible keys.

An indicating mechanism which is visible both from the front and rear of the machine is actuated by elements connected directly to the actuating racks, due to which construction the indicating mechanism and the totalizer are both set by the actuation of the actuating racks.

The type wheels of the printing mechanism, of which there are two sets, one arranged above the other, are set by actuating gears driven by elements cooperating with the oscillating differential mechanisms which in turn are controlled by the keys in the various key banks. Means is provided for moving both sets of type wheels into and out of engagement with the actuating gears for the purpose of bringing them into contact with stationary platens one arranged above the upper set of type wheels and one below the lower set of type wheels.

A strip of check paper is fed between the upper stationary platen and the upper set of type wheels so that an impression may be taken thereupon, and auxilliary means is provided for causing one or two impressions to be made upon this check strip, one impression to be made when a single check is to be issued and two impressions to be made when a stub check is desired. This one or two print mechanism for the check strip is controlled by manually settable means and also automatically by elements set commensurate with the keys depressed in the special transaction key bank. Due to this construction, when the manually settable means is set in the "No check" position and the "Cash" key is depressed, the elements of the automatic mechanism control the machine to issue a check.

A severing and perforating mechanism is provided for the check strip the former serving to cut the printed check from the strip and the latter serving to perforate the severed check so that when it bears two impressions, it may be used as a stub check.

A record strip is also fed below the upper platen so that it receives an impression from the upper set of type wheels. A spacing mechanism is also provided for this record strip so that the last impression is moved from its position beneath the platen to a point where it is clearly visible, and means is provided cooperating with the feeding mechanism so that spaces may be left between the impressions to provide a space for autographic notations. The lower set of type wheels is movable into contact with an inserted slip or other paper which may be positioned above the lower stationary platen. Auxilliary means is provided which is settable by hand to control the lower set of type wheels so that they will make one or two impressions upon the inserted slip or other paper. A feeding mechanism is also provided for the purpose of feeding the inserted slip when two impressions are made thereupon to space these impressions. Cooperating with the lower impression mechanism is a device for crippling the action of the lower set of type wheels when no slip is inserted so that no impression will be made thereby. When, however, a slip is inserted to receive an impression from the lower set of type wheels mechanism is actuated for printing a character on the record strip to indicate the presence of the slip in the machine. As a consequence when this character does not appear upon the detail strip it is discernible that during such a transaction a slip was not present in the machine.

In addition to the amount type wheels which have been above described there are sets of date type wheels and also type wheels to print ledger numbers and the like, there being two sets of each of these wheels one set arranged adjacent each of the sets of amount type wheels. Both the ledger type wheels and the date type wheels are settable by actuating gears similar to the gears which position the amount type wheels and arranged adjacent thereto, the said actuating gears being positioned by manually set manipulative devices.

Both the printing mechanism and registering mechanism of the machine are designed to print totals and sub-totals in addition to the regular adding operation just described. The mechanism for setting the machine for adding, sub-total and total operations is under the control of a total lever which in addition to so controlling the machine also positions a type wheel to print an indication upon the record strip to show whether the amount printed was impressed during a total or sub-total operation of the machine.

OPERATING MECHANISM

The motor mechanism which it is desired to use in connection with the present invention is of a well known type and described in Letters Patent of the United States, No. 1,144,418, granted to Charles F. Kettering and William A. Chryst, on June 29, 1915, and for a detailed description of same reference may be had to this patent.

The motor mechanism illustrated in Figures 1A and 5 is located on the left end of the machine. A member 50 forming one part of the clutch device and shown in section is rotated by a worm 975 on the armature shaft 976 of a motor (not shown). A plate 51 (Fig. 5) forming another member of the clutch cooperates with the rollers 52 and is connected thereby to the clutch member 50 upon release of the machine, as fully shown and described in the aforesaid Kettering and Chryst patent. Three locking disks 53 are provided, having locking shoulders, engaged by a nose on a locking lever 54 pivoted to the left hand side frame of the machine. The locking disks 53 perform certain functions in connection with the release and operation of the clutch and the closing of the electric circuits, which parts and their functions are fully described in the aforesaid patent and will not be discussed in detail here. The opposite end of the lever 54 is provided with a roller 977 normally resting upon the upper edge of a curved portion 55 of an arm 56 fast on the left hand end of a shaft 57. When the arm 56 is rocked counter-clockwise (Figure 5) to release the machine, as will be described later, the locking lever 54 is rocked counter-clockwise, by a spring 58, out of engagement with the shoulders on the disks 53, (this movement being limited by a stud 5411 on the side frame) whereupon the disks and parts operated thereby are moved by spring action to effect the connection of the motor clutch and closing of the circuit through the motor as described in said patent. The clutch member 51 is fast on a sleeve 60 mounted on a stud 61 projecting from the side frame of the machine. A gear wheel 59 is fast on the sleeve 60 and meshes with an intermediate gear 63 which in turn meshes with a gear 64 fast on the main drive shaft 65. Through this gearing, the motor (not shown) gives the main drive shaft 65 one complete rotation upon each adding operation of the machine.

For the purpose of restoring the locking lever 54 to locking position near the end of an operation of the machine, a link 67 is pivotally connected at its upper end to the lever 54 and has a slot 68 through which a pin on the frame of the machine projects to guide the link in its reciprocation. The gear 63 is provided with a stud 69 which, near the end of an operation of the machine, engages the lower curved surface 70 of the link 67. The surface 70 is so constructed that its engagement with the stud 69 causes the link 67 to be raised thereby moving the locking lever 54 back to normal locking position.

As will be described later, the arm 56 is rocked back to its normal position just before the stud 69 passes out of engagement with the surface 70 on the link 67, in order to retain the locking lever 54 in its normal position.

It may in some instances be desirable to actuate the machine by hand instead of by the motor and gearing just described. As a consequence the machine is provided with manual operating means in addition to the motor driving mechanism. A hand crank (not shown) carrying a gear 2147 (Figure 3) may be rotatably mounted upon a stud 2148 carried by the right hand side frame 160 of the machine. The handle, and gear 2147, are held against longitudinal movement on the stud 2148 in any well known manner. The gear 2147 meshes with a large gear 147 loosely mounted upon a stud 148 carried by the right hand side frame 160. The gear 147 meshes with a smaller gear 149 fast upon the main drive shaft 65. The ratio of the gears comprising the gear train just described is such that two rotations of the gear 2147 by the handle cause one complete rotation of the gear 149 and shaft 65. The functions of the arm 56 and locking lever 54 are the same as described in connection with the motor drive just described. The only difference in the two driving means resides in the fact that in one case the shaft 65 is rotated by a motor and in the other case by a hand operated crank.

In order to make sure that the cam shaft 65 comes all the way home at the end of each operation, there is provided a disk 45 (Figs. 1B and 3) secured to the right hand end of said cam shaft, and an arm 46 pivotally mounted on the right hand frame 160. The arm 46 carries an anti-friction roller 47 that cooperates with the disk 45. A strong coil spring 48 holds the roller against the disk as illustrated in Fig. 3.

The contour of the disk 45 is such that when the cam shaft 65 is rotated in a clockwise direction, the arm 46 is rocked clockwise. The high portion of the disk is rounded so that, just before the end of the cam shaft rotation, the arm can be rocked counter-clockwise by the spring 48 which causes the shaft 65 to be brought all the way home.

KEYBOARD

The keyboard (Figs. 1A and 1B) comprises six banks of amount keys 71, one bank of transaction keys 72, one bank of departmental keys 73, one bank of clerk's keys 74, and a total control lever 75 employed to control the machine for total and sub-total operations of the registering and printing mechanisms. The construction of the key banks is very similar to that shown and described in a patent granted to applicant on October 9, 1917, No. 1,242,170, and therefore they will be described but briefly here. The keys of each bank are mounted in an individual frame 76 (Figures 7, 9, 21, 22 and 32) mounted on cross rods 77, and springs 78 are employed normally to retain the keys in undepressed positions.

The amount keys 71 (Figure 7) cooperate with flexible detents 79 and locking plates 80. The former are supported at their upper and lower ends respectively by arms 81 and 82 loosely pivoted on pins 83 carried by the key frames 76. When a key is depressed the inclined edge of a shoulder 84 on the key engages a corresponding pin 85 on the flexible detent 79, thus moving the latter downwardly until the shoulder is past the pin, when the detent rises slightly, retaining the key in depressed position. The arm 82 engages a pin 86 on a zero stop pawl 87 normally in effective position as illustrated in Figure 7 and when the flexible detent 79 is moved downward, the pawl 87 is rocked counter-clockwise to render it ineffective. A spring 88 connected at its lower end to the pawl 87 and at its upper end to the key frame serves to retain the pawl 87 and flexible detent in normal positions.

The locking plates 80 for the banks of amount keys are provided with extensions 89 which immediately upon the release of the machine pass over pins 90 on the depressed keys and under the pins 90 on the undepressed keys, thereby preventing manipulation of the keys during an operation of the machine. In order to give the locking plates 80 the required upward movement, the upper supporting arms 91 for the locking plates are provided with extensions 92 extending over a rod 93 carried by arms 94 fast on the shaft 57. This shaft is rocked clockwise when the machine is released, as will be hereinafter described, whereupon the rod 93 lifts the locking plates 80 into locking positions.

The keys of the transaction key bank are also mounted in a key frame 76 (Figures 21 to 25) the bank, however, containing but five keys 72 whereas the other banks contain nine. It is apparent that whenever desired a greater or less number of keys might be placed in this bank determinable by the addition or elimination of various branches of monetary transactions which the particular user of the machine might wish. Each of the keys is provided with a shoulder 95 cooperating with a corresponding pin 96 carried by a flexible detent 97 (Figure 21) pivoted at its lower end to an arm 98 loosely mounted upon a stud 99 carried by the key frame 76 and at its upper end to an arm 100 loosely mounted upon a stud 101 carried by the key frame. When a key is depressed the inclined edge of the shoulder 95 engages the corresponding pin 96 on the detent 97 thus moving the latter downwardly until the shoulder is past the pin, when the detent rises slightly retaining the key in depressed position. The arm 98 engages a pin 102 on a pivoted zero stop pawl 103 which is normally in effective position as illustrated in Figure 21. When the flexible detent 97 is moved downwardly, the pawl 103 is rocked counter-clockwise to render it ineffective. A spring 104 connected at its lower end to the pawl 103 and at its upper end to the key frame serves to retain the pawl 103 and locking detent in normal positions. The keys 72 also carry pins 105 which cooperate with inclined slots 106 (Figure 22) made in a release bar 107 pivoted at its lower end to an arm 108 loose on the stud 99 and at its upper end to an arm 110 loose on the stud 101 carried by the key frame. The arm 110 carries a pin 112 which fits within a slot in an arm 113 integral with a sleeve 114 loosely mounted upon a shaft 115. Also integral with the sleeve 114 is an arm 116 whose inner end normally rests in front of the end of an L-shaped arm 117 integral with a sleeve 118 loose upon the shaft 57. The sleeve 118, however, is provided with an extension 119 which fits within a slotted arm 120 (Figures 22 and 24) pinned to the shaft 57. Due to this construction a rotation of the shaft 57, will, through the arm 120 and extension 119 cause a rotation of the sleeve 118 and at the same time permit a movement of the sleeve 118 longitudinal of the shaft 57.

The construction and elements of the department key bank 73 (Figure 1) are identical with those of the transaction key bank 72 just described. It has a flexible detent 97, and a release bar 107, cooperating with an arm 121 (Figures 23 and 24) similar to the arm 116, the inner end of which lies in front of an L-shaped lever 122 similar to the lever 117.

The clerk's key bank 74 (Figures 32 to 36 inclusive) comprises a key frame 76 mounted upon the cross rods 77, the flexible release bar 97, and detent 107 cooperating with an arm 123, the outer end of which abuts against one of two L-shaped arms 124 (Figure 24). This key bank however differs from those previously described in that the shanks 125 of the keys which carry the pins 105 do not carry the key heads 74 but project upwardly a short distance within slots 126 (Figures 33, 34 and 35) made in a key frame 127 which is mounted above the key frame 76 and secured thereto.

Rotatably mounted in a circular radial hole made in the key frame 127 over each slot 126 is a barrel 128 having a narrow vertical slot 129 extending therethrough into which project three plungers 130 that are adapted to cooperate alternately with sets of spring pressed plungers 131 and 132 mounted in the key frame 127. The key heads 74 are each carried by a shank 133 which is insertible within the slot 129 and a notch 134 made in the cover 135 of the key frame 127. One edge of the shank 133 is provided with notches 136 which are of such depths that after the key is inserted within the slot 129, the division between the plungers 130 and 131 will occur at the periphery of the said barrel so that the key and barrel may be rotated clockwise until the key shank 133 is brought into the plane of the key shank 125, and the slot 129 in the barrel brought into registration with a slot 137 made in the key frame 127 at right angles to the slot 126. When the key and barrel have been turned into this position and the plungers 130 and spring pressed plungers 132 have been brought into contact, the key 74 may be depressed, the lower end of the shank 133 engaging the shank 125 and depressing the lower end of the latter into a position where it will control the differential mechanism associated with this key bank as will be hereinafter described. After the key 74 has been turned from the position of its insertion, due to a shoulder 138 made therein which fits beneath the cover plate 135 the key may not be withdrawn until it is returned to home position in which the shoulder 138 will register with the notch 134 in the cover plate at which time it may be withdrawn.

From the foregoing it will be seen that unless the notches 136 in a key shank 133 are of the proper depths the key may not be turned to position the shank 133 above the shank 125 and to bring the plungers 130 into registration with the spring pressed plungers 132. A certain individual key is required to depress each shank 125 so that each clerk may only depress a certain key shank 125 and thereby only select his associated individual totalizer as will be hereinafter described in detail.

The three arms 116, 121 and 123 which are associated with the transaction key bank, departmental key bank, and clerk's key bank respectively and which abut the arms 117, 122 and 124 integral with the sleeve 118 (Figures 22, 24 and 32) prevent movement of the said sleeve in a clockwise direction (Figure 22), the engagement of any one set of associated arms serving to prevent the said clockwise movement. As a consequence, in the normal condition of the machine when the total lever 75 is in the position shown in Figure 1B it is necessary to rock all three arms 116, 121 and 123 out of the path of the three arms integral with the sleeve 118 to permit a clockwise movement thereof. In order to so move the said arms a key must be depressed in the transaction, departmental and clerk's key banks.

The sleeve 118, as previously described, through the projection 119 carried thereby and the arm 120 pinned to the shaft 57 is rocked with the said shaft, the latter receiving its rocking movement by means of an arm 1138 (Figure 3) pinned to the right hand end of the shaft 57, the said arm carrying a pin 139 projecting into a slot 140 formed in the upper end of a link 141. A compression spring 1142 tends to rock the arm 1138 and therefore the shaft 57 clockwise as viewed in Figure 3, this movement being prevented in the manner previously described. When the shaft 57 is permitted a clockwise movement by the depression of a key in the transaction, departmental and clerk's key banks, the arm 55 (Figure 5) is rocked counter-clockwise thereby effecting the coupling and starting of the motor for driving the main drive shaft 65 as has been heretofore described or permitting a manual operation by use of the crank handle. Simultaneous with the rocking of the shaft 57 to release the machine the arm 94 (Figure 7) will be rocked clockwise thereby elevating all of the locking plates 80 to lock all of the amount keys in either their depressed or undepressed positions.

It is not necessary to depress the keys in the control banks simultaneously, or in any particular sequence. As each key is depressed it is held in depressed position by the flexible detent 97 and locked in this depressed position after the machine is released, because the arms 116, 121 and 123 are rocked counter-clockwise (Figure 22) by the downward movement of the detents 107, (Fig. 24) and held in this rocked position by the arms 117, 122 and 124 which rest beneath them after the shaft 57 has been rocked to release the machine.

To effect the release of the amount keys near the end of the operation of the machine the link 141 (Fig. 3) is provided with a slot 142, and a pin 143, mounted on the rear end of an arm 144, projects into a set off of the slot 142. The arm 144 is mounted on a stud 1144 and carries a roller 145 projecting into a cam groove 146 formed in the face of a gear 147 loose on a stud 148. The gear 147 meshes with a gear 149, fast on the main drive shaft 65, which gear is one-half the size of the gear 147 whereby the latter is given a one-half rotation upon each operation of the machine when it is operated by a motor. The cam groove 146 is so constructed that near the end of the operation of the machine the arm 144 is rocked to lower the link 141. In this way the shaft 57 is rocked first counter-clockwise past normal position and then clockwise to normal position (Figure 7). As the rod 93 is carried by the arms 94 fast on the shaft 57 this rod is also moved counter-clockwise past normal position and engages projections 150 on the arms 81 supporting the upper ends of the flexible detents 79 and forces the detents downward, thereby moving the pins 85 out of engagement with shoulders 84 of the keys, and as the locking plates 80 are also moved to normal positions by the rod 93, the key springs 78 are permitted to restore the depressed amount keys 71 to undepressed positions. When the shaft 57 is rocked in this manner the arm 56 (Figure 5) is moved to normal position, the lever 54 having been restored to normal locking position by the link 67 and pin 69 before the arm 56 is moved to normal position.

The above described movement of the shaft 57 past normal position is employed to effect the release of the depressed transaction, departmental and clerk's keys. As the said shaft 57 is rocked counter-clockwise by the cam groove 146 and associated levers previously described, the arms 117, 122 and 124 are also rocked counter-clockwise (Figures 9 and 22) from their positions beneath the arms 116, 121 and 123. As the shaft 57 rocks past its normal position an arm 151 (Figures 22 and 24), pinned to the shaft 57, and projections 152 and 153 formed on the sleeve 118 engage extensions 154 formed on the flexible detents 97 of the three control banks and force them downwardly, and as the release bars 107 are free to move upwardly, after the removal of the arms 117, 122 and 123, this movement of the arm 151 and projections 152 and 153 permits the key springs 78 to restore the depressed keys in the transaction, departmental and clerk's banks to undepressed positions.

In order to prevent the operator from retaining the keys in the transaction, departmental and clerk's banks in depressed positions until the end of one complete rotation of the machine and thereby causing an immediate second operation of the machine, non-repeat pawls 155 (Figures 9, 22, 23, 24 and 32) loosely mounted upon the shaft 115 beneath each L-shaped arm 117, 122 and 124 are provided. When the machine is released, the arms 117, 122 and 124 move between the arms 116, 121, 123 and the non-repeat pawls 155. When the shaft 57 is rotated clockwise (Figures 5 and 32) past normal position near the end of the operation of the machine, as above described, the arms 117, 122 and 124 are carried rearwardly past normal position so that if the operator retains keys in the banks 72, 73 and 74 in depressed positions a spring 156 connecting the non-repeat pawls 155 and the arms 116, 121 and 123 rocks the former so that a shoulder 157 formed thereon engages the L-shaped arms 117, 122 and 124 preventing counter-clockwise rocking (Figs. 5 and 32) of the sleeve 118 and shaft 57 to release the machine. When the operator finally removes his fingers from the depressed keys in the banks 72, 73 and 74, the arms 116, 121 and 123 are lowered in front of the L-shaped arms 117, 122 and 124, and as the lower edges of the former arms engage the upper edges of the non-repeat pawls 155 these pawls at the same time are moved so that the shoulders 157 are out of engagement with the L-shaped arms 117, 122 and 124 permitting these arms to rock a slight distance counter-clockwise to again contact the arms 116, 122 and 123.

It would probably be very difficult for an operator to retain a key depressed in each of the banks 72, 73 and 74 to attempt a repeat operation of the machine and as a consequence the mechanism just described would probably never be called into play during an adding operation. However, during sub-total and total operations, as will be hereinafter described, only a key in one of the banks 72, 73 or 74 is depressed to release the machine and during such operations a non-repeat mechanism such as has been described is essential.

The total lever is in the form of a double segment 158 (Figures 6, 10, 71 and 72) loosely mounted on a shaft 159, carried at its ends in the side frames 160 of the machine. The finger piece 75 of the lever is movable in a slot 161, made in a framework 162 supported at its ends upon the rods 77, to adjust it to the desired position. If the lever is moved above its central or adding position it will control the machine for sub-total operations and when moved below its adding position it will control the machine for grand total operations. Locks 163 (Figures 1B and 10) are provided to prevent unauthorized persons from operating the total lever. When the locks are operated by keys inserted to lock the total lever in adding position the bolt of one of the locks closes the slot 161 above and the bolt of the other lock closes the slot 161 below the handle of the lever 75.

When the total lever is in position to control the machine for a sub-total or grand total operation only one key in one of the banks 72, 73 and 74 is depressed since at such a time only one individual totalizer is to be selected and engaged with the differential mechanism as will be hereinafter described in detail. Since only one key is depressed, mechanism is provided whereby it may release the machine although in adding operations, as previously described, a depression of a key in each of the banks 72, 73 and 74 is necessary. The total lever 158 (Figure 10) is provided with a segment having gear teeth 164 which mesh with a pinion 165 loose upon the shaft 115. Secured to the right hand side of the pinion 165 (Figure 24) is a drum cam 166 the cam groove 167 made therein receiving an anti-friction roller 168 mounted upon a pin 169 carried by a collar 170 (Figure 25) loosely mounted on a reduced portion 171 formed on the right hand end of the cast sleeve 118. The collar 170 is held in place on the sleeve 118 by the shoulder at the left hand end of the portion 171 and a collar 172 secured to the right hand end of the sleeve 118. An arm 173 fast to the collar 170 and bifurcated (Figure 10) to fit over the shaft 115 prevents the rotation of the collar 170 and at the same time permits the oscillation of the sleeve 118 which is moved to release the machine as has been previously described.

When the handle 75 of the total lever 158 is moved either up or down in the slot 161 from its central adding position into either its sub-total or grand total position, it will, through the gear teeth 164, pinion 165, drum cam 166, pin 169 and collar 170, move the sleeve 118 either to the right or left from the position in which it is illustrated in Figure 24. This sliding of the sleeve 118 will, as the total lever is moved each step in either direction, move the arms 117, 122 and 124 out of contact with two of the three arms 116, 121 and 123 so that only one of the latter arms will engage one of the former L-shaped arms. Therefore, the movement of only one of the arms 116, 121 or 123 is necessary to release the machine. The arm that abuts its associated L-shaped lever and prevents the release of the machine, is the arm associated with the key bank which is selected by the total lever to take the sub-totals or totals of the individual totalizers which may be selected by the depression of the keys in this bank as will be hereinafter explained in detail. It is to be understood that through the mechanism just described the movement of the hand lever 75 will select one of the banks of keys 72, 73 or 74 so that totals or sub-totals may be taken of the selected individual totalizers associated therewith, this selection being caused by mechanism hereinafter explained in detail, this feature only being mentioned at this time to illustrate its connection with the sleeve 118 which is slid by the total lever so as to render the keys in the key banks selected capable of releasing the machine.

In addition to rendering any of the banks of keys 72, 73 or 74 singly a release bank for the machine by movement of the total lever, mechanism is controlled by the movement thereof to lock the keys in the other two of these banks not selected so that they may not be depressed during the total or sub-total operation of the machine. This mechanism comprises a tooth segment 174 (Figures 6 and 10) fast upon a sleeve 175 which is secured to the left hand side of the total lever 158, the said sleeve being loose upon the shaft 159. Meshing with the teeth of this segment are the teeth of a segment 176 loosely mounted upon a shaft 177 supported in the frames 160. A bar 1771 (Figures 9 and 31) attached to the segment 176 is also secured to three disks 178 loosely mounted upon nested sleeves surrounding the shaft 177. Each of the disks 178 is provided with a laterally extending flange 179 each provided with one or more notches 180, the flanges 179 being located directly beneath downwardly extending tails 181 formed upon the zero stop pawls 103 (Figure 31) associated with the banks of keys 72, 73 and 74. When the handle 75 of the total lever is in its adding position the segments 174 and 176 and the disks 178 are in the positions illustrated in Figure 31 in which the tails 181 of all three of the zero stop pawls 103 are free to move downwardly within a notch 180 cut in the associated lateral flange 179. The keys in any of the banks 72, 73 and 74 may then be depressed, the depression of the keys rocking the associated zero stop pawl 103 counter-clockwise (Figure 31) this counter-clockwise rotation being permitted by the presence of the notches 180 beneath the tails 181. When, however, the total lever handle 75 is moved either up or down to select any one of the banks 72, 73 or 74 for a sub-total or total operation, the segments 174 and 176 are moved a distance sufficient to position the three disks 178 so that only the zero stop pawl 103 associated with the selected bank may move downwardly through a slot 180 in the lateral flange 179. When the total lever has been so moved the other two disks 178 will be positioned so that unbroken portions of the flanges 179 rest beneath the tails 181 of the zero stop pawls 103 so that the said pawls may not be rocked counter-clockwise. Since the pawls 103 can not be rocked counter-clockwise none of the keys in the key banks associated with the said pawls may be depressed. From the foregoing it will be understood that when the total lever handle 75 is moved to select one of the banks 72, 73 or 74 for a sub-total or grand total operation this bank is made a release bank for the machine and at the same time all of the keys in the other two banks are locked against movement so that they may not be depressed during the operation of the machine.

The upper segmental portion of the lever 158 (Figure 10) is provided with a cam slot 182 which receives an anti-friction roller 183 carried by a lever 184 loosely mounted upon the shaft 177. An arm 185 pinned to a shaft 186, rotatably mounted in the frames 160 carries an anti-friction roller 187 which passes through a cam slot 188 in a lever 189 loosely mounted on the shaft 177 and also through a cam slot 190 formed in the lever 184. When the handle 75 of the total lever 158 is moved into either its sub-total or grand total position the cam slot 182 engaging the anti-friction roller 183 actuates the lever 184, so that through the cam slot 190 in the lever 184 and the anti-friction roller 187 carried by the arm 185 the shaft 186 is given a clockwise movement from the position shown in Fig. 10 to the position shown in Fig. 71. The shaft 186 (Figure 7) has secured thereto spaced arms 2187 which carry on their outer ends a rod 188 of a length to extend across all the amount key banks 71. When the total lever handle 75 is moved as above described to rock the shaft 186, the rod 188 is moved clockwise until it is positioned in front of tails 191 formed on the levers 82 which support the lower ends of the flexible detents 79. As a consequence when the rod 188 has been positioned as just described the flexible detents 79 are held against movement so that the pins 85 carried thereby are held rigid against the inclined shoulders formed on the key shanks and prevent their depression.

Figure 6:
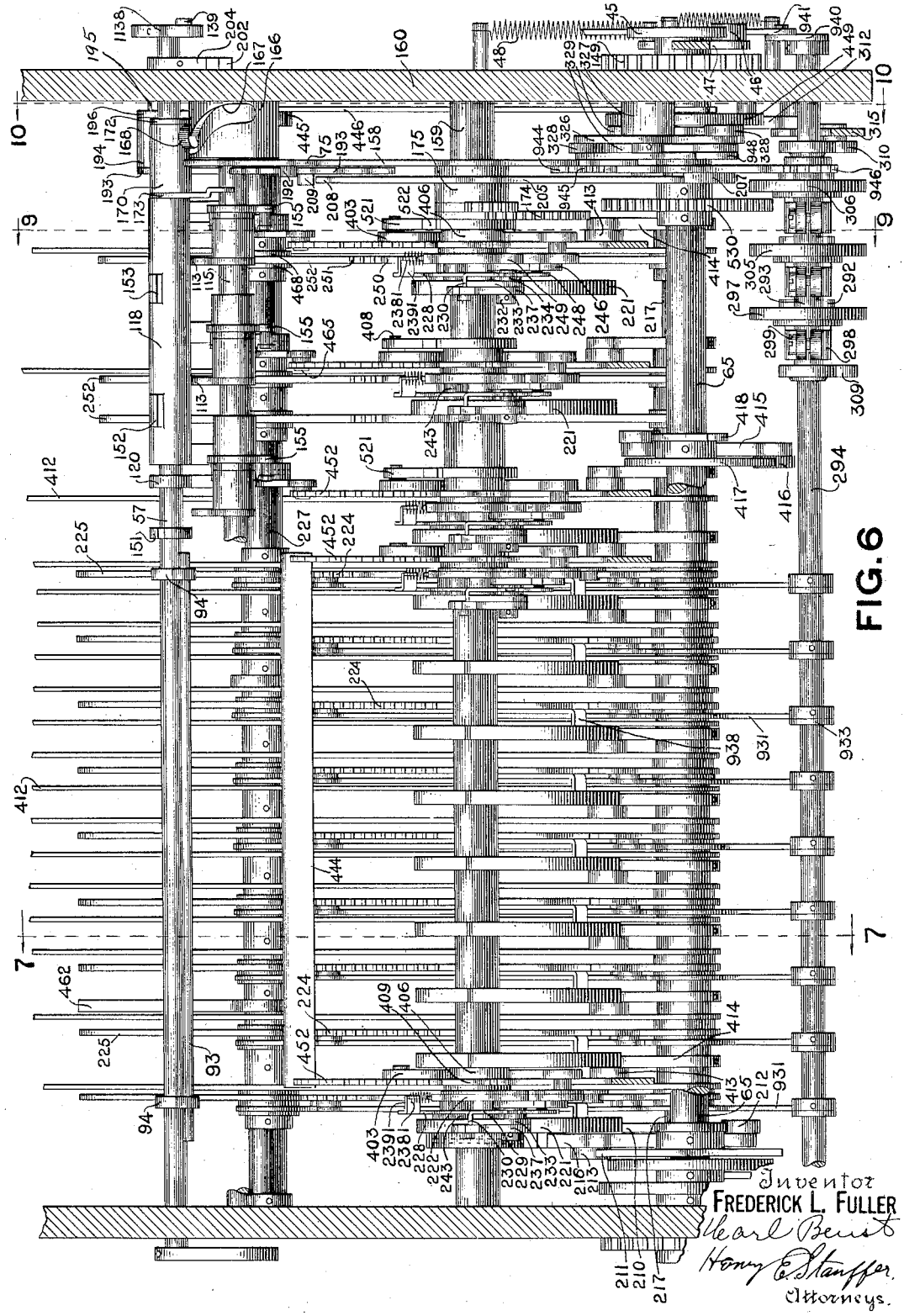
Figure 6 is a front elevation, parts being removed and broken away, to more clearly show the differential mechanism and the main drive line.

Means is provided for preventing a release of the machine unless the total lever handle 75 has been moved to its exact correct position to control the machine for either adding, sub-total or total operations and means is also provided for locking the total lever handle 75 in any of its adjusted positions during the operation of the machine. These mechanisms (Figures 10, 71 and 72) include an anti-friction roller 192, carried by the total lever 158, which roller cooperates with the scalloped upper edge of a lever 193 secured to a sleeve 194 loosely mounted upon a stud 195 supported within the right hand end frame 160 (Figure 6). Also secured to the sleeve 194 is a rearwardly extending arm 196 (Figure 10) which carries on its outer end a pin 197 fitting within a notch formed in an arm 198 loose upon a shaft 199 rotatably mounted within bearings made in the right end frame 160 (Figure 11). A coiled spring 200 stretched between the arm 198 and a two armed lever 201 loose upon the shaft 159 tends to rock the said arm 198 counter-clockwise, which, through the arm 196, will rock the lever 193 clockwise so that its scalloped upper edge will be in contact with the roller 192 carried by the total lever 158. The arm 198 (Figure 11) has a laterally extending flange 202 which projects through an opening 203 made in the right hand end frame 160 and is arranged to cooperate with a downwardly extending arm 204 (Figure 3) fast upon the shaft 57. When the roller 192 is positioned within any of the scalloped depressions of the lever 193, through the movement of the total lever handle 75, the arm 198 will be so positioned that the laterally extending flange 202 will be out of the path of the movement of the arm 204, and as a consequence when the sleeve 118 (Figures 22 and 24) is released through the depression of a key in each of the banks 72, 73 and 74 during an adding operation or when the said sleeve is released through the depression of one key of any of these banks during a sub-total or total operation, the shaft 57 will be free to be rotated clockwise (Figure 3) under the influence of the compression spring 1142 to release and start the machine. However, in moving the handle 75 of the total lever, should the roller 192 be positioned on one of the high points of the edge of the lever 193, the arm 198 would be rocked a distance sufficient to position the laterally extending flange 202 so that it would obstruct the path of movement of the arm 204 pinned to the shaft 57. As a consequence, even though the sleeve 118 should be released by the depression of one or more keys in the banks 72, 73 and 74, the flanges 202 and arm 204 would prevent the clockwise rotation of the shaft 57 to release the machine and start the motor. This mechanism insures that the total lever be set in its exact correct position before the machine can be released and the motor started. After the machine has been released and begun its operation the lower end of one arm 205 (Figures 10 and 30) of the two armed lever 201 will be cammed out of a notch 206 formed in a disk 207 fast upon the main drive shaft 65 and will ride upon the periphery of the said disk during the entire operation. This movement of the arm 205 will cause the other arm 208 of the said two armed lever 201 to be moved so that its upper end will rest beneath a flattened pin 209 carried by the lever 193. As a consequence during the operation of the machine the arm 208 resting beneath the flattened pin 209 will prevent any downward movement of the lever 193 and thereby prevent any movement of the total lever 158 since the scalloped upper edge of the said lever 193 is held against the roller 192 carried by total lever 158. When, however, the lower end of the arm 205 fits within the notch 206 in the disk 207 the upper end of the arm 208 is not positioned beneath the flattened pin 209 upon the lever 193 and as a consequence said lever 193 is free to move up and down through the engagement of the anti-friction roller 192 therewith when the total lever is moved into its various positions.

THE DIFFERENTIAL MECHANISM

To drive the differential mechanism of the machine a pair of cams 210 and 211 (Figures 6, 7 and 75) is secured to the main drive shaft 65 adjacent its left end with which rollers 212 and 213 cooperate respectively. These rollers are supported by the branches of a two armed lever 216 loosely mounted upon a horizontally disposed shaft 217 supported at its ends in the end frameworks 160. The upper arm of the lever 216 is shaped to form a segment and is provided with teeth 218 which mesh with the teeth of a toothed segment 219 which is fast upon the horizontally disposed shaft 159. From the foregoing it will be apparent that when the shaft 65 is rotated during the operation of the machine, through the cams 210 and 211, the lever 216, teeth 218, and segment 219, the shaft 159 will be given first a clockwise and then a counter-clockwise movement.

*Differential mechanism for amount banks*

Fastened to the shaft 159 are a plurality of driving segments 221 (Figures 6, 7, 64 and 75) so positioned that there is one associated with each of the amount key banks. Loose upon the shaft 159 are a plurality of spider shaped plates 222 which have segments 223 secured thereto arranged to mesh with teeth 224 on the front edges of vertically disposed racks 225 provided with two longitudinal slots 226, the lower slot receiving the shaft 217 and the upper slot receiving a horizontally disposed shaft 227 supported at its ends in the end frames 160. Due to the slots 226 and the meshing of the teeth 223 and 224, when the segmental portion of the spider plate 222 carrying the teeth 223 is oscillated as will be hereinafter described, the racks 225 are moved down and up.

Also loose upon the shaft 159 are a plurality of levers 228 one arranged adjacent each of the spider plates 222. Each lever 228 is provided with a forwardly extending arm 229 which projects upwardly at its outer end and has a laterally turned flange 230 arranged to contact with either the zero stop pawl or a shank of a key depressed in its associated key bank. Secured to the outer end of an arm 231 forming a part of each spider plate 222, is a stud 232 upon which is loosely mounted a lever 233 the upper end of which normally abuts the flange 230 on the arm 229 and carries a pin 234 fitting within a slot 235 made in the edge of the arm 229. Loosely mounted upon the stud 232 and secured to the side of the lever 233 by a rivet 236 is a latch pawl 237 the tail 238 of which is normally held in contact with a shoulder 2221 formed on its associated driving segment 221 (Figures 7 and 75) by a compression spring 2381 fitting over studs 2391 carried by the spider plate 222 and lever 228. The said spring exerts its pressure to rock the lever 228 and arm 229 counterclockwise (Figure 64) and the arm 231 of the spider plate 222 clockwise, thereby holding the lever 233 in contact with the flange 230 in which position the tail 238 of the latch pawl 237 is held against the shoulder 2221 (Figure 7) of the driving segment. When the total lever handle 75 occupies its adding position, upon release of the machine the main drive shaft 65 is given a clockwise rotation (Figure 7). The cams 210 and 211 (Fig. 75) mounted on this shaft engage the anti-friction rollers 212 and 213, carried by the two armed lever 216, and rock the teeth 218 counter-clockwise. This movement through the teeth of the segment 219 causes a clockwise oscillation of the shaft 159 to which the said segment is secured. Since all the driving segments 221 are fast upon the shaft 159 they are rocked clockwise and carry with them the latch pawls 237 which have their tails 238 in engagement with the shoulders 2221 on the segments. As previously described, each latch pawl is attached to its associated lever 233, which is pivoted to the arm 231 and connected with the arm 229 by the pin 234 and slot 235, and when the tail 238 of the latch pawl is held, by the spring 2381, in contact with the shoulder 2221 on the driving segment and the upper end of the lever 233 is in engagement with the flange 230 of the lever 229 with the pin 234 within the notch 235, the upward and clockwise movement of the latch pawl 237 by the driving segment 221 will rock the spider plate 222 and lever 228 also clockwise (Fig. 7) until the flange 230 on the arm 229 engages the shank of the depressed key. The engagement of the flange 230 of the arm 229 with the shank of the key depressed will arrest the clockwise movement of the arm 229 but the driving segment 221 will continue to move to the limit of its clockwise movement under the action of the lever 216 and the cams 210 and 211. When the arm 229 comes to rest the continued movement of the segment 221 will, through the engagement of the shoulder 2221 thereof with the tail 238 of the pawl 237, rock the said pawl counter-clockwise, using the pin 234 and slot 235 as a fulcrum, until the tail 238 has been disengaged from the shoulder and rests upon the periphery of the driving segment 221. The counter-clockwise movement of the pawl 237, above described, is sufficient to engage a nose 239 formed on the pawl with one of the notches 240 of a latch plate 241 secured to the key frame 76, the notch 240 engaged by the nose 239 being below the shank of the key depressed. The nose 239 is held in its associated notch 240 due to the fact that the tail 238 of the pawl 237 rides upon the periphery of the driving segment 221 and in this manner the levers 228 and spider plates 222 are positioned commensurate with the keys depressed and latched in their set positions. The setting of the spider plates 222, through the engagement of the teeth 223 formed on the segmental portion thereof with the teeth 224 of the racks 225, also lowers the latter distances commensurate with the keys depressed and holds them in their set positions.

In order to allow time for the latch to break in the zero position so that the actuating racks will not be moved when no amount key has been depressed the spider shaped plates 222 are each provided with an arm 1222 which carries a stud 2222 that fits within a slot 2223 formed in a forward projection 2224 integral with the actuating racks 225 (Figures 7 and 64).

It will also be noticed that the segment 223 is not in engagement with the teeth 224 of the actuating rack 225 when the parts are in their normal positions.

The slot 2223 is so formed that a part of it is concentric with the center of the shaft 159. When the member 222 is oscillated in a counter-clockwise direction (Figure 64), as previously described, the stud 2222 will slide in said concentric portion of the slot until the segment 223 comes into engagement with the lowest tooth 224 of the actuating rack 225. If there has been no key depressed and the zero stop pawl 87 causes the latch 237 to disconnect from its driver in the zero position the member 222 will be rocked slightly, but not enough to cause the stud 2222 to be disengaged from the concentric portion of the slot 2223. The segment 223, when the latch is disengaged in the zero position, engages the teeth 224 of the actuating rack only enough to keep said rack from being moved out of position but does not cause any movement thereof. If any key in the bank has been depressed and the member 222 is rocked beyond the zero position, the stud 2222 moves in the slot 2223 until the segment 223 becomes engaged with the teeth 224. The segment 223 causes the rack 225 to be lowered thereby causing the stud 2222 to be disengaged from the concentric portion of the slot 2223 and to engage the remaining portion and finally become entirely disengaged from said slot, that is if a key of one of the higher denominations such as 8 or 9 has been depressed.

After the totalizers have been engaged with the racks 225, and after the indicating and printing mechanisms have been positioned commensurate with the positioning of the spider plates 222 as will be hereinafter described in detail, the cams 210 and 211 actuate the lever 216 to rock the shaft 159 counter-clockwise (Figures 7 and 75) and also the driving segments 221 secured thereto, in the same direction. As the segments 221 move counter-clockwise to their home positions, each one will at some point during its travel position its shoulder 2221 beneath the tail 238 of its associated latch pawl 237 and thereby permit the pawl to rock clockwise a distance sufficient to disengage its pointed nose 239 from the notch 240 and permit the tail 238 of the pawl to assume the position shown in Figure 7. At the same time that the pawl 237 moves clockwise, as above described, a flattened face 242 formed on each driving segment 221 engages a stud 243 carried by each arm 231 so that as the said driving segments rock counter-clockwise the latch pawls 237, the spider plates 222 and levers 228 are carried with them.

If a key is not depressed in an amount bank the zero stop pawl 87 for that particular bank operates the latch pawl 237 to stop the spider plate 222 in zero position. When a key is depressed however, the arm 82 through its engagement with the pin 86 on the zero stop pawl 87 moves the latter out of operative position so that the flange 230 may pass it and engage the shank of the key depressed in the bank.

During total and sub-total operations the driving segments 221 and associated parts are given two oscillations clockwise and counter-clockwise to perform their necessary functions during such operations, as will be hereinafter described. As a consequence the latch pawls 237 are swung first clockwise and then counter-clockwise twice in rapid succession since the machine is motor driven and operates at high speed and this rapid movement tends to whip the latch pawls out of engagement with the driving segments as they change their direction of movement at the lowest point of their travel.

To counteract this whipping force and to insure a couple between the latch pawls and their driving segments, a plate 244 (Figure 7) is secured to each of the key frames 76 adjacent the latch plate 241 and has its lower end extended beyond the said latch plate at a point just below the notch 240 therein which cooperates with the zero stop pawl 87. The lower end of the plate 244 engages a pin 245 carried by its associated latch pawl 237 and when these parts are in engagement, the tail 238 of the pawl is held in contact with the shoulder 2221 of the driving segment 221. Since each latch changes its direction of movement just below its zero stop pawl 87 it is prevented from whipping away from the driving segment by the pin 245 and plate 244 just described. The plate 244 is not necessary at the upward limit of the latch pawl's movement for the reason that at this point the pawl and associated parts are held by the engagement of the flattened portion 242 of the driving segment with the stud 243 carried by the arm 231.

A whipping action such as that just described may also occur as the latch pawls move intermediate of the points marking the limits of their clockwise and counter-clockwise movement due to stop or starting movements of the driving segments 221 or a sudden reduction and increase of their speed. In order to counteract or compensate this whipping action a weight arm 246 is loosely mounted upon the stud 232, the potential force of which holds a recess made therein against a stud 247 carried by the arm 229. Any sudden movement of the arms 229 and 231 that might tend to separate them and dislodge the tail of the latch pawl 237 will be counteracted by the lagging force of the weight 246 engaging the pin 247 which will hold the said arms 229 and 231 together thereby retaining the couple between the latch pawl and its driving segment.

Differential Mechanism for Control Banks

The differential mechanisms associated with the control banks which are three in number, viz "Transaction", "Departmental" and "Clerk's", are practically identical with the differential mechanisms associated with the amount key banks which have just been described in detail. By referring to Figure 9 it will be seen that the differential mechanism which is associated with the "Clerk's" key bank, and which may be taken as an example since the differential mechanisms associated with all of the control banks are the same, comprises the driving segment 221 pinned upon the shaft 159 cooperating with which are levers 248 and spider plates 249 which are very similar to the levers 228 and spiders 222 associated with the amount key banks. These former levers, however, differ from the latter in that they are provided with no means for cooperation with the totalizers as are the differential mechanisms associated with the amount banks which difference in construction and functions will hereinafter be set forth in detail under the appropriate heading. Each of the levers 248 and spider plates 249, however, support a latch pawl 237 and its associated elements as do the differential mechanisms associated with the amount banks. The function and operation of the driving segments 221, the levers 248, spider plates 249, and the latch pawls 237 associated therewith are identical with those of the differential mechanisms associated with the amount key banks. Attention is called to the fact however, that the spider plates 249 for the control banks are provided with segmental portions bearing teeth 250 which mesh with teeth 251 made in racks 252 different in construction from the racks 225 associated with the amount key banks. The difference in the construction of the racks is due to the fact that those associated with the amount key banks cooperate with the totalizing mechanism whereas those associated with the control banks do not. The racks 252 however, cooperate with the mechanism for selecting and engaging the totalizing mechanism with the racks 225 associated with the amount key banks, this construction being merely mentioned here to show the relation of the parts, the specific construction and functions of these elements will be hereinafter set forth in detail under their appropriate headings. It is sufficient here to state that the racks 252 are slotted at 253 to receive the shaft 227 and bifurcated at 254 to straddle the shaft 217 which shafts support them during their vertical reciprocation. Each rack 252 is also provided on its rear edge with teeth 255 which mesh with the teeth of the totalizer selecting mechanism which will hereinafter be described in detail.

Totalizers

In the present machine three totalizer lines are provided each of which comprises a plurality of individual totalizers, all of which are mounted upon a framework that is detachably fastened to the machine so that it may be readily removed for inspection and repair and also to assist in providing access to the other mechanism of the machine. The framework for supporting the shafts (Figures 3, 5, 7, 12, 13, 14, 15 and 16) comprises a back plate 256 which is attached to the base and end frames 160 in any suitable manner. Secured to the back plate 256 in line with each end frame 160 is a vertically disposed frame 257 each frame being arranged parallel and in the same vertical plane as the end frames 160. As a consequence the end frames 160 are cut out at 258 to receive the frameworks 257 as is illustrated clearly in Figures 3 and 5. Between the frameworks 257 and arranged parallel thereto a third framework 259 (Figures 12 and 13) is secured to the back plate 256.

There are three horizontally disposed shafts 260 (Figures 7, 12, 13, 14, 15 and 16) mounted within the parallel arranged frames 257 and 259 and positioned one directly above the other. These shafts have a length slightly greater than the distance between the parallel frames 257, as is shown in Figure 12, so that the said shafts may be slid longitudinally through the frames without becoming disengaged from their bearings therein. The purpose of sliding these shafts will be set forth hereinafter in detail.

By referring to Figure 12 it will be seen that the end of each shaft 260 adjacent the frame 259 fits within a bored out recess formed in a shaft 261 and these two shafts are pinned together by means of a pin 262 which passes therethrough and also through an arm 263 whereby the said arm and the two shafts are firmly secured together. The purpose of providing the joints between the shafts 260 and 261 is to permit the shaft 261 to have a greater diameter than the shaft 260 so that it may better receive the attachment of various elements which will be hereafter described. Pinned to each shaft 260 adjacent the left-hand framework 257, as viewed in Figure 12, is an arm 264 identical with the arm 263 and arranged parallel thereto. The arms 263 and 264 support a shaft 265 rigidly secured thereto (Figure 14). Mounted upon each of the shafts 265 is a group of totalizers each of which comprises a plurality of totalizer elements.

Each totalizer contains a group of pinions 266, the pinions of like denomination of the totalizers on the shaft being grouped together. Each totalizer of the group totalizers therefore consists of one pinion 266 in each group of pinions. Therefore, if the first pinion 266 of each group is engaged with the differential actuating rack teeth 267 (Figure 7) formed on the rear edge of each of the rack bars 225, a certain individual totalizer will be operated; if the second pinion of each group of totalizers is engaged with the actuators a different totalizer will be operated, etc. This arrangement of multiple totalizers is described in a United States Letters Patent No. 1,109,763, granted September 8, 1914, to Charles F. Kettering.

To shift each multiple totalizer unit so that the elements or pinions of any desired totalizer may be brought opposite the teeth 267 on the rack bars 225, a sleeve 268 (Figures 12 and 13) is loosely mounted upon each of the shafts 261, and held against longitudinal movement upon the said shaft by fitting within a recess 2269 formed in a plate 269 secured on a flat portion formed on the shaft 261. Integral with each of the sleeves 268 is an upwardly extending arm 270 bifurcated to receive a shaft 271 rotatably mounted in the frame 259 and the right hand frame 257, (Figure 12). Due to this construction the sleeve 268 may be moved longitudinally and carry with it the shafts 260 and 261. Each sleeve 268 is moved longitudinally as just described by means of a drum cam 272 pinned to the shaft 271, a cam race 273 of which receives an anti-friction roller 274 carried by the sleeve 268. Secured to one end of each of the drum cams 272 is a gear 275 which meshes with the teeth 255 made on the rear edge of its associated rack bar 252 (Figure 9). The drum cams 272 are of such a size and the gears 275 carried thereby are so positioned that the uppermost gear 275 (Figure 12) meshes with the rack 252 associated with the "Transaction" key bank; the gear 275 below it meshes with the rack 252 associated with the "Departmental" key bank; and the lowermost gear 275 meshes with the rack 252 associated with the "Clerk's" key bank. Since the associated rack bars 252 are, during the operation of the machine, reciprocated vertically different distances depending upon which of the keys in the associated banks are depressed, the gears 275, will be rotated distances commensurate with the keys depressed in each of the three control banks. All of the parts are so arranged that when, for instance, the keys marked "Cash," "Milk," and clerk's key "A" are depressed and the mechanisms operated through the medium of the driving segments 221, latch pawls 237, and gear teeth 250 and 251, the racks 252 will be moved downwardly distances commensurate with the keys depressed in these banks. The downward movement of the racks 252 will rotate the gears 275 distances sufficient to slide each shaft 260 a distance controlled by the depressed keys through the medium of the sleeves 268 and drum cams 272. As each shaft 260 is slid longitudinally it carries with it the arms 263 and 264 pinned thereto and these arms in turn slide the totalizer carrying shaft 265 longitudinally. It will be remembered that as the totalizer wheels 266 are moved longitudinally, different individual totalizers will be selected for actuation by the teeth 267 only one individual totalizer in a group being selected at the same time. From the foregoing it will be understood that under the control of the keys in the "Transaction", "Departmental" and "Clerk's" banks the gears 275 are rotated to slide the shafts 260 and shafts 265 so as to position the individual totalizer of the respective groups for actuation, the totalizers selected, corresponding to the depressed keys in the various banks.

A sleeve 276 (Figure 12) surrounds each shaft 261 and fits within an opening made through the frame 259 to receive the shaft. A similar sleeve 277 surrounds each of the shafts 260 and fits within an opening made in the left hand frame 257 as viewed in this figure. The two sleeves form bearings for the shafts 260 and 261. Carried by each of the sleeves 276 and 277 is an upwardly extending arm 278 arranged parallel and lying adjacent the inner faces of the frames 257 and 259. The arms 278 support at their upper ends aligner bars 279 (Figures 12, 13 and 14) formed to fit within V-shaped notches made in the upper edge of the arms 263 and 264 so that the arms 278, aligner bars 279, and the arms 263 and 264 rock as a unit. Each aligner bar 279 fits between the teeth of the totalizer pinions 266 (Figure 15) and provides a guide for these pinions when the shaft 265 is moved to select a certain individual totalizer. At nine equally spaced points each of the aligner bars 279 is provided with a notch or cut-out portion 280 (Figures 12 and 13) of a width slightly greater than the thickness of the totalizer pinions 266. These notches are arranged in the same vertical plane as the actuating racks 225 so that whatever set of totalizer pinions 266 is positioned for actuation by the racks 225, when they are in correct position for meshing with the teeth 267 formed on the rear edge of the racks 225 they will be in alignment with notches 280 and free to rotate within the notches. However, since the aligner bars 279 engage all the other totalizer pinions they will be prevented from rotation. This mechanism provides an efficient means for permitting a rotation of the totalizer pinions comprising each selected individual totalizer and at the same time provides means for locking against movement the totalizer pinions of those totalizers not selected.

Since the aligner bar 279 is cut-away at nine points to permit the rotation of the pinions comprising the selected totalizers, as just described, when the shafts 265 are moved to select totalizers, these totalizer pinions will be free to come out of alignment with the other totalizer pinions as they pass the slots 280 cut in the aligner bars 279. To meet this contingency an aligning mechanism is provided to bridge the slots 280 and insure that none of the totalizer wheels move out of alignment during the time when the totalizer lines are slid. This means includes (Figs. 7 and 14) an aligner bar 330, one of which is associated with each of the three sets of totalizers. Each of the aligner bars 330 is supported by the upper end of two arms 331 (Figure 12) which are pinned to a shaft 332 mounted in the arms 278 which it will be remembered support the aligner bar 279. The left hand arm 331, as viewed in Figure 12, and shown in detail in Figure 14, is provided with a substantially L-shaped slot 333 which receives a pin 334 carried by a vertically movable bar 335. The bar 335 is vertically reciprocatable upon guides which comprise a slot 336 made in the bar which receives a rod 285, and the bifurcation of the upper end of the bar at 337 to receive a stud 338 carried by the bracket 359 secured to the left-hand framework 257. Normally the pins 334 occupy positions in the substantially vertical portions of the L-shaped slots 333 (Figure 14). However, just previous to the time that the shafts 265 carrying the totalizer pinions 266 are moved to select individual totalizers for actuation the bar 335 is lifted. Since the bar 335 carries the pins 334, the upward movement thereof will, through the engagement of each pin with the oblique portion of the slot 333, cause each pair of arms 331 to be rocked counter-clockwise a distance sufficient to engage the aligner bar 330 between the teeth of the totalizer pinions 266. The means for lifting the bar 335 will now be described. The lower end of the bar is provided with an open ended slot 339 which receives a pin 340 (Figure 7) carried by the rear end of one arm of a bell crank lever 341, the other end of which carries an anti-friction roller 342. The bell crank lever 341 is loosely mounted upon a horizontally disposed shaft 294 supported in the end frames 160. The anti-friction roller 342 fits within a cam race 344 (Figure 27) made in a disk 345 fast upon the main drive shaft 65. From the construction just described it will be readily understood that during the operation of the machine when the disk 345 is rotated through the actuation of the shaft 65 the bell crank 341 will be rocked counter-clockwise, as viewed in Figure 7, and lift the bar 335 a distance sufficient to move the pins 334 to rock the aligner bars 330 into engagement with the teeth of the totalizer pinions 266. The cam race 344 is so shaped that the aligner bars 330 will be engaged with the pinions previous to the time that the shafts 265 carrying the said pinions are moved to select a certain individual totalizer on each line for operation. After the totalizers have been shifted to select a certain individual totalizer, the cam race 344 actuates the bell crank lever 341 to move the bar 335 downward so that it will rock the aligner bars 330 out of mesh with the teeth of the totalizer pinions 266 so that when they are rocked into engagement with the teeth 267 made upon the bars 225 they may be free to rotate.

TOTALIZER ENGAGING MECHANISM

After the racks 225 have been positioned differentially under the control of the various keys depressed in the amount banks, and after the shafts 265 carrying the pinions 266 have been positioned to select individual totalizers commensurate with the keys depressed in the "Transaction", "Departmental" and "Clerk's" key banks, the selected totalizers are rocked into engagement with the teeth 267 of the rack bars 225 so that as the latter are returned to their normal home positions the amounts set up thereupon are transferred to and accumulated upon the selected individual totalizers.

The mechanism for engaging the selected totalizers with the racks includes (Figures 9, 10, 12, 13, 16 and 17) the horizontally disposed plate 269 secured to the flattened portion formed on the bottom of each shaft 261. Three vertically disposed lifter bars 281, 282 and 283 having identically the same shape are parallely arranged (Figure 12) and have slots 284 (Figure 16) to receive two guide rods 285 whereby they may be vertically reciprocated, the said rods being supported in the frame 259 and right hand frame 257, as viewed in Figure 12 the lower one also extending into the left hand frame 257. The lifter bars are spaced as shown in Figure 12 and are each provided with three slots 286 made in their front edge to receive the rear edges of the three plates 269. A coil spring 287 is stretched between a stud 288 carried by the lower end of each lifter bar and a stud 289 (Figure 10) carried by the back plate and provides means for holding all the lifter bars and plates 269 in their lowermost positions (Figures 9 and 16).

Only the lifter bar 281 is directly lifted during adding operations to control the rocking of the plates 269; the upward movement of the other two bars 282 and 283 being controlled by the selected position of said plates 269, as will be hereinafter described. The purpose of the plurality of lifter bars will be hereafter discussed in connection with an additional totalizer selecting mechanism of which these bars form a part. During total operations each lifter bar is driven directly and independently, which construction will also be explained in detail later.

The lifter bar 281 (Figure 12) is provided on its front edge and near its lower end with a recess 290 which receives a laterally turned lip 291 (Figure 17) formed on the end of a pitman 292 bifurcated at its forward end to receive a sleeve 293 (Figures 6, 9, 17 and 18) surrounding a shaft 294 mounted at its ends in the frames 160. The pitman 292 (Figure 18) carries an anti-friction roller 295 which fits within a cam race 296 in a disk 297 fast upon a split hub 298 (Figure 17). This hub is clamped upon the sleeve 293 by the bolt 299 so that the disk is rotatable with the sleeve 293. Pitmans 300 and 301 (Figures 16 and 19) have anti-friction rollers 302 which cooperate with cam races 303 and 304 made in disks 305 and 306 secured to the sleeve 293 similar to the disk 297. The functions of the two pitmans 300 and 301 will be later described, but attention is here called to the fact that when the total lever handle 75 is set in the adding position the parts will occupy the positions illustrated in Figures 9, 16 and 17 in which the pitman 292 has its lug 291 fitting within the recess 290 in its associated lifter bar 281, but the pitmans 300 and 301 have their lugs 291 withdrawn from the recesses 290 in their associated lifter bars 282 and 283. Each of the pitmans (Figures 17 and 18) is also provided with an open ended slot 307 which receives a horizontally disposed rod 308 supported at its ends by arms 309 and 310 pivoted on the sleeve 293 and tied together by a cross bar 311.

From the foregoing it will be seen that when the rod 308 is lifted all three pitmans will be rocked counter-clockwise swinging about the sleeve 293 as a pivot. Since the pitman 292 is connected to its associated lifter bar 281 this bar will be lifted and will rock the plate 269 and shaft 261 of the set of transaction totalizers to engage the selected transaction totalizer with the common actuating racks. The rocking of the plate 269 under certain conditions will act to elevate the lifter bars 282 and 283 to engage the departmental and clerk's totalizers with the common actuating racks as will be later described.

Remembering that the parts are shown in Figure 10 in their adding positions, a description of the mechanism for lifting the bar 308 will be given with reference to this figure. A cam plate 312 is fastened to the inner face of the right hand end frame 160, the cam groove 313 of which receives an anti-friction roller 314 carried by one end of a link 315 which is pivoted at 316 to the lower end of a lever 317 pivoted intermediate its ends upon a stud 318 carried by a downwardly extending arm 319 which is integral with the arm 189 (Figs. 71 and 72) loose upon the shaft 177. The rear end of the link 315 is also provided with a slot 320 which receives an anti-friction roller 321 (Figures 10 and 17) loosely mounted upon the end of the rod 308 adjacent the arm 310. The upper end of the lever 317 (Figure 10) carries a pin 322 which fits within the hooked end 323 of a link 324 pivotally mounted upon a stud 325 carried by a bell crank lever 326 (Figures 10 and 29) loosely mounted upon a stud 327 secured to the right hand end frame 160. The outer ends of the two arms forming the bell crank 326 each carry an anti-friction roller 328 which cooperate with the two plates (Figure 29) forming a double plate cam 329 fast upon the main drive shaft 65.

From the foregoing it will be readily understood that when the shaft 65 is rotated clockwise during the operation of the machine, the plate cam 329 will cause the bell crank 326 to be rocked clockwise. This movement, through the link 324 will rock the lever 317 counter-clockwise, which in turn will push the link 315 rearwardly. As the link 315 moves in this direction, through the engagement of the roller 314 carried thereby with the cam slot 313, its rear end will be lifted. As this end of the link rises it will carry with it the rod 308, through the engagement of the slot 320 with the anti-friction roller 321 carried by the said link.

Briefly stated, by means of the mechanism just described at the proper time during an adding operation of the machine the plate 269 of the transaction totalizers will be rocked counter-clockwise (Figures 14 and 16) and this movement will rock the shaft 260 and arms 263 and 264 carrying the shaft 265 which supports the transaction totalizer pinions 266 a distance sufficient to engage them with the teeth 267 of the racks 225. The shape of the plates forming the cam 329 are such that after the racks 225 have been differentially positioned through the keys depressed in the various amount banks, and previous to their return to their normal positions, the plate 269 is rocked to engage the transaction totalizer pinions with the racks so that as they return to their home positions the amount set up thereon will be accumulated on the transaction totalizer pinions.

Means is provided for aligning the totalizers so that the totalizer pinions of the selected individual totalizer will be in correct positions to engage the racks 225. To accomplish this result an aligner arm 346 (Figures 10 and 12) is secured to each shaft 261 so that when the said shafts are rocked to engage the totalizer pinions with the racks 225 the outer end of the arm 346 will engage one of a series of notches 347 in a plate 348 secured to the back plate 256. If the shaft 261 has not been slid to its exact lateral position the engagement of the aligner bar with its correct notch 347 will exactly position the shaft 261 and totalizer wheels slid thereby. It will be seen that there are ten notches 347 to receive the aligner arm 346 in its ten different lateral positions, it being remembered that the totalizers are shifted commensurate with the keys depressed in the control bank in which there are nine keys, the zero stop pawl however performing the functions of a tenth or "0" key.

As is usual in the art, there are provided totalizer pinions for which no banks of amount keys are employed, these elements being of higher denomination and operated in adding operations only when transfers to them are necessary. Differential units like those controlled by the amount keys are provided to actuate these totalizer elements of higher denomination, and position type carriers and indicator targets of higher denomination during total and sub-total operations of the machine, as will be hereinafter described.

TRANSFER MECHANISM FOR TOTALIZERS

Each of the groups composing a plurality of individual totalizers is provided with a novel form of transfer mechanism which will now be described referring to Figures 7, 12, 13, 14, 15 and 16.

A disk 350 (Figures 7 and 28) fast upon the main drive shaft 65 is provided with a cam race 351 to receive an anti-friction roller 352 carried by a lever 353 losely mounted upon a stud 354 which is carried by the left hand end frame 160. The free end of the lever 353 carries a pin 355 which fits within slot 356 (Figures 7, 14 and 28) made in the front edge and near the lower end of a vertical bar 357. This bar has a longitudinal slot 358 to receive the guide rod 285 and its upper end is slidably mounted in a slot made in a bracket 359 (Figure 13) secured to the left hand frame 257. The front edge of the bar 357 near its upper end is provided with teeth 360 which mesh with a pinion 361 fast upon a horizontal shaft 362 (Figures 12 and 14) mounted in the frames 257 and 259. The configuration of the cam race 351 is such that during an operation of the machine, through the lever 353, it causes first an upward movement of the bar 357, holding the bar in this position for approximately one half the operation of the machine and then lowers the bar to its original and normal position. Fast upon the shaft 362 are eight disks 363, one cooperating with the transfer mechanism, hereafter to be described, provided for each of the totalizer pinions (except the units wheel) of the selected individual totalizer. Each of the disks 363 has a cam race 364 to receive an anti-friction roller 365 carried by a lever 366 pivoted upon a shaft 367 supported at its ends in the frames 257 and 259 (Figure 12). The free end of each lever 366 is pivoted at 368 to the upper end of a bar 369 bifurcated at its lower end to receive the rod 285. The cam races 364 formed in the disks 363 are so arranged that they become effective in succession acting from lower to higher numerical order so that as they are rotated through the actuation of the shaft 362 by the gear 361, the arms 366 will be rocked first clockwise one after the other, starting with that disk which is associated with the transfer mechanism for the tens totalizer pinion. As the bar 357 is returned to its normal home position, the arms 366 are rocked counter-clockwise and the bars 369 are raised to their home positions (Figure 15).

It will be seen that the bars 369 (Figures 13 and 15) are located at the rear of the totalizer wheels 266 and are provided with three rearwardly projecting ears 370, which, when the bars 369 are in their normal positions, receive and support pins 371 carried by transfer pawls 372. Each of these pawls is pivoted at 373 to levers 374 (Figure 7), loosely mounted upon a sleeve 375 (Figure 20) surrounding the shaft 260. Two brackets 376 (Figure 15) are secured to the back plate 256 (Figure 10) each of which has three forwardly projecting arms 377 which are arranged in parallel relationship (Figure 12). Each of the arms 377 is bifurcated at 378 to receive the sleeves 375 and shafts 260 and is provided with headed pins 379 which fit within openings 1380 made in the sleeve 375, as viewed in Figure 20. By this construction the sleeves 375 are held against rotation and at the same time the shafts 260 are free to slide back and forth therethrough to select the various individual totalizers. The levers 374 in addition to being supported by the transfer pawls 372, as just described, are each also supported at times by a shoulder 380 which engages a laterally turned lip 381 (Figure 7) formed on the said lever. The shoulder 380 is made in the lower end of an arm 382 forming part of a two armed lever 383 which is secured to the left end of a sleeve 384 (Figure 12) loosely mounted upon the shaft 332. Each of the shoulders 380 is held in its normal supporting position (Figure 7) by a coil spring 385 stretched between each arm 382 and an upstanding ear 386 made integral with each lever 374. Secured to the right end of each sleeve 384 (Figures 12 and 15) is a trip lever 387 the end of which is provided with a laterally turned lip 388 to cooperate with a long tooth of its cooperating totalizer pinion 266 as will be hereinafter described. Adjacent each trip lever 387 (Figure 12) and loose upon the shaft 332 is a pinion 389 (Figures 7 and 15) which meshes with the teeth of the totalizer pinions 266, comprising the selected individual totalizer. When the parts are in their home positions, as illustrated, the aligner bar 330 is not in engagement with the totalizer pinions so that those pinions of the selected totalizer would be free to move out of alignment were not some aligning means provided. The aligner provided comprises pawls 390 loose upon the sleeve 375 the noses of which are held in engagement with the teeth of the pinions 389 by means of a coil spring 391 stretched between the pawl 390 and the pin 371 carried by the transfer pawl 372.

The operation of the transfer during adding or accumulating operations is as follows. The cam 350 on the shaft 65 moving in the direction indicated by the arrow in Figure 28, causes the lever 353 to be rocked counterclockwise (Figure 7) which, through the teeth 360 (Figure 14) made on the lifter bar 357 rotates the pinion 361 and shaft 362 counter-clockwise. As the shaft is actuated thus, the cam races 364 made in the cams 363 pinned to the said shaft rock the arms 366 clockwise one after the other, starting with the cam associated with the tens totalizer wheel, and thereby lowering all the bars 369. As they move downward the ears 370 integral therewith will be moved from beneath the pins 371 carried by the transfer pawls 372 and as a consequence the levers 374 (Figure 7) and the transfer pawls 372 will be held in their upper positions by means of the lips 381 and shoulders 380 of the arms 382. The downward movement of the bar 369 positions projections 392, integral therewith (Figure 15) so that, as the shafts 260 and 261 are rocked to engage the totalizers with the actuating racks and the aligning pawls 390 are rocked counter-clockwise, said projections 392 will contact with the pins 393 of said pawls causing them to be disengaged from the pinions 389. Before said pawls are entirely disengaged from the pinions 389 the totalizer pinions 266 are in engagement with the actuating racks so that they cannot get out of alignment even though the pawl 390 is out of engagement. The configuration of the cam grooves 364 is such that all of the bars 369 are held in their lowered positions during the time in which amounts are accumulated upon the selected individual totalizer.

After the vertically movable rack bars 225 have been moved downwardly under the control of the differential actuators which in turn are positioned through the depression of the various keys in the amount banks, and after the shafts 265 carrying the totalizer pinions 266 have been moved under the control of the keys in the "Transaction", "Departmental" and "Clerk's" banks to select individual totalizers appropriate with the keys depressed; certain of the shafts 261 are rocked under the action of the plate 269 and lifter bar 281 (Fig. 16) to engage their associated totalizer pinions 266 with the teeth 267 of the rack bars 225. It has just been stated that certain of the shafts 261 are rocked to engage their associated totalizer pinions with the teeth of the racks, and the mechanism whereby only certain of these shafts are rocked and not all of them will be hereinafter described in detail. For the purpose of illustration here let us assume that the uppermost shaft 261, as viewed in Figure 16, is rocked counter-clockwise to move its associated totalizer pinions 266, of the individual totalizer which is selected, into mesh with the teeth of the bars 225 so that as the said bars are returned to their normal home positions the amount set up thereon will be accumulated upon the totalizer.

By reference to Figures 14, 15 and 16 it will be seen that when the shafts 260 and 261 are rocked to engage the totalizer pinions 266, the shafts 265 and 332 will be moved forward a distance sufficient to disengage the teeth of the pinions 389 from the transfer pawls 372. It will be remembered that the aligner pawls 390 have been disengaged from the teeth of the pinions 389 so that as the two shafts 265 and 332 are moved to engage the totalizer pinions 266 with the racks, both the totalizer pinions 266 and the pinions 389 are free to rotate. This movement of shaft 332 will not disengage the shoulders 380 from the lips 381 (Figure 7) carried by the levers 374 so that these levers will still be held in their upper positions. The movement of the shaft 332 however will, through the engagement of the shoulders and lips (lift the levers 374 a short distance in a counter-clockwise direction, during which movement the pins 371 will slide up the rear edge of the bars 369. When the totalizer pinions 266 accumulate the amount set up upon the rack bars they will be rotated in a clockwise direction as viewed in Figure 15. The ninth tooth of each totalizer wheel 266 is made longer than the others as is shown at 394 in Figure 15. As each totalizer wheel 266 rotates in a clockwise direction when the long tooth 394 reaches the lip 388 made upon the trip lever 387, it is of a length sufficient to engage the said lip and cam the trip lever 387 downwardly in a counter-clockwise direction. The parts are so arranged that the long tooth 394 will engage the trip lever 387 as each totalizer pinion 266 passes from its nine to its zero position. Assuming that the totalizer pinions 266 illustrated in Figure 15 is the one which is actuated by the unit rack bar 225, when the long tooth 394 thereof rocks the trip lever 387 counter-clockwise it will rotate the sleeve 384 (Figure 7) to which it is secured, in a counter-clockwise direction. The sleeve 384 extends from its connection with the trip lever 387 toward the left, as viewed in Figure 13, far enough to permit the two armed lever 383 carried by its left hand end to cooperate with the totalizer pinion 266 which is actuated by the tens rack bar 225. The movement of the sleeve 384 just described is sufficient to rock the lever 383 (Figures 7 and 13) secured to its left hand end far enough to disengage the shoulder 380 formed on its downwardly extending arm 382 from the lip 381 formed upon the lever 374. As the shoulder 380 moves out of engagement with the lip 381, the lever 374, through the action of the spring 385, is rocked clockwise, which movement carries the transfer pawl 372 downward until the pin 371 carried by the transfer pawl engages the ear 370 which it will be remembered is in its lowered position at this time due to the previous downward movement of the bar 369. In order to insure a downward movement of the lever 374 and the transfer pawl 372 when the shoulder 380 is disengaged from the lip 381, means is provided for actuating them in addition to the coil spring 385. This means comprises a forwardly extending arm 395 of lever 383 (Figure 7) which, after the lever 383 is rocked counter-clockwise to disengage the shoulder 380 from the lip 381, engages an outwardly turned lip 396 formed on the upper edge of the lever 374. As a consequence after the shoulder 380 is disengaged from the lip 381 the lever 374 will be rocked clockwise under the action of both the coil spring 385 and the engagement of the forwardly extending arm 395 with the lip 396 carried by the said lever.

After the amount set up on the racks 225 has been transferred to and been accumulated upon the selected individual totalizer, during which time various of the trip levers 387 have been actuated to drop their associated transfer pawls 372, as just described, the shafts 261 are rocked clockwise to disengage the totalizer pinions 266 from the racks 225. When the totalizer pinions 266 reach their normal positions the pinions 389 will be above the transfer pawls 372 which have been tripped so that when the said pawls are moved upwardly they will engage a tooth of its associated pinion 389 below the one with which it is illustrated in contact in Figure 15, the pins 371 on the pawls being held against the rear edge of the bars 369 by the coil springs 391. Near the end of the operation of the machine the cam 350 (Figure 28) restores the lever 353 which, through the bar 357 and pinion 361, rotates the cams 363 clockwise (Figure 15). This movement of the cams lifts the bars 369 upward one after the other starting with the bar associated with the tens totalizer pinions until they reach their normal home positions illustrated in Figure 15. During the upward movement of the bars 369 the ears 370 formed thereon will engage the pins 371 carried by the tripped transfer pawls 372 and move the latter upwardly a distance sufficient to engage them with their associated toothed pinions 389 and move them one additional step, which extra movement is transmitted to the associated totalizer wheels 266. As the tripped transfer pawls 372 are lifted as just described to effect the transfer they also affect the levers 374 so that the arms 382 urged by the springs 385 will restore the shoulders 380 of the arms 382 beneath the lips 381 formed on the said levers 374 and thereby hold both the levers and transfer pawls in their normal positions, it being remembered however that in the normal positions these parts are also supported by the engagement of the ears 370 with the pins 371 carried by the transfer pawls.

SELECTING DEVICES FOR TOTALIZER ENGAGING MECHANISM

In prior machines where a plurality of totalizer lines were provided each line containing a plurality of individual totalizers, such a construction being illustrated in a former patent issued to applicant No. 1,242,170, dated October 9, 1917, the particular totalizers were selected by sliding the totalizer shafts but all the totalizer shafts were rocked to move a totalizer thereon into engagement with the differential mechanism at every operation of the machine. As a consequence when it was desired to accumulate on but one totalizer, in machines having two totalizer shafts in some cases the only way the desired result could be accomplished was by removing from the totalizer shafts the totalizer pinions which it was not desired to operate. This construction manifestly permitted of a very limited number of totalizer selection combinations.

In the present machine three sets of totalizers are provided and the mechanism for shifting the totalizer shafts to select various totalizers has heretofore been described in detail. The mechanism for rocking the totalizer pinions into engagement with the differential actuators has also been described in a general way with regard to the transaction totalizers. In addition to this engaging mechanism, however, a totalizer shaft selecting mechanism is provided with means for preventing or permitting as is desired one, two or all three of the sets of totalizers to be rocked into engagement with the differential mechanism simultaneously.

Due to this construction totalizer controlling keys may be pressed in combination, but only one totalizer selected thereby to accumulate the amount, due to the totalizer shaft selecting mechanism. As an additional result a plurality of totalizer selecting keys may be depressed and their particular department or transaction indicated and printed while the amount will be accumulated on but one of the totalizers if such a result is desired. Then again totalizer keys may be depressed and an amount accumulated on one, two or three totalizers, this result being obtained as before described by the totalizer shaft selecting mechanism which controls the number of sets of totalizers to be rocked into engagement with the differential mechanism.

At the outset it may be well to briefly summarize the construction already described by which the totalizer pinions are engaged with the differential actuators. As the shaft 65 is given a rotation during the operation of the machine, the cam plates 329 (Fig. 29) secured thereto will, through the bell crank 326 and link 324, rock the lever 317 (Fig. 10) counterclockwise. This movement of the lever 317, through the link 315 and cam plate 312, will lift the roller 321 which is engaged by the link 315. This roller is carried by the shaft 308 (Fig. 17) supported in the arms 309 and 310. The three pitmans 292, 300 and 301 are in engagement with the shaft 308 and as a consequence when said shaft is lifted as just described said pitmans will be rocked counterclockwise (Fig. 16). It will be remembered, however, that during adding operations only the pitman 292 which is associated with the keys of the transaction bank normally has its lip 291 formed thereon in engagement with the notch 290 made in the lower end of the lifter bar 281 (Fig. 12). From the foregoing it will be seen that during the operation of the machine when the shaft 308 is raised only the lifter bar 281 will be moved upwardly through the actuation of the cam and levers previously described.

The operation of the totalizer shaft selecting devices can be best understood by referring to Fig. 70, which is a diagrammatic illustration of this mechanism together with its cooperation with the control key banks of the machine.

The positions and extent of the low spots 2692 and high spots 2691 made upon the plate 269 illustrated in Fig. 70 have been arranged to carry out the particular functions and objects which the system of a certain market requires. It will be remembered that due to the construction of the machine release mechanism it is necessary to depress three totalizer selecting keys, but it is not desired that the amount should always be accumulated on three individual totalizers. The present machine has its plates 269 so formed that the amount of the "Cash" sales is added upon the individual "Transaction" totalizer, whatever "Departmental" totalizer is selected and whatever "Clerk's" totalizer is selected. The amounts of the "Rec'd on Acc't" sales are added upon the individual "Transaction" or "Rec'd on Acc't" totalizer, and the selected "Clerk's" individual totalizer but not upon the selected "Departmental" totalizer; and the amounts of "Charge" transactions are added upon the individual "Transaction" or "Charge" totalizers and the selected "Departmental" totalizer but not upon the selected "Clerk's" totalizer. In this way each "Clerk's" totalizer will accumulate all "Cash" and "Rec'd on Acc't" transactions that he makes so that the correct amount of cash he should have in his cash drawer may be determined. No cash drawers or operating mechanism therefore are shown in the present machine, but it is to be understood that where there are a plurality of clerks a plurality of cash drawers are to be provided, as is well known in the art and illustrated and described in the Letters Patent of the United States, Nos. 616,866 and 760,724, issued to W. F. Bockhoff on Dec. 27, 1898, and May 24, 1904, respectively.

Each individual departmental totalizer in this system will show a total amount of sales of this commodity, whether cash or charge.

The lifter bar 281 cooperates with the plate 269 fast upon the shaft 261 appropriate to the group of transaction totalizers. The transaction plate 269 is best illustrated in one embodiment of the invention in Fig. 70 and for convenience the different cooperating points of the transaction plate 269 are marked with the different points of cooperation of said plate with the lifting bar 281 by marking on the surface of said plate the point of said plate which will be in alinement with the lifter bar 281 upon the operation of the various transaction keys 72. Fig. 70 shows the three plates 269 in three positions of adjustment. The three plates 269 for the Transaction, Department and Clerk's banks of keys are shown in the left hand tier as in the normal zero position, in which the parts might be positioned if it were possible to operate the machine with no keys depressed, under which condition all of the actuators would be in zero position. The next tier of illustrations shows the positions assumed by the plates when the "Cash" key of the transaction bank, the "Meat" key of the department bank and the "D" key of the Clerk's bank have been depressed. In the last or right hand tier of illustrations the transaction plate 269 is shown in the position which it assumes when the "Rec'd on Acc't" key is depressed; the department plate 269 is shown in the position it will assume when the "Fish" key is depresed and the Clerk's plate is shown in the position it will assume when the "B" key is depressed.

Referring to the left hand tier of details (Fig. 70) it will be noted that none of the lifter bars 281, 282 and 283 is in operative engagement with any of the three plates 269 because said plates are cut-away as at 2692 so that the notches 286 of the bars 281, 282 and 283 will not engage the edges of the plates 269. Referring to the second tier of details, when the rear ends of the pitmans 292, 300 and 301 are raised by the elevation of the shaft 308, the pitman 292 by reason of its engagement with the lifter bar 281 will effect a rocking movement of the shaft 261 by lifting the outer edge of the transaction plate 269 by the engagement of the upper notch 286 of the lifter bar 281 with the projection 2691 of that plate. When the transaction plate 269 is in the position shown in the second tier it will be noted that additional projections on that particular plate 269 are also in a position to be operatively engaged by the lifter bars 282 and 283. Consequently when the lifter bar 281 acts to lift the outer edge of the transaction plate 269, the lifter bars 282 and 283 will be elevated by reason of their engagement above mentioned.

By referring to the middle and lower details of the second tier it will be noted that the lifter bar 282 then engages the projection 2691 on the department plate 269 at the point marked "Meat" and consequently when the lifter bar 282 is elevated the shaft 261 of the department totalizers will be rocked. Furthermore, the lifter bar 283, it will be noted, by referring to the lower details of the second tier, will be in engagement with the Clerk's plate 269 and consequently will rock the shaft 261 of the Clerk's totalizers when the lifter bar 283 is raised as above described.

By referring to the right hand tier of details (Fig. 70), when the transaction plate 269 is moved to the position represented by "Rec'd on Acc't" a cut-away portion is brought to a point in alinement with the lifter bar 282 while a projection 2691 will be in cooperative alinement with the lifter bar 283. Consequently when the machine is operated with the "Rec'd on Acc't" key depressed, the lifter bar 281 will rock the shaft 261 to engage the transaction totalizer, but by reason of the recess 2692 which is then in alinement with the lifter bar 282, said lifter bar will not be elevated and consequently the department totalizer will not be engaged with the actuators regardless of which one has been positioned for operation, the positioning being necessary to adjust the connections between the actuator for the department bank and the indicating and printing mechanisms. The lifter bar 283 however will be elevated and consequently engage the properly positioned clerk's totalizer with the actuators.

From the foregoing it will be understood that whether or not a plate 269 is rocked counter clockwise depends upon whether or not there is a recess 2692 in the rear edge of the plate opposite the associated slots 286 made in the lifter bars. The selection and engagement of the totalizers for adding items on one, two or three totalizers at a time depends upon the system which it is desired the machine should carry out. As a consequence, and as above mentioned, the plates 269 have their edges shaped so as to carry out the special functions desired of the machine. The positions of the three lifter bars 281, 282 and 283 remains constant so far as their vertical planes are concerned whereas the three plates 269 are moved back and forth in horizontal planes different distances determinable by the keys depressed in the "Transaction," "Departmental" and "Clerk's" key banks, as has been already described in detail.

As will be hereinafter described, under certain positions of adjustment of the total lever 75 the shaft 294 (Figs. 9, 16, 17, 18 and 19) is rotated, thereby adjusting the cams 297, 305 and 306 to positions according to the position of adjustment of said lever 75. If the lever 75 is moved from the transaction position to the department position, either "Read" or "Reset," all three cams 297, 305 and 306 will be rotated a short distance, thereby withdrawing the pitman 292 from engagement with the lifter bar 281 and moving the pitman 300 rearward so as to engage it with the lifter bar 282. If the lever 75 is moved to a position representing "Clerk's" in either "Read" or "Reset" positions, the cam 306 will be brought to a position where the pitman 301 is moved rearward to engage the lifter bar 283, while the other two pitmans 292 and 300 will be drawn forward so that they will not be in engagement with the lifter bars 281 and 282. When the lever 75 is moved to the transaction position, either "Read" or "Reset," the cams will be in the same positions as represented by the adding position in which the pitman 292 will be moved rearward and in engagement with the lifter bar 281 and the pitmans 300 and 301 will be out of engagement with the lifter bars 282 and 283.

As will be hereinafter described, when the lever 75 is in either the Transaction, Department, or Clerk's position, the one bank of keys appropriate to those positions will be operable and consequently the actuators for the other banks will be left in zero positions. At such a time the plates 269 of the two banks of keys which remained inoperative will be moved to zero positions where recesses 2692 will be presented to the lifter bars appropriate to the two inoperative banks.

THE INDICATING MECHANISM

Machines of the type illustrated herein are made up of a plurality of banks or sections, the number depending upon the registering capacity desired. In the present instance, the machine has nine of such banks, six for amounts, and three for special transactions, as has been previously described. Indicating mechanism is provided for the purpose of indicating which keys of the keyboard have been depressed. The type of indicating mechanism is of the type shown and described in Letters Patent of the United States 1,163,748 issued to applicant December 14, 1915.

Ten pairs of tablet indicators are provided for each of the amount banks, a pair for each of the nine keys, and a tenth pair for the zero or normal position of the differential mechanism. One indicator of each pair indicates at the front of the machine and one at the back. The three special or control banks, except the transaction bank, have nine keys for department and clerks, the transaction bank only having five. Nine indicators and one blank are provided for the departmental and clerks banks and five indicators and one blank for the transaction bank. During adding operations none of the blanks, which take the place of the zero indicators of the control banks, will appear because one of these keys in each bank must be depressed before the machine can be operated, as previously described, and it never happens, therefore, during adding operations, that the zero position of the bank is indicated. During total operations, however, only a key in one of the control banks is to be depressed to release the machine and as a consequence during such operations the differential mechanisms associated with the control key banks which are locked out, disconnect their latches on the zero stop pawls and in such positions set their blank indicator targets.

All indicators are slidably mounted in longitudinally movable carriages arranged to be differentially positioned in either direction to bring the indicators representing the keys into the common vertical planes where all the front and back indicators are exposed. Operating devices having an invariable positive movement in these vertical planes are arranged to elevate the positioned indicators far enough to expose the characters thereon and hold them in such positions, after the operation of the machine is completed. On the succeeding operation the indicators are positively lowered just before the adjustment of the carriages, to set up the new indication, is commenced. In other words, the indicators and the invariably moved operating devices therefor are arranged to cooperate in such manner that from the instant the indicator starts to leave its carriage until it is returned it is positively controlled by the operating devices. The connection between each pair of indicator carriages and the differential mechanism for the corresponding banks is such that the entire movement of the differential is not transmitted to the carriages but only such part of the movement as is necessary to move them from the positions in which they were left at the end of the preceding registration directly to their new or desired positions. There is, therefore, no reversal of the direction of movement of the carriages during the operation of the machine during an adding operation. During sub-total and total operations, as will be later described, the machine makes two cycles, during the first of which all the latches are disconnected at zero and the indicators will be set accordingly and during the second cycle thereof are set to indicate the total of the amount accumulated upon the selected individual totalizer.

As indicated in the foregoing there are two indicators for each of the nine keys in an amount bank, and two for the zero position, or twenty indicators in all for each of the amount banks. Two carriages are provided for each bank, one for the ten front indicators, and the other for the ten back indicators, with a sleeved connection between the two to permit arranging the different groups so that both the front and back indicators will appear in correct denominational order. Only one of these carriages is directly connected to the differential mechanism, but, because of the sleeve connection mentioned, adjustment of one by the differential mechanism causes the adjustment of the other in the same direction and to exactly the same extent. Each of the carriages comprises a frame 1396 (Figs. 7 and 40) having an upwardly extending arm 397 (Fig. 7) to which is secured a thin metal casing 398 so formed that internal grooves 399 (Figure 40) are provided in which indicator tablets 400 (Figures 1A, 1B, 7 and 40) are slidably mounted, said indicators having their lower edges cut out at 401 to receive and rest upon an extended arm 402 forming part of the frame 1396. The indicator tablets 400 are made of thin material to reduce the weight as much as possible, the cut out portion 401 assisting in the accomplishment of this object. The characters of the indicators are, of course, on the portions normally resting within the casing 398.

As stated above the indicator carriages are positioned by means directly controlled by the differential mechanism through connections arranged to move the carriages directly from one position to another. This is accomplished by devices operating intermediate of the plate 222 and the indicator carriage 1396 in such a way that the differential positioning of the plate determines the position to which the carriage 1396 is to be adjusted, and after the adjustment of the carriage, the plate 222 is allowed to return to its normal position without altering the position of the carriage 1396. This intervening mechanism comprises a beam 403 (Fig. 7) having one end pivotally mounted upon a stud 404 carried by the lower end of a downwardly extending arm 405 integral with the plate 222. The beam 403 is curved to fit around a hub 406 loose upon the shaft 159 and has its other end bifurcated at 407 to receive a stud 408 carried by the side of a plate 409 fast upon the hub 406. The plate 409 is provided with a slot 410 eccentric to shaft 159 which slot receives a pin 411 carried by the adjacent side of a vertically disposed lever 412 which is pivotally mounted at its lower end upon the shaft 217 and at its upper end is secured by rivets 1413 to a downwardly extending arm integral with the carriage 1396. All of the parts associated with the units of cents indicating mechanism are in the zero position in Figure 1B and the zero indicator tablet 400 is exposed. If the machine is now operated with the "9" or top key in the units of cents bank depressed, the plate 222 moves until arrested by the depressed key. The end of the beam 403, which is pivoted to the plate 222 is, of course, carried clockwise, and, because of the opposition offered by the hub 406, the rear end of the beam is lowered to a corresponding extent. This movement is transmitted through the pin 408, plate 409, slot 410, pin 411, and lever 412 directly to move the front units of "Cents" indicator frame 1396 from the zero position in which it is shown in the drawing to the position to indicate at the front of the machine an amount commensurate with the "9" key depressed.

Associated with each beam 403 is an anti-friction roller 413 (Fig. 9) carried by the outer end of an arm 414 fast upon the shaft 217. This shaft is rocked first clockwise and then counter-clockwise during an operation of the machine by means of a bell crank lever 415 secured thereto, the arms of which carry on their outer ends anti-friction rollers 416 which cooperate with two cam plates 417 and 418 fast upon the main drive shaft 65. As the shaft 65 is revolved to actuate the driving segments 221 and plates 222, the roller 413 is carried up against the under side of the beam 403 to insure that a curved portion 419 on the upper side thereof is against the hub 406. This movement of the beam is completed just at the instant that the driving segment 221 reaches the end of its clockwise oscillation and insures the correct positioning of the beam. Then during the counter-clockwise rotation of the shaft 159, the roller 413 is carried away from the beam 403, and when the plate 222 is restored to normal or zero position, the beam 403 and plate 409 will be carried down as the pivot 404 is lowered, so that at the end of the operation the beam 403 will be hanging loosely under the shaft 159.

If on the next operation a key of lower denomination than 9 is pressed, say for instance the 5 key, the end of the beam connected to the plate 222 by the pivot 404 will be carried up until the latch mechanism is tripped by the depressed key. The roller 413 will then be carried into contact with the under side of the beam 403 and raise the beam the rest of the distance necessary to bring the curved portion 419 of the beam into contact with the hub 406, and, through the intermediate connections, bring the 5 indicator into the vertical plane in which the zero indicator 400 is shown in Fig. 1B. The roller 413 is then carried away so that as the plate 222 is restored to its normal starting point the beam 403 drops without any interference from the roller. This beam, plate and link connection it will be seen, therefore, allows the differential plate 222 to return to zero from any adjusted position without moving the indicator carriages out of the positions to which they have just been adjusted.

As before indicated, the machine has nine banks and indicates at both the front and back of the machine. Two indicator carriages 1396 are, therefore, provided for each of the amount banks, one carrying the indicator tablets for the front indication, and the other the tablets for the back indication. The first six frames 1396, reading from the right, Figure 40, have the lower edges of their arms 402 provided with teeth 420 (Fig. 7) which mesh with the teeth of segments 421 fast to hubs 422 (Fig. 41) loosely mounted upon a shaft 423 (Fig. 7) having its ends rotatably mounted within bearings made in the end frames 160. Plates 460 are secured to each side of the segments 421 to engage each side of the gear teeth 420, these constructions preventing any lateral movement of the indicator carriages. The end of each hub 422 is slotted at 424 (Fig. 42) to receive tenons 425 made integral with sleeves 426 concentric with the shaft 423. Due to this construction the hubs 422 carrying the segments 421 rotate the sleeves 426. The sleeve 426 which is rotatable with the segment 421 that is actuated by the teeth 420 of the units of cents carriage 1396 carries on its left hand end as viewed in Fig. 40 a hub like the hub 422 to which is secured a segment like the segment 421, which meshes with teeth like the teeth 420 made on the lower edge of a forwardly extending arm like the arm 402 of a carriage 428. This carriage has an upwardly extending arm 427 like the arm 397 and supports a casing 398 containing similar indicator targets 400. This casing, however, extends towards the rear and the indicator targets rest upon a rearwardly extending arm 429.

In like manner the tens of cents, dollar, tens of dollars, hundreds of dollars and thousands of dollars indicator carriages 1396 actuate, through sleeves 426, hubs 422 and segments 421, indicator carriages or frames 430, 431, 432, 433 and 434 respectively all of which support casings 398 containing indicator targets identical with those carried by the casings supported by their associated carriages 1396.

The indicating mechanism just described indicates any amount up to the full capacity of the keyboard at both the front and rear of the machine. As has been stated, however, there are provided totalizer pinions for which no banks of amount keys are employed, these elements being of higher denomination and operated in adding operations only when transfers to them are necessary. Differential units like those controlled by the amount keys are provided to actuate these totalizer elements of higher denomination and additional indicator targets are provided which are set thereby during total and sub-total operations since at such times the amounts to be indicated often exceed the capacity of the indicating mechanism associated with the banks of amount keys. These indicating mechanisms of higher denomination (Figures 1A and 40) comprise carriages or frames 435, 436 and 437 each supporting a casing 398 containing indicating targets 400 to indicate tens of thousands of dollars, hundreds of thousands of dollars, and millions of dollars respectively. It will be noted that the casings carried by the frames just mentioned indicate at the front of the machine and that no casings or targets are provided to indicate these higher amounts at the back of the machine. This is due to the fact that the back indication is for observation by the customers and since totals of various items are of interest only to the proprietor, no indication of them is made at the back of the machine.

Separate carriages are unnecessary for the front and back indicators associated with the control key banks, but the tablets for both can be carried in the same carriage, as it makes no difference whether the words indicating the characteristics of the sale appear before or after the amount. In the machine illustrated, the words appear after the amount in the front indication, as shown in Figures 1A and 1B, and before the amount in the rear indication. The beams 403, rollers 413, plates 409, and levers 412 are identical with the elements bearing the same numbers that are associated with the amount banks. The upper end of each of the levers 412 is secured by rivets 438 (Fig. 9) to a carriage 439 which has two upwardly extending arms 440 and 441 to which are secured the casing 398 containing duplicate indicator targets 400. The casing 398 secured to the arm 440 projects toward the front of the machine and the casing secured to the arm 441 projects toward the back thereof.

It is necessary to provide means for holding all of the indicator carriages in their adjusted positions to insure correct alinement of the indicator targets. To accomplish this with respect to the amount indicators, two parallelly arranged levers 442 (Figs. 7, 8 and 40) are pinned to the shaft 227, and support on their outer ends an aliner bar 444. Also fast on the shaft 227 is an arm 445 (Fig. 10) to which is pivoted the upper end of a pitman 446 whose lower end is bifurcated at 447 to surround a hub 448 fast upon the main drive shaft 65. Secured to the hub 448 is a disk 449 in the outer face of which a cam race 450 is formed, and fitting therewithin is an anti-friction roller 451 carried by the pitman 446. The upper edges of the plates 409 (Fig. 7) are provided with ten teeth 452. The parts are shown in their normal positions in Fig. 7 in which the aliner bar 444 fits within the last notch 452 thus holding the plates correctly alined in their zero positions. When the operation of the machine is begun and before the driving segments 221 or any of their associated parts are moved, the shaft 227 is rocked clockwise through the medium of the cam race 450, pitman 446 and arm 445. This movement of the shaft will rock the parallelly arranged levers 442 a distance sufficient to disengage the aliner bar 444 from the teeth 452 of the plates 409 leaving them free to be differentially positioned. After the plates 409 have been positioned under the control of the keys depressed in the amount banks, the shaft 227 is rocked counter-clockwise by the pitman 446 and associated parts to engage the aliner bar 444 with whatever teeth 452 of the plates 409 are positioned beneath it. Due to the shape of the teeth 452 any plates 409 which are not in exactly correct position will be cammed by the engagement of the aliner bar either backward or forward to aline them exactly.

Since the connection between the plates 409 and the links 412 comprises the slots 410 and pins 411, even after the said plates are alined as previously described a certain amount of lost motion would permit movement of the levers 412 thereby permitting the indicator carriages to get out of alinement. As a consequence an auxiliary alining means for the carriages themselves is provided. Each of the carriages 1396 (Fig. 7) which it will be remembered support the front indicators, is provided with a rearwardly extending arm 453 the lower edge of which is provided with a plurality of teeth 454. The arms 429 of the carriages 430, 431, 432, 433 and 434 (which it will be remembered support the back indicators) and also the carriages 439 have their lower edges also provided with teeth 454, which, when the indicators are all set to show the same digit, are in substantial parallel alinement with the teeth made on the arms 453. Associated with each set of teeth 454 is a spring pressed pawl 455 (Figs. 7, 9 and 40) pivotally mounted upon a rod 456 supported at its ends in parallel arranged arms 457 and 461 fast upon the shaft 423. The pawls 455 are guided within slots (not shown) made in a U-shaped housing 458 supported at its ends by the arms 457 and 461. One leg of the housing 458 is extended at 459 and is provided with slots to receive the arms 453, 467 and 429 of the carriages. Integral with the left hand arm 442 (Figs. 7, 8 and 40) is an upwardly extending arm 462 the upper end of which is provided with a cam slot 463 to receive an anti-friction roller 464 carried by the adjacent side of the arm 457. As previously stated, the parts are shown in their normal positions in Fig. 7 in which all of the pawls 455 are held in engagement with the teeth 454. When, however, the arms 442 are rocked clockwise to lift the aliner bar 444 the cam slot 463, made in the arm 462 integral with one of the arms 442, will cause the roller 464 and the arm 457 to be moved downwardly. This movement of the arm 457 will move the rod 456 a distance sufficient to disengage the pawls 455 from the teeth 454 thereby leaving the indicator carriage free to be set differentially. After the differential mechanism has been set and the arms 442 are rocked counterclockwise to engage the aliner bar 444 the pawls 455, through the medium of the arm 457, cam slot 463 and arm 462, will be again engaged with the teeth 454 and hold the indicator carriages in their set positions.

In place of the aliner bar 444, separate pins 465 (Fig. 9) carried by arms 466 fast upon the shaft 227 are provided for each of the plates 409 associated with the control key banks. These plates 409 are provided with the teeth 452 which will receive the pins 465 when the arms 466 are rocked through the actuation of the shaft 227. Since no segments 421 are associated with the indicator carriages 439, parallel arms 468 (Fig. 9) are pinned to the shaft 423 on each side of forwardly extending arms 469 integral with the said carriages, which serve the purpose of the plates 460 secured to each side of the segments 421 associated with the amount indicator carriages.

After the indicator carriages have been adjusted in the manner above described, the indicators which have by such adjustments been brought to the planes where they are to be exposed are elevated from the casings 398 far enough to bring the indicia to a position to be seen through indicator openings made in the cabinet (not shown) and through openings 470 (Figs. 1A and 1B) in shields 471 (Figs. 3, 4, 7 and 9) secured to parallel arranged upwardly extending brackets 472 secured to each end frame 160. Each of the indicators has a roll shaped portion 473 formed at its top and a plate 474 has upturned portions 475 secured to the brackets 472, said upturned portions cooperating with the shields 471 to guide the indicators in their upward movement. The operating mechanism for the indicators comprises plates 476, (Figs. 1B, 4, 5, 7 and 9) one of these plates being provided for the front indication, and another for the rear. Each of these plates has a pair of lugs or hooks 477 (Figs. 1B and 4) extending towards each other, arranged to engage within notches 478 formed in the vertical edges and near the tops of the indicators after they are selected. The plates 476 are lowered at the beginning of each operation of the machine so as to lower the elevated indicators into their normal positions in the casings 398. The plates 476 remain in their lowered positions while the indicator carriages are differentially adjusted to bring the notches 478 of the desired indicators into cooperation with the lugs 477 and the plates 476 are then returned to the normal raised positions and by means of the lugs 477, raising the selected indicators and holding them exposed after the end of the registration. As shown in Figures 7 and 9, the plates 476, the roll shaped portions 473 on the indicators, the internal guide plates 475, the outer shields 471 and the grooves 399 (Fig. 40) in the casings 398 all cooperate to hold an indicator in position after it has been raised.

The actuating plates 476 have at each end a tongue 479 (Figs. 3 and 4) formed at right angles to the length of the plate, these tongues being secured to one of two T-shaped plates 480 of which there is one at each end of the machine. These plates 480 have at their lower ends anti-friction rollers 481 engaging vertical guide slots 482 in the adjacent bracket 472 and near their upper ends anti-friction rollers 483 which also fit within the said guide slots 482. A pitman 484 at each end of the machine is pivoted to the corresponding T-shaped plate 480 by studs 485 which also carry the anti-friction rollers 483. The lower end of each pitman 484 is pivoted to an arm 486 fast to the outer side of a gear segment 487 one of which is pivotally mounted upon a stud 488 carried by the left end plate 160 (Fig. 5) the other segment 487 being pivotally mounted on the shaft 199 (Figs. 3 and 11). Each segmental gear 487 meshes with a gear 489 fast upon each outer end of the shaft 362. It will be remembered that the shaft 362 is actuated to operate the transfer mechanism for the totalizers. When this shaft is actuated to drive the cams 363 and lower the links 369, the gears 489 fast thereupon will actuate the segmental gears 487, which, through the pitmans 484, plates 480 and plates 476, will lower whatever indicator targets were supported in raised positions by the preceding operation. This actuation of the shaft 362 takes place previous to the operation of the differential mechanism, so as a consequence the exposed indicator targets are restored within the casings 398 previous to the setting of the carriages by the beams 403. The shaft 362 and consequently the target lifting actuating gear which is held inoperative until after the transfer pawls of the totalizers have been tripped, which occurs near the end of the operation, and subsequent to the setting of the indicator carriages and the restoring of the differential mechanisms, is rotated clockwise (Figs. 3 and 15) to lift the links 369 to effect the transfer operation. This movement of the shaft will, through the target lifting mechanism previously described, raise and hold the newly positioned indicator targets in exposed positions until the next operation of the machine.

In order to summarize the operation of the indicating mechanism to the best advantage a brief statement with reference to a single bank will be given. Almost immediately after the operating mechanism is started the shaft 362 is actuated to actuate the pitmans 484 to draw the front and back indicator actuator plates 476 down, thereby restoring the indicators for the previous registration to their normal positions within the casings 398. The actuator plates remain in lowered positions with the lugs 477 in the same plane with the notches 478 in the edges of the indicators during the first half of the operation. During this time the plate 222 is differentially positioned by the depressed key operating a latch to disconnect the plate from the invariably moved operating mechanism. This positions the pivot 404 carrying one end of the beam 403 and the beam is then adjusted about this pivot by the invariably moved arm 414 and roll 413 to move its center to a constant position. The resulting differential movement of the beam 403 opposite the pivot 404 is transmitted through the link 412 to the sliding front and back indicator carriages for the bank, thereby adjusting the carriages directly from the positions in which they were left at the end of the previous registration to position the indicators corresponding to the key used with their notches in cooperating relation with the lugs 477 on the actuator plates 476. The actuator plates are then returned to their raised positions, lifting the indicators just positioned to expose their indicia.

The Special Counters

In addition to the three lines of totalizers in the rear of the machine there are also provided a series of special counters, one counter for each key in the "Transaction", "Departmental", and "Clerk's" banks. These counters are of the usual step by step type and are arranged to add one during each operation in which its associate key is depressed, except during total and sub-total operations, at which time the mechanism for operating said counters is made inactive through the total lever 75. These special counters are like the ones illustrated and fully described in the Letters Patent of the United States, No. 1,394,256 granted to the applicant, on Oct. 18, 1921, and therefore, but a brief description will be given herein.

The counters are arranged in three banks, one bank of five counters adjacent the Transaction bank 72, one bank of nine counters adjacent the Departmental bank 73, and one bank of nine counters adjacent the Clerk's bank 74 as is illustrated in Fig. 1B. As all of these banks of counters are alike except for the number of counters therein, the bank associated with the departmental bank of keys 73 will be described.

These counters are mounted on shafts 490 (Figs. 37, 38 and 39) which are rotatably mounted in a U-bar 491 fast to a frame 492 which is similar to the key frames 76. These frames 492 are mounted upon the cross rods 77 and may be detached from the machine like the banks of keys heretofore described.

Mounted upon the shaft 490 is a frame 493 (Fig. 39) which carries a differentially tined feeding pawl (not shown) which cooperates with ratchets 494 secured to counter wheels 495. Pivotally fastened to the frame 493 is a link 496 having its other end pivoted to a stud 497 carried by a slotted link 498. This slotted link is also supported by a pin 499 carried by the frame 492. The stud 497 fits within a slot 500 made in the plate 501 carried by two arms 502 pivoted upon the frame 492.

The numbers on the counter wheels 495 are visible through slots 503 (Fig. 1B)

formed in a cover-strip 504 (Fig. 39) secured to the frames 492.

The lower end of each plate 501 is bifurcated at 505 to receive a stud 506 (Fig. 37) carried by a lever 507 made integral with a hub 508 pivotally mounted upon a shaft 509 mounted in the end frames 160. Also integral with the hub 508 is a split arm 510 which straddles a pitman 511 and carries a stud 512 that fits within a slot 513 formed in said pitman. The rear end of the pitman 511 is bifurcated at 514 to surround a shaft 515 rotatably mounted in the end frames 160. Mounted upon the pitman 511 is an anti-friction roller 516 which fits within a cam race 517 formed in a disk 518 that is fast upon the shaft 515. The shaft 515 is the printer cam shaft and therefore the means for driving this shaft will be described when the printer mechanism is taken up, it being sufficient to state here that this shaft receives one counter-clockwise rotation (Fig. 37) during each adding operation of the machine.

At the proper time during the rotation of the shaft 515 the pitman 511 is moved forward causing the arms 510 and 507 to be oscillated in a clockwise direction. This clockwise oscillation of said arms causes the plates 501 to be moved downward, whereby the links 496 and 498 (Fig. 39) through the engagement of the stud 497 with the slot 500, are straightened out.

Pivoted upon the shaft 159 is an arm 521 the upper end of which engages the stud 408 carried by the plates 409 associated with said banks.

It will be remembered from the previous description that the plates 409 are differentially positioned, through the beam 403, commensurate with the key depressed. Therefore, from the construction just described it will be readily seen, (Fig. 39) that the arm 521 will be differentially positioned. Integral with the arm 521 is a forwardly extending finger 522 which lies in the same vertical plane as the links 498.

As the plate 409 and arms 521 are differentially positioned the finger 522 is positioned directly in the rear of one of the links 498, according to whichever key has been depressed. As the links 496 and 498 are straightened out, as previously described, they have no effect upon the special counters except the one which happens to be directly in front of the differentially positioned finger 522. In this case as the links 496 and 498 are straightened out, instead of the link 498 sliding rearwardly on the pin 499 it will strike the finger 522 thereby causing link 496 to be moved forward whereby the frame 493 is given a counter-clockwise movement (Fig. 39) which causes its differentially tined pawl (not shown) to engage the ratchet 494 and move said ratchet and counter wheel one step.

As previously stated these special counters are operated only during adding operations. The mechanism for disabling them during total and sub-total operations will now be described and comprises, the lever 523 (Fig. 1B, 37, 71 and 72) which is fast upon the shaft 186. Pivotally mounted on the forward end of the lever 523 is a link 524 having its lower end pivotally fastened to the pitman 511.

It will be remembered from the previous description that when the total lever 75 (Fig. 10) is moved either up or down the shaft 186 and lever 523 are moved clockwise to lift the link 524 and rock the pitman 511 to disengage its slot 513 from the stud 512, carried by the split arm 510. From this description it will be readily seen that when the disc 518 is rotated, through total and sub-total operations the pitman 511 will be operated the same as during adding operations but as it is disconnected from the arm 510 no movement will be imparted to said arm to operate the plates 501 which control the special counter adding operations.

Before the pitman 511 is entirely disengaged from the arm 510 a slot 525, formed in the rear end of the lever 523 engages a pin 526 carried by the arm 507, associated with the clerks' bank of keys, thereby holding all three of the arms 507 and the arm 510 in perfect alignment, until the pitman is again engaged with the stud 512.

The special counters are turned to zero through the discs 527 (Figs. 1B and 37) secured to the shafts 490 in a manner well known in the art.

THE PRINTING MECHANISM

As before stated, the machine as illustrated is provided with a printing mechanism adapted to print upon a detail strip, a check or receipt and also upon an inserted slip or other paper.

The means for driving the printing mechanism will be described first and includes, a gear 530 (Figs. 6 and 10) fast upon the cam shaft 65 and meshing with a gear 531 (Figs. 10, 62, 71 and 72) loose on the printer cam shaft 515. Pivotally mounted on the side of the gear 531 is a pawl 532 which engages the forward edge of a flange 533 integral with a hub 534 fast to the shaft 515.

The pawl 532 is held in engagement with the flange 533 by a spring 535 which is stretched between the lower end of said pawl and a retaining pawl 536 also pivotally mounted to the side of the gear 531.

From the foregoing description it will readily be seen that as the cam shaft 65 is rotated in a clockwise direction (Fig. 10) the gear 531 will receive a counter-clockwise rotation through its engagement with the gear 530. The counter-clockwise rotation of the gear 531 by means of the pawl 532, flange 533 and hub 534, causes the shaft 515 to receive said counter-clockwise rotation. The shaft 515 is prevented from overthrow by means of the retaining pawl 536 which, (Figs. 10, 71 and 72), engages the rear edge of the flange 533 which, as previously stated, is integral with the hub 534.

The printing mechanism (Fig. 53), is provided with two lines of type wheels, the upper line arranged to print on the check and detail strip and the lower line arranged to print on the slip provided there has been one inserted to receive an impression, otherwise the lower type line is made inactive as will be hereafter described.

Figure 53:
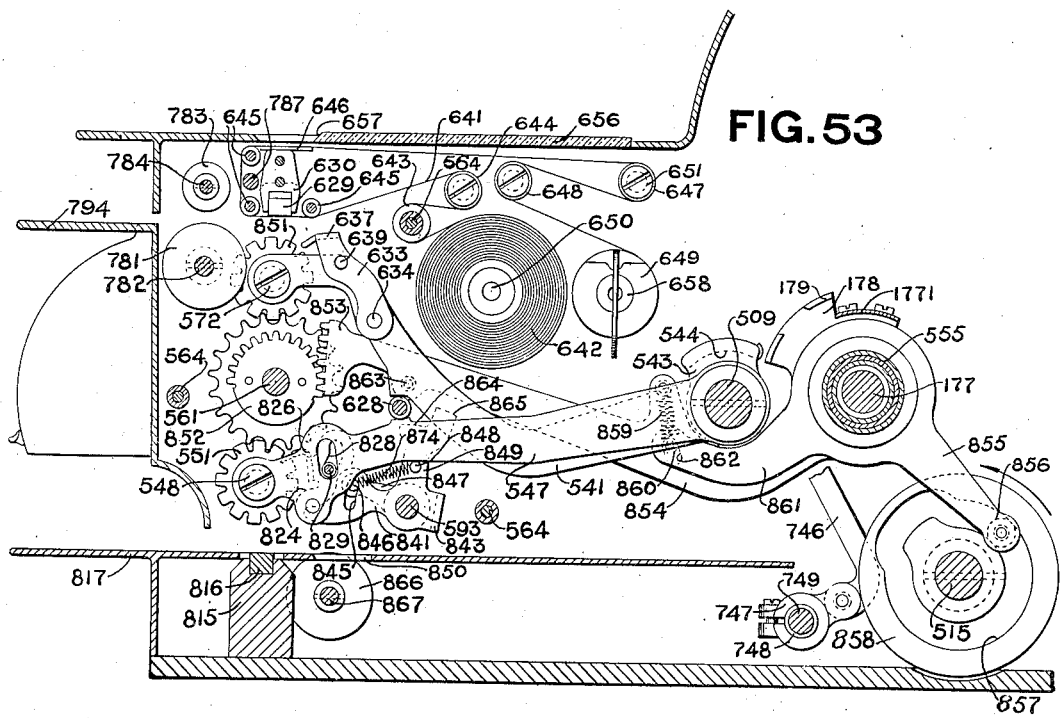
Figure 53 is a vertical sectional view taken on the line 53—53 of Figure 45 and looking in the direction indicated by the arrows.

The type wheels of the upper type line are rotatably mounted upon a shaft 539 (Fig. 56) having one end riveted to an arm 540 and having its other end projecting into an arm 541 (Fig. 53). The end of the shaft 539 which projects into the arm 541 is tapped out to receive a screw 572 whereby the forward end of the arms 540 and 541 are held in lateral alignment. The arms 540 and 541 are secured to arms 542 (Figs. 45, 56 and 62) and 543 (Figs. 45, 53 and 62), respectively. These arms 542 and 543 are pivotally mounted upon the shaft 509 and are integral parts of a yoke 544.

The lower set of type wheels (Fig. 53) is rotatably mounted upon a shaft 545 having one end riveted to an arm 546 (Figs. 47, 58 and 62) and having its other end projecting into an arm 547 (Figs. 47, 53 and 62). The end of the shaft 545 which projects into the arm 547 is tapped out to receive a screw 548 so that the forward end of the two arms and the type wheels will be held in lateral alignment. The arms 546 and 547 are fast upon the shaft 509, as viewed in Fig. 62. The type wheels on both the upper and lower shafts 539 and 545 respectively are held in lateral alignment by means of suitable spacing collars 549, as is illustrated in Figs. 45 and 47.

On the upper and lower type lines is a series of nine amount type wheels 550 arranged to print the amount. There are also in each of the type lines three type wheels 551 which print the clerk's initial department and transaction.

Figure 54:
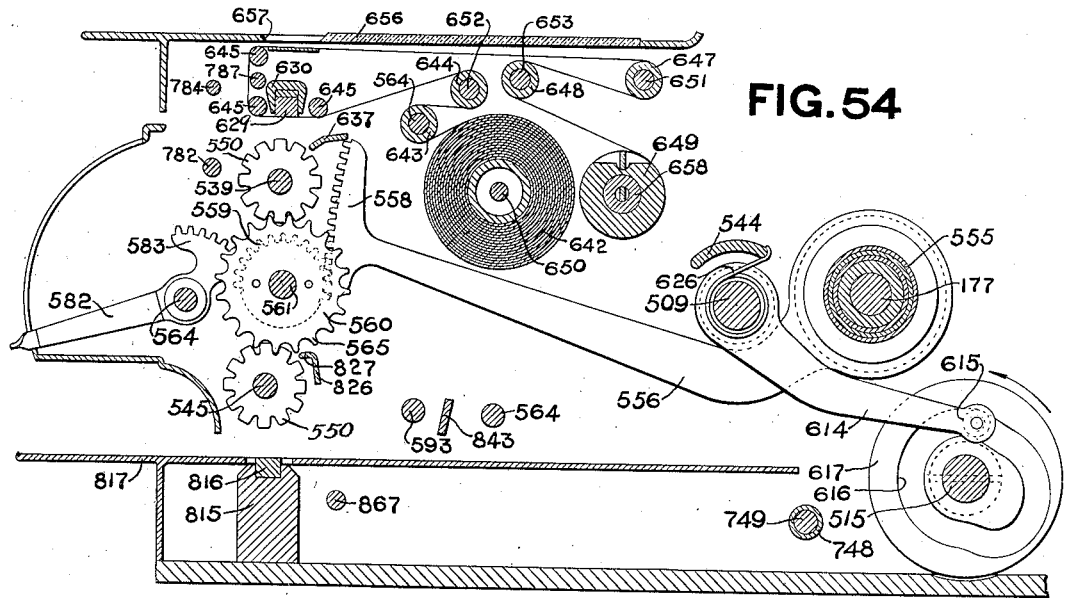
Figure 54 is a vertical sectional view taken on the line 54—54 of Figure 45 and looking in the direction indicated by the arrows.

The means for differentially positioning these type wheels, commensurate with the keys depressed will now be described. Each of the plates 409 (Figs. 7 and 9) associated with the amount, Transaction, Departmental and Clerks' banks, is provided with teeth 552 which mesh with teeth formed on the upper extending portion of L-shaped levers 553 secured to hubs 554 (Figs. 43 and 45) loosely mounted upon the shaft 177. Connected to the hubs 554, except the ones associated with the units and tens of cents bank, by mortice and tenon connection, is a series of nested sleeves 555 which are secured at their other ends to arms 556 (Figs. 43 and 54). The hubs 554 of the L-shaped levers 553, associated with the units and tens of cents bank, are connected directly to the arms 556 (Fig. 43). Due to the construction of the sleeves 555 and hubs 554, it is necessary for the levers 553 to extend through the sleeves 555, and therefore said sleeves are provided with openings 557 which are of sufficient length and width to allow for the actuation of the levers 553 and also to allow said levers and their hubs 554 to be readily assembled in the following manner.

Referring to Fig. 43, first the shaft 177 is slipped through the hub 554 on the extreme left hand lever 553 and then the outside sleeve is connected to the hub 554 by its mortice and tenon connection (Fig. 45). Then the second lever 553 and its hub 554 are slipped through the opening 557 in the first hub 554 after which the shaft 177 is moved to the right so that it goes through the hub 554 of the second lever 553. Then the next smaller sleeve 555 is slipped inside of the outside one and connected to the second hub 554 through their mortice and tenon connections. Then the third lever 553 counting from the left and its hub 554 is slipped through the openings 557 in the two outside sleeves 555 which have been assembled, and the shaft 177 is moved a little farther to the right so that it projects through the third hub 554. Then the third sleeve 555 is slipped inside of the second sleeve and by their mortice and tenon connections connected to the third hub 554. This is continued until the seventh lever 553 from the left hand end is on the shaft 177, after which the eighth and ninth levers 553 and their hubs 554 are assembled. The lever 959 and the tenth, eleventh and twelfth levers 556 and their respective hubs are then assembled on the shaft 177. The three sleeves 555 carrying the levers 553 and 958 are then assembled off from the shaft and all slipped on at once, the lever 855 being slipped on the largest of the three sleeves 555 before they are put on the shaft. Finally the collar at the extreme right hand end is pinned in position and then the collar at the extreme left hand end is pinned in position. Each of the arms 556 has integral therewith a segment 558 (Fig. 54) which meshes with a small segment 559 secured to the side of a disc 560 which is rotatably mounted upon a shaft 561, rotatably mounted at its left hand end, as viewed in Fig. 47, in a frame 562 and at its right hand end in a plate 563 supported by three studs 564 secured to the frame 562. The discs 560 are provided with teeth 565 which mesh with the type wheels 550 and 551 on both the upper and lower type lines, as is plainly illustrated in Fig. 54.

From the foregoing description it will be seen that as the plates 409 are positioned, the L-shaped levers 553 will also be positioned. The positioning of the L-shaped levers 553, through their associated hubs 554 and sleeve 555, cause the arms 556 to be rocked counter-clockwise, as viewed in Fig. 54, whereby the type wheels 550 and 551 of both type lines are differentially positioned to set up the amount, transaction, department and clerk's initial so that they may be printed upon the check and detail strip and slip as will be later described.

The date wheels and means for setting them so that the date may be printed upon the check and slip will now be described.

Figure 57:
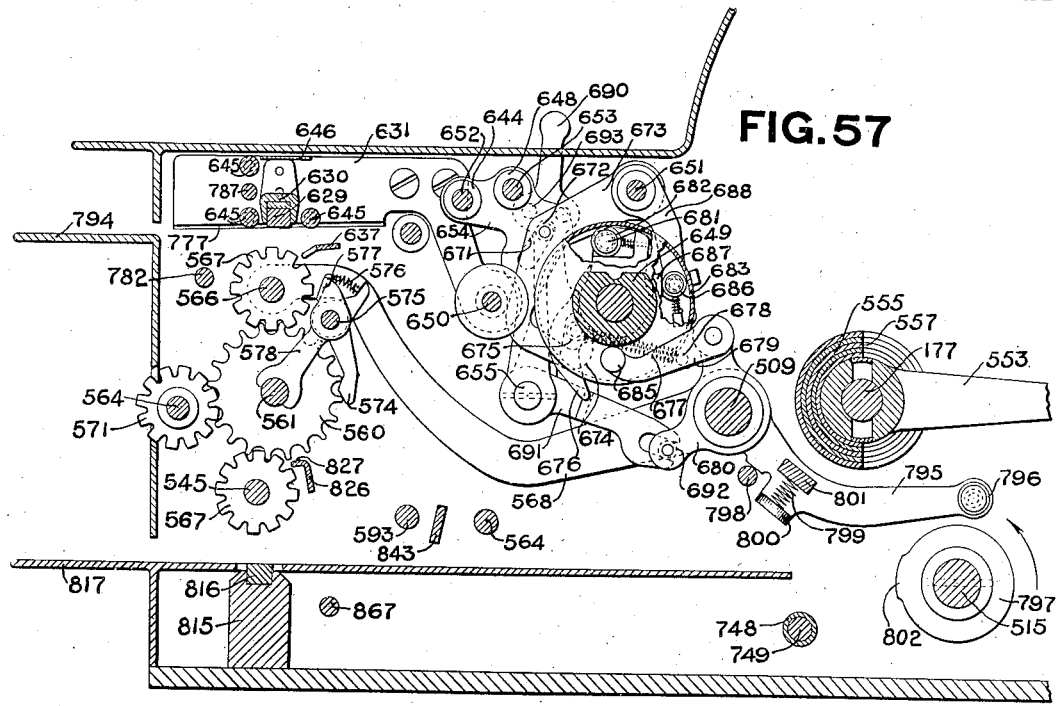
Figure 57 is a vertical sectional view taken on the line 57—57 of Figure 45 and looking in the direction indicated by the arrows.

Rotatably mounted upon a stud 566 and in axial alignment with the type wheels 550 of the upper line of type is a set of date type wheels 567 (Figs. 47 and 57). The stud 566 is carried by the forward end of a lever 568 which is rotatably mounted upon the shaft 509. Loosely mounted upon the shaft 545 of the lower line of type is another set of date type wheels 567 which are for the purpose of printing upon an inserted slip to be hereafter described. Loosely mounted upon the shaft 561 and meshing with both sets of date wheels 567 are four toothed discs 560. Meshing with the discs 560 is a set of date setting wheels 571 (Figs. 45, 47 and 57) loosely mounted upon the forward stud 564. The date wheels 571 are held in lateral alignment by means of collars 573 secured to the stud 564, as is illustrated in Figs. 45 and 47. These wheels 571 project through the front of the cabinet (as viewed in Figs. 44 and 57) so that they may be readily turned by the operator with the use of a stylus or other similar instrument.

The date type wheels and the date setting wheels are held in alignment by means of pawls 574 (Fig. 57) loosely mounted upon a stud 575 carried by the frame 562. These pawls are held in engagement with the disks 560 by means of springs 576 which are compressed between the tails of the pawls 574 and projections on a yoke 577 mounted upon the stud 575. One side of the yoke 577 is provided with an arm 578 bifurcated at its lower end to fit the shaft 561 (Figure 57) for the purpose of preventing the yoke 577 turning on the stud 575 under the influence of the springs 576.

Figure 55:
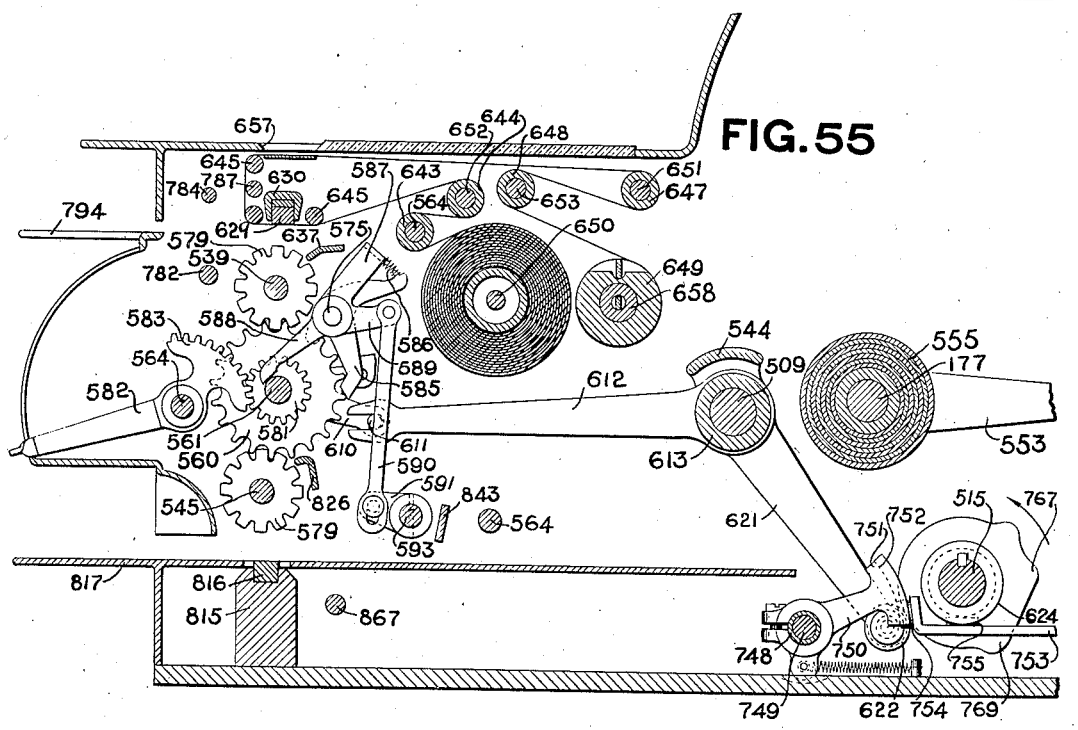
Figure 55 is a vertical sectional view taken on the line 55—55 of Figure 45 and looking in the direction indicated by the arrows.

The ledger number type wheels and means for setting same includes, two sets of type wheels 579 (Figure 55) one set being rotatably mounted upon the shaft 539 and the other set being rotatably mounted upon the shaft 545. Meshing with both sets of type wheels 579 is a set of toothed disks 560 (Figures 47 and 55) which are rotatably mounted upon the shaft 561 and have secured to their sides pinions 581. Loosely mounted upon the forward stud 564 are levers 582 having integral therewith segments 583 which mesh with the pinions 581. The levers 582 are laterally spaced on the stud by their hubs, as viewed in Figures 45 and 47. The levers 582 project through slots 584 (Figure 44) made in the front of the cabinet. Inscribed at the left of each of the slots 584 are the integers zero to nine which are for the purpose of showing the operator where to stop the levers to set any desired number.

From the foregoing it will be seen that as the levers 582 are manually moved upward in the slots 584 the desired number will be directly set upon the type wheels 579 on both the upper and lower type lines.

As will be hereinafter described the upper and lower type lines are moved out of engagement with the disks 560 to print upon the check, detail strip and slip, and therefore, it is necessary to provide means whereby the levers 582 will be maintained in their proper positions after having been set because if said levers should be moved after the type lines have been disengaged from the disks the relation between the integers on the cabinet (Figure 44) and the characters on the ledger number type wheels 579 would be changed and the next time the levers were positioned to print the ledger number, the number printed would not correspond to the number set up. To prevent any such movement of the levers 582 there is provided a positive aligning mechanism which comprises, (Figure 55) pawls 585, loosely mounted upon the stud 575, held in engagement with the toothed disks 560 by means of springs 586 compressed between the tails of the pawls and projections formed on a yoke 587 integral with arms 588 and 589. The arm 588 normally lies against the shaft 561 and acts as a retainer for the yoke 587 so that it will not be oscillated under the influence of the springs 586. Pivotally mounted on the arm 589 is a link 590 having at its lower end a slot and pin connection with an arm 591 (Figures 55 and 62) fast upon a shaft 593 mounted in the frame 562 and the plate 563. Also secured to the shaft 593 is an arm 594 (Figures 59 and 62) which fits within the bifurcated end of a lever 595 pivotally mounted upon the shaft 509. The rear end of the lever 595 carries an anti-friction roller 596 which fits within a cam race 597 formed in the side of a disk 598 fast upon the printer cam shaft 515.

Figure 59:
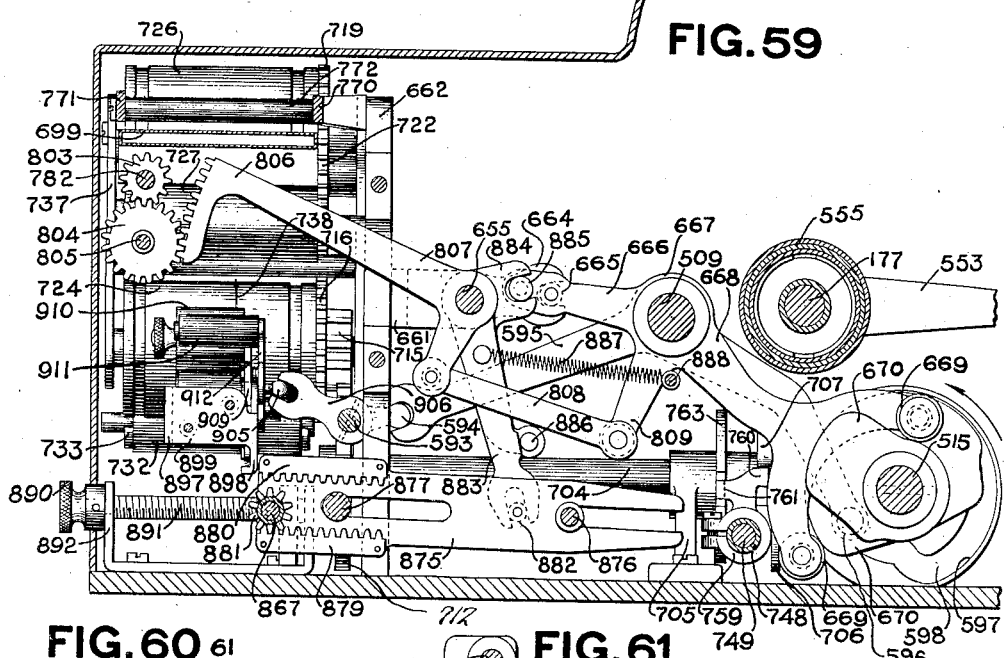
Figure 59 is a vertical sectional view taken on the line 59—59 of Figure 45 and looking in the direction indicated by the arrows.

The timing of the cam race 597 is such that just before the type lines are disengaged from the actuating disks, as previously mentioned, the lever 595 will be given a clockwise movement (Figures 46 and 59). This movement of the lever 595 causes the arm 594, shaft 593 and arm 591 to receive a counter-clockwise movement which causes the link 590 to be moved downward whereby the arm 589 and yoke 587 are rocked in a clockwise direction until the projections on said yoke engage the tails of the pawls 585 thus locking said pawls into engagement with the actuating disks 560 until the type lines have again been engaged with said disks.

During the setting of the ledger number type wheels by the levers 582 the pawls 585 bob up and down on the disks 580 but do not cause any movement of the yoke 587 or the bell crank 589 as there is ample clearance between the tails of the pawls and the projections on the yoke.

As previously stated, the machine is provided with a consecutive numbering device which will now be described. Loosely mounted upon the shafts 539 and 545 are two sets of consecutive number type wheels 599, as is illustrated in Figures 47 and 56.

Meshing with these type wheels are toothed disks 560 each of which has secured to its side a ratchet 601 engaged by a retaining pawl 602. The engagement of the pawl 602 with the ratchet is maintained by means of a spring 603 compressed between the tail of the pawl and a projection formed on a yoke 604 integral with an arm 605 and pivoted upon the stud 575. The arm 605 is bifurcated at its lower end to fit the shaft 561 thereby preventing the yoke 604 from being moved under the influence of the springs 603.

Figure 56:
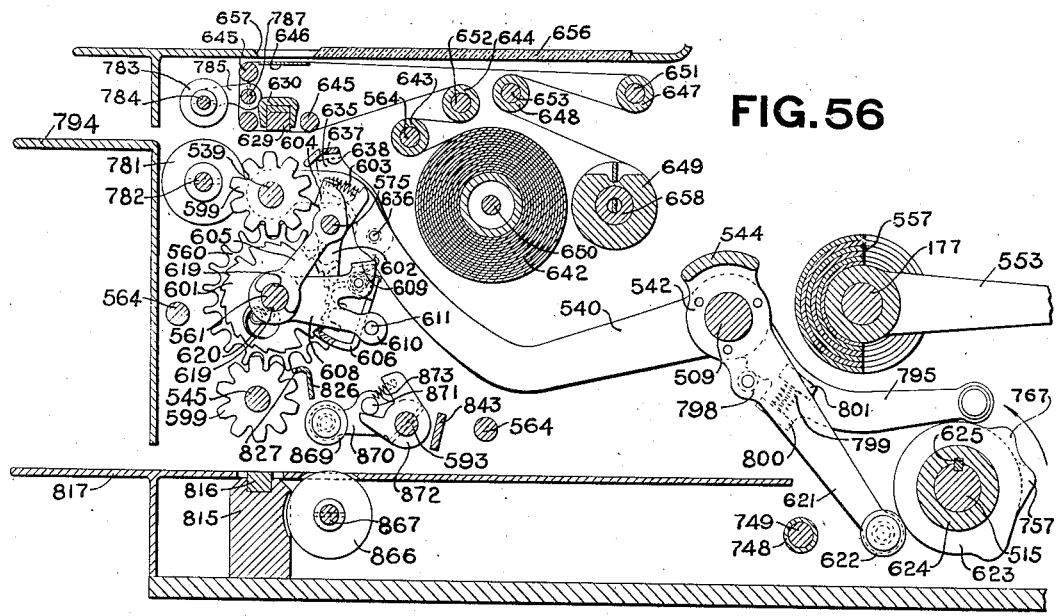
Figure 56 is a vertical sectional view taken on the line 56—56 of Figure 45 and looking in the direction indicated by the arrows.

The consecutive number ratchets 601 and disks 560 are operated step by step by a spring pressed differentially timed pawl 606 pivotally carried by a yoke 609 comprising arms 607 and 608 which are pivotally mounted upon the shaft 561 (Figures 45 and 56). Integral with the arm 608 is an arm 610 which carries a stud 611 (Figures 55 and 62) which engages the bifurcated end of an arm 612 secured to one end of a hub 613 loosely mounted upon the shaft 509. Secured to the other end of the hub 613 is an arm 614 (Figures 54 and 62) carrying an anti-friction roller 615 which fits within a cam race 616 formed in the side of a disk 617 secured to the printer cam shaft 515.

From this description it will be seen that when the cam shaft 515 is rotated in a counter-clockwise direction, as viewed in Figure 54, the arm 614, hub 613 and arm 612 will, through the engagement of the roller 615 with the cam race 616, receive first a counter-clockwise movement and then a clockwise movement. The counter-clockwise movement of the arm 612 causes the yoke 609 to be rocked in clockwise direction a distance sufficient to cause the pawl 606 to advance the ratchet 601 and units disk 560 one step. As the disk 560 is advanced one step it causes the units wheel of each of the consecutive number sets of type wheels 599 to be advanced one step. The ratchet 601 and disk 560 are prevented from any retrograde movement by the engagement of the retaining pawl 602 with said ratchet.

The mechanism for turning the consecutive number type wheels to zero includes a knurled disk 618 (Figures 47 and 52) which is secured to the extreme right hand end of the shaft 561. The shaft 561 is provided with two notches 619 (Figure 56) which are of a length sufficient to extend slightly beyond the two outside disks 560 for the type wheels 599. Each of the said disks has pivotally mounted upon the side thereof a spring pressed pawl 620. The reason for the two notches 619 in the shaft is that the said disk 560 has 20 teeth whereas the type wheels have only 10 type characters. Therefore, it is necessary in order to add properly upon the consecutive number type wheels and also in order to give them only one rotation while resetting to provide the ratchet 601 with two sets of teeth (Figure 56). By turning the knurled disks 618 one-half rotation in a clockwise direction the notches 619 will pick up the pawls 620 and bring them to zero positions thereby turning the disks 560 and type wheels 599 to their zero positions.

PRINTING IMPRESSION MEANS

As previously stated instead of having the platen forced against the type in order to print, the platen is stationary and the type lines are moved against the platen. Due to the fact that the mechanism for controlling the movement of the upper type line is shown in the position for printing only on the detail strip, said mechanism will now be described as performing only this particular function.

It will be remembered that the type wheels 550, 551, 579 and 599 of the upper type line, for printing the amounts, transaction, department, clerk's initial, ledger number and consecutive number, respectively, are carried by the parallel arms 540 and 541 which, as previously described, are secured to the arms 542 and 543 of the yoke 544. Integral with the arm 542 (Figures 56 and 62) is a downwardly extending arm 621 which carries an anti-friction roller 622 cooperating with a plate cam 623 secured to a hub 624 which is secured to the printer cam shaft 515 by means of a key 625. The roller 622 is held against the plate cam 623 by means of a torsion spring 626 (Figures 54 and 62) which has one end in engagement with the rear edge of the yoke 544 and has its other end secured to a collar 627 fast upon the shaft 509. In addition to holding the roller 622 against the plate cam 623 the spring 626 also causes the arm 541 to be held against a stud 628 (Figure 53) supported by the frame 562. The stud 628 prevents the type wheels from wedging in the actuating disks 560.

From this description it will be readily ascertained that, during the rotation of the printer cam shaft 515, when the high portion of the plate cam 623 engages the roller 622 it causes the arm 621 and consequently the arms 540 and 541 to be rocked in a clockwise direction whereby the type wheels, carried by said arms 540 and 541 are moved into engagement with a resilient platen 629 carried by a U-bar 630 supported at one end to the plate 563 and at its other end to a plate 631 (Figures 45, 47 and 57) mounted upon two studs 632 carried by the frame 562. As will be hereinafter described, the detail strip lies against the under side of the platen 629, and therefore, as the type wheels are pressed against said platen the consecutive number, ledger number, amount, clerk's initial, department and the character of the transaction are printed upon the detail strip.

TYPE WHEEL ALIGNING DEVICES

Figure 52:
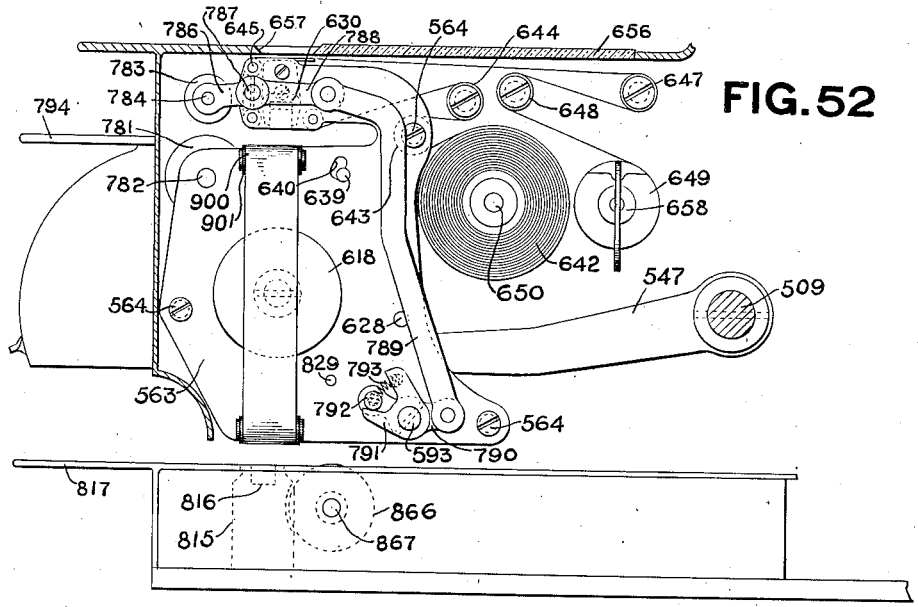
Figure 52 is a right hand elevation of the printing mechanism, the cabinet being broken away to more clearly show the parts.

The mechanism for aligning the type wheels 550, 551, 579 and 599 includes (Figures 45, 53 and 56) an arm 633 pivotally mounted at 634 to the side of the arm 541, and an arm 635 pivotally mounted at 636 to the side of the arm 540. Integral with the arm 633 is an aligning bar 637 having its other end secured to a formed over portion 638 of the arm 635. Projecting laterally from the arm 633 is a pin 639 which normally projects through the lower end of an L-shaped slot 640 formed in the plate 563 (Figure 52).

From the foregoing description it will be readily understood that as the arms 540 and 541 are rotated in a clockwise direction at the very beginning of said movement the pin 639 is moved from the lower part of the L-shaped slot 640 into the vertical portion of said slot, consequently causing the arms 633 and 635 to be rocked about their pivots 634 and 636 respectively, whereby the aligning bar 637 engages all of the type wheels on the upper type line just before said type wheels are disengaged from their actuating disks, thereby causing all wheels to be retained in their proper positions while printing and until they are again engaged with their actuating disks.

DETAIL STRIP MECHANISM

The detail strip and autographic features and the mechanism for shifting and feeding the detail strip will now be described.

A detail strip 641 is fed forward from a supply roll 642 (Figure 53) underneath a roller 643, passed back over the top of said roller and underneath a roller 644, forward over the top of said roller, underneath two rollers 645 and the platen 629, upward over another roller 645, rearward over the top of an autograph table 646 and then over the roller 647, forward under said roller and over the top of a roller 648 and downward and rearward and wound on a receiving roll 649 (Figs. 57, 76 and 77). The supply roll 642 is loosely mounted upon a stud 650 secured to the frame 562. The roller 643 is loosely mounted upon the upper stud 664 and said stud is carried by the plate 562 as previously described. The roller 647 is loosely mounted upon a stud 651 carried by the frame 562. The rollers 644 and 648 are loosely mounted upon studs 652 and 653, respectively, that are carried by the upper end of an arm 654 (Figure 57) mounted fast upon a shaft 655. The studs 645 are mounted to rotate freely in the plates 631 and 563 (Fig. 47). The receiving roll 649 is rotatably mounted upon a stud 658 carried by the frame 562.

The detail strip is visible to the operator between the roller 647 and the upper roller 645, through a transparent plate 656. At the forward edge of the plate 656 an opening 657 is formed in the cabinet, said opening being for the purpose of making autographic notations on the detail strip.

A fragmentary portion of the detail strip is illustrated in Figure 65. The first line of printing beginning at the left represents first the consecutive number, next the ledger number "1720", next the amount "$16.25". The next letter "A" represents the clerk. The next two letters "MT" represents the department which in this case is meat. The next three letters "CHG" represents a "Charge" sale and the last letter "S" represents that a slip was printed upon for this transaction. The words "S. Green & Co." illustrate an autographic notation for the first printed item. The star illustrated at the end of the next line of printing represents that this transaction was a cash transaction. The letters "PdO" at the end of the third line of printing represents the transaction was a "Paid out" transaction. The letters "RCD" at the end of the fourth line of printing represent that this transaction was money "Received-on-account". It will be noticed that at the ends of the second, third and fourth lines of printing that there is no "S" which signifies that no slip was printed upon for either of these three transactions.

The mechanism for shifting and feeding the detail strip will now be described and includes, the arm 654 (Figs. 57 and 77) secured to the shaft 655 which is rotatably mounted at its left end in an L-shaped bracket 661, (Figure 62) secured to a vertical frame 662, and at its right hand end in a bushing 663 in the frame 562. Also secured to the shaft 655 is an arm 664 (Figures 45, 59 and 62) which is bifurcated to receive a stud 665 carried by the forward arm 666 of a three armed lever 667 rotatably mounted upon the shaft 509. The rearwardly extending arm 668 of the three armed lever 667 is Y-shaped and carries two anti-friction rollers 669 which cooperate with a double plate cam 670 secured to the printer cam shaft 515 (Figures 59 and 62).

The arm 654 (Figures 57 and 77) is provided with a slot 671 which engages a pin 672 carried by an arm 673 rotatably mounted upon the stud 651. The lower end of the arm 673 is provided with a hook 674 which engages a pin 675 carried by a lever 676 that is rotatably mounted upon the receiving roll stud 658. The pin 675 is held in engagement with the hook 674 by a coil spring 677 stretched between said pin 675 and a stud 678 carried by an arm 679 (Figs. 76, 77 and 78) pivotally mounted to the upper end of a bell crank 680 rotatably mounted on the shaft 509. The upper end of the lever 676 carries a stud 681 upon which is very loosely mounted an anti-friction roller 682 which engages the inner edge of a drum 683 secured to the receiving roll 649, and also an edge 684 formed in the lever 676.

From the foregoing description it will be seen that at the proper time during the rotation of the printer cam shaft 515, the plate cams 670 through the engagement of the roller 669 therewith cause the arms 668 and 666 of the three armed lever 667, to be rocked first in a counter-clockwise direction and then in a clockwise direction, as viewed in Figure 59. The counter-clockwise movement, through the engagement of the stud 665 with the bifurcated arm 664 causes said arm and the shaft 655 to be rocked in a clockwise direction thereby causing the arm 654 to be rocked likewise. It will be remembered that the studs 652 and 653 and rollers 644 and 648 are carried by the arm 654, and consequently when said arm is rocked in a clockwise direction (Figs. 57 and 77) the last mentioned rollers and studs will be moved rearward thereby causing a slack in the detail strip 641 between the rollers 647 and 648 (Fig. 56) which is taken up by the rearward movement of the roller 644. This movement is sufficient to cause the detail strip to be shifted so that the last printing line on said strip which is visible just back of the forward edge of the transparent plate 656, will be moved around to a position close to the lower forward roller 645, so that the new print will be properly spaced therefrom.

During the clockwise movement of the arms 666 and 668 the arm 663 and shaft 655 are rocked in a counter-clockwise (Fig. 77) direction whereby the rollers 644 and 648 are returned to their normal positions which causes the printing to be exposed to view through the opening 657.

As the arm 654 is rocked clockwise, as previously mentioned, the arm 673, through the engagement of the slot 671 and pin 672, is rocked in a counter-clockwise direction, whereby the lever 676 under the influence of the spring 677 is rotated in a counter-clockwise direction until said lever engages the arm 1679, said arm and lever being in the same plane (Figs. 45 and 78). During this movement of the lever 676 the roller 682 carried thereby performs no function. During the counter-clockwise movement of the arm 654 the arm 673 is rocked in a clockwise direction whereby the lever 676, through the engagement of the hook 674, integral with the arm 673 with the stud 675 carried by said lever, is rocked in a clockwise direction. This movement of the lever 676 causes the roller 682 to become slightly wedged between the drum 683 and the edge 684 of said lever, and consequently the drum 683 and receiving roll 649 to which it is secured are rocked in a clockwise direction and cause the detail strip to be wound upon said receiving roll. The distance which the detail strip is fed at this time is sufficient to cause the last print to be moved from its shifted position at the opening 657 to a position just underneath the forward edge of the transparent plate 656 so that an autographic notation may be made upon said strip before the next printing takes place.

Should there be any tendency of the roller 682 to revolve the drum 683 in a counter-clockwise direction during the counter-clockwise movement of the lever 676, such movement would be prevented by an anti-friction roller 686, carried by an arm 688, which would have a tendency to move upward and become wedged between the drum 683 and a portion 687 of the arm 688. The arm 688 is loosely mounted on the stud 651.

The mechanism for predetermining the distance which the detail strip is to be fed will now be described and includes a lever 690 (Figs. 57, 62, 76, 77 and 78) rotatably mounted upon the shaft 655. Also loosely mounted upon the shaft 655 is an arm 691 fastened to the lever 690 so that it moves in unison therewith. The arm 691 is bifurcated to receive a pin 692 carried by the lower arm of the bell crank 680. The lever 690 is retained in position by means of a pin 693 carried by the frame 562, which extends slightly within one of two holes in the lever 690.

As viewed in Figures 57 and 77 the parts just described are shown in position so that the detail strip will be fed so that the autographic feature cannot be used. However, it will readily be seen that if the lever 690 is moved forward to the position shown in Fig. 76 that the arm 691 will be rocked counter-clockwise thereby causing the bell crank 680 to be rocked in a clockwise direction. This clockwise movement of the bell crank 680 causes the arm 1679 to be moved rearward so that, when the lever 676 is rotated counter-clockwise as previously described it will travel a greater distance before engaging said arm, therefore when said lever is again rocked in a clockwise direction the movement of the drum 683 will be increased accordingly, thus allowing space for an autographic notation upon the detail strip such as is illustrated in Figure 65.

Also pivoted to the upper end of the bell crank 680 and rigid with the arm 1679 is an arm 679 (Figs. 76, 77 and 78) carrying a roller 685 bearing against the roll 649. The diameter of the roll of paper on the roller 649 increases as the paper is wound thereon and causes the arms 679 and 1679 to rock counter-clockwise. This is to maintain the same relative distance between the lever 676 and the arm 1679 so that the distance between the printing on the strip will be substantially constant regardless of the increasing diameter of the roll of paper on the roller 649.

RECEIPT FEEDING AND PRINTING

As before stated the machine is designed to issue checks or receipts. The mechanism for feeding the receipt paper, printing of the receipt and cutting off of the same will now be described. The receipt paper is fed from a supply roll 695 (Figures 47 and 49) loosely mounted upon a stud 696 carried by the frame 662, upward through the guides 697, 698, 699 and 700 respectively.

The means for driving the feeding mechanism includes a beveled gear 701 (Figure 62) fast to the printer cam shaft 515. The gear 701 meshes with a gear 702 integral with a hub 703 which is loose upon a shaft 704 rotatably mounted in the frame 662 and a bracket 705 secured to the base. Integral with the hub 703 is a disk 706 (Figures 2 and 62) which has pivotally mounted upon the side thereof a driving pawl 707 and a retaining pawl 708. These pawls are held in engagement, by a spring 709 stretched between said pawls, with a flange 710, integral with a sleeve 711 secured to the shaft 704. Secured to the forward end of the shaft 704 is a mutilated driving gear 712 having teeth 713 on part of its periphery as illustrated in Figures 48 and 49. The remaining portion of the periphery of the gear 712 is normally in engagement with a locking face 714 of a driven pinion 715 secured to the side of a gear 716 loosely mounted upon a stud 717 carried by the frame 662. The gear 716 meshes with an intermediate pinion 718 which in turn meshes with another pinion 719 the two pinions being loosely mounted upon studs 720 and 721 respectively, also carried by the frame 662. The pinion 719 meshes with a gear 722 loosely mounted upon a stud 723 carried by the frame 622. The studs 717, 720, 721 and 723 are supported at their outer ends by a plate 737 which is secured to the above mentioned studs.

Loosely mounted upon the stud 717 and secured to the side of the gear 716 is an electro roll 724. The stud 720 carries an eccentric which supports an impression roller 725, made of rubber or other resilient material, which cooperates with the electro on the roll 724. Loosely mounted upon the stud 723 is an electro roll 726 which is secured to the side of the gear 722. Cooperating with this electro roll is a resilient impression roll 727 supported by an eccentric on a stud 728 carried by the frame 662, said stud being supported at its outer end by the plate 737. For the purpose of adjusting the impression rolls 725 and 727 each eccentric has secured thereto an arm 729 (Fig. 51) which lies adjacent the plate 737. Each arm 729 is provided with a screw 730 which projects through slots 731 formed in the plates 737. Due to the fact that the impression rolls are supported by eccentrics mounted upon their studs, by shifting the arm 729 radially in the slot 731 any desired impression may be obtained against the electro rolls 724 and 726.

From the foregoing description it will be seen that, when the printer cam shaft 515 is given a counter-clockwise revolution, the gear 702 and disk 706 will be rotated in a counter-clockwise direction. The counter-clockwise rotation of said disk, through the engagement of the pawl 707 with the flange 710 of the hub 711 causes the shaft 704 to receive said counter-clockwise revolution. The sleeve 711 and consequently the shaft 704 are prevented from overthrow movement by means of the retaining pawl 708 which (Figure 2) is in a position to positively retain the flange 710 of the sleeve 711. The counter-clockwise rotation of the shaft 704 causes the disk 712 to receive said rotation. During the first part of the rotation of the mutilated gear 712 the teeth 713 formed thereon engage the pinion 715 causing said pinion to receive one clockwise revolution after which the locking portion of the periphery of the gear 712 again engages the locking face 714 of the pinion 715 and moves idly during the remaining part of its revolution. As previously stated the pinion 715 and the gear 716 are secured to the electro roll 724 therefore said electro roll receives one clockwise revolution. Through the pinions 718 and 719 the gear 722 and electro roll 726 are given one counter-clockwise revolution. The feeding flanges on the electro rolls 724 and 726 engage the check paper and cause it to be fed to a position where it may be printed upon by the type line.

Each of the electro rolls 724 and 726 has mounted upon the periphery thereof an electro (not shown) so that as the check paper is fed, the electro on the upper roll will print on the back of the check. An illustration of this printing is found in Figure 69. The electro on the roll 724 prints on the front of the check. An illustration of this printing may be seen by referring to Figure 68. The two lines of printing which show the date, consecutive number, ledger number, etc., are not printed by the electro but by the type line as will be hereinafter described.

Mounted upon the electro roll 724 and near the center thereof is a serrated disk 738 (Figure 59) which perforates the check strip at 739 as shown in Figures 68 and 69.

The means for inking the electros on rolls 724 and 726 comprises two ink rolls 732 (Figure 49) carried by parallel arms 733, made integral by yokes 734, loosely mounted upon studs 735 carried by the frame 662 and supported at their outer ends by the plate 737. The ink rolls are held against the electro rolls by means of torsion springs 736 which have one end secured to the stud 735 and the other end pressing against the yokes 734.

In the normal position the lower ink roll 732 is adjacent the electro on the roll 724. To prevent the ink roll 732 from resting against the electro in this position, the gear 712 is provided with a pin 758 which engages a projection 768 on one of the arms 733 (Figs. 47, 48 and 49) and holds the ink roll away from the electro roll.

The check issuing mechanism is partially under automatic control of the transaction bank of keys and partially under the control of a manually operated knob projecting through the side of the cabinet. According to the system described with certain classes of transactions it is desired to issue a plain check (Figure 69), with other transactions a stub check (Figure 68) and with other classes of transactions it is desired that no check be issued. A check with no printing on the stub portion is termed a plain check. As before stated this mechanism is controlled automatically by the transaction bank of keys, for example, for the "No sale" and "Paid out" transactions no check is required, for a "Received-on-account" transactions it is desired to have a plain check and for a "Cash" or "Charge" transaction it is desired to issue a stub check.

The mechanism for controlling these various operations of the check issuing mechanism includes, referring to Figure 21, a plate 740 carried by two arms 741 loosely mounted upon the studs 101 and 99 which it will be remembered are carried by the key frame 76. The plate 740 is held in its normal position, as viewed in Figure 21, by means of a spring 742 between a hook 743 integral with said plate and a stud 744 carried by the frame 76. Integral with the lower end of said plate 740 is an extension 745 which contacts the upper end of a link 746 bifurcated to straddle the shaft 186 and pivotally mounted at its lower end on an arm 747 clamped upon a sleeve 748 rotatably mounted upon a shaft 749, said shaft being rotatably mounted in the vertical side frames 160 (Figure 62). Also clamped to the sleeve 748 is an arm 750 (Figures 55 and 62) which has integral therewith a segment shaped plate 751 provided with a peripheral cam race 752. Pivotally mounted on the base of the machine at a point (not shown) is an L-shaped plate 753 the vertical portion of which carries an anti-friction roller 754 which fits within the cam race 752. The horizontal portion of the lever 753 carries an anti-friction roller 755 which fits within a groove 756 (Figure 62) formed in the hub 624 which it will be remembered is secured to the plate cam 623 which controls the printing of the detail strip. Also secured to this hub 624 is a plate cam 757 which controls the printing of a plain check as will be hereinafter described. Clamped to the extreme left hand end of the sleeve 748, as viewed in Figures 1A and 2, is an arm 759 provided with a lug 760 which cooperates with the tail of the pawl 707 which it will be remembered is the means whereby the shaft 704 is given a counter-clockwise rotation to effect the actuation of the check feeding mechanism. Also integral with the arm 759 is an ear 761 which cooperates with a notch 762 formed in the periphery of a disk 763 secured to the hub 711 which it will be remembered is fast to the shaft 704.

From the foregoing description it will be readily ascertained that if the "No sale" key or the "Paid out" key, which are the top and bottom keys respectively (Figure 21) are depressed, no movement will be given to the plate 740 because the key studs 105 in both cases cooperate with straight slots 764 formed in said plate. When the printer cam shaft 515 (Figure 62) is given a counter-clockwise rotation the beveled gears 701 and 702 and the disk 706 will be rotated counter-clockwise. At the beginning of this rotation of the disk 706 the driving pawl 707 carried thereby is rocked clockwise, by its engagement with the lug 760 of the arm 759 (Figure 2), a distance sufficient to cause it to be disengaged from the flange 710 of the hub 711, so that as the disk 706 completes its rotation the pawl 707 will have no effect upon the hub 711 to drive the shaft 704. The disengaging of the pawl 707 from the flange 710 takes approximately 5° of time, and therefore, the notch 762 in the disk 763 is made large enough to allow said disk to be slightly rotated during the time the pawl is being disengaged. If the shaft 704 is not rotated there will be no movement given to the train of gears shown in Figure 48 for driving the check issuing mechanism, and therefore, no checks will be issued for either a "No sale" or "Paid out" transaction.

However, should the middle or "Received on account" key (Figure 21) be depressed the plate 740 through the engagement of the pin 105 with an angle slot 765 of said plate will be moved downward thereby causing its extension 745 to force the link 746 downward which causes the arm 747 and sleeve 748 to be rocked in a clockwise direction. This clockwise movement of the sleeve 748 causes the arm 750 and plate 751 to be rocked clockwise. It will be remembered that the plate 751 is so shaped that when said plate is rocked the cam race 752 thereof causes the L-shaped lever 753, through the engagement of the roller 754 with the cam race 752, to be shifted to the left (Figure 62). This shifting movement of lever 753 through the engagement of the roller 755 thereon with the groove 756, causes the hub 624 and cams 623 and 757 to be shifted to the left a distance sufficient to disengage the roller 622 from the cam 623 and to engage said roller with the cam 757. The clockwise movement of the sleeve 748 also causes the arm 759 to be rocked likewise thereby disengaging its lug 760 from the pawl 707 and also disengaging its ear 761 from the notch 762 of the disk 763, as viewed in Figures 1A and 2.

With the parts in the positions as just described it will be seen that when the beveled gear 702 and the disk 706 are rotated counter-clockwise by the beveled gear 701 of the printer cam shaft 515 the pawl 707 will not be disengaged from the flange 710 of the hub 711 and therefore the hub 711 will be rotated counter-clockwise with the rotation of the disk 706. As this hub is secured to the shaft 704 said shaft will receive one counter-clockwise rotation (Figures 2 and 48) to drive the train of gears in the direction indicated by the arrows in Figure 48 thereby causing the receipt paper to be fed for an impression to be made thereupon as will be hereinafter described.

Should the second or the fourth key from the top (the "Cash" and "Charge" keys respectively) (Figure 21) be depressed the plate 740 through the engagement of the pin 105 with the angle slot 766 will be moved downward a greater distance than when the middle or "Received-on-account" key was depressed due to the fact that the slot 766 is of a greater angle than the slot 765, and therefore, the link 746 will be moved a greater distance so that the arm 747 and sleeve 748 will be rocked through a greater angle than when the center key is depressed. By moving the sleeve 748 through a greater angle the arm 750 and plate 751 are also moved farther than before thereby causing the L-shaped plate 753 to be shifted a greater distance to engage the roller 622 (Figure 62) with a cam plate 767 secured to the hub 624, which is for the purpose of causing two impressions upon the receipt as will be hereinafter described. The rotation of the sleeve 748 as just described disengages the lug 760 and ear 761 integral with the arm 759, from the pawl 707 and disk 763 respectively so that the shaft 704 may be given one counter-clockwise revolution as previously described in order to feed the receipt paper.

As previously described and as will be seen by referring to Figure 49 the feeding flanges of the electro rollers 724 and 726 are timed so that the receipt paper is fed to a position to be printed upon during the first half revolution of the driving disk 712. As soon as the receipt paper has been fed it is gripped by knurled disks and then the receipt is cut from the strip after which it is printed upon either once or twice depending upon which key of the transaction bank has been depressed. The mechanism for cutting the receipt from the strip includes two arms 770 and 771 (Figures 47 and 49) which are loosely mounted upon the stud 723. These arms are held in parallel alignment and made rigid with each other by means of two studs 772 and 773 carried by the arm 770 and secured to the arm 771 by means of screws. The right hand ends of the arms 770 and 771 carry a movable plate 774 in which is formed a slot 775 through which the receipt paper passes. The plate 774 is held against the stationary plate 631 by means of two compression springs 776 (Figures 45, 47 and 49). The slot 775 in the plate 774 is normally in a position so that as the check paper passes therethrough it will also pass just beneath a knife edge 777 formed on the lower edge of the plate 631 as viewed in Figures 47 and 57. Integral with the arm 770 is a downwardly projecting arm 778 which carries an anti-friction roller 779 that fits within a cam race 780 formed in the side of the gear 712 (Figure 49).

From the foregoing description it will be readily seen that, at the proper time during the rotation of the gear 712, the arm 778 and arms 770 and 771 will be given a counter-clockwise movement through the engagement of the roller 779 with the cam race 780, thereby causing the movable plate 774 to be raised in a vertical plane thereby causing the receipt paper to be cut off as the opening 775 is forced past the knife edge 777 of the stationary plate 631.

The mechanism for gripping the receipt to hold it in position while it is being cut as just described and also to hold it in position during the time it is being printed upon as will be hereinafter described includes a pair of knurled disks 781 fast upon a shaft 782 rotatably mounted in the frame 562 and the plate 563. In the same vertical plane with the disks 781 is a pair of knurled disks 783 fast upon a shaft 784 carried at its left hand end (Figure 47) by an arm 785 and at its right hand end by an arm 786. The arms 785 and 786 are secured to a shaft 787 (Figure 52) rotatably mounted in the plates 631 and 563. Integral with the arm 786 is an arm 788 (Figure 52) which has pivotally connected thereto the upper end of a link 789 the lower end of which is pivotally mounted on a lever 790 loose on the shaft 593. Secured to the shaft 593 is a V-shaped arm 791. Between said arm and a stud 792 carried by the forward end of the lever 790 is a compression spring 793 which normally holds the stud 792 against the lower portion of the V-shaped arm 791 as shown in Figure 52.

It will be remembered that during the operation of the machine the shaft 593 is given first a counter-clockwise and then a clockwise movement, and therefore, from the foregoing description and by referring to Figure 52 it will be seen that as the shaft 593 is rocked in a counter-clockwise direction the lever 790 through the influence of the spring 793 will be rocked likewise thereby moving the link 789 upward which causes the arm 788 and shaft 787 to be rocked in a counter-clockwise direction. The angle through which the shaft 787 is rocked is sufficient to cause the disks 783 to engage the check paper which has been passed between said disks and the knurled disks 781. The disks are held in this position until after the printing has taken place.

As previously described, when either the "Cash" or "Charge" key is depressed a stub check is issued. The manner in which the check receives two impressions from the upper type line, one impression on the main portion of the check and one impression on the stub portion thereof will now be described.

It will be remembered that the type wheels carried by the arms 540 and 541 are moved against the platen 629 to print upon the detail strip by means of the plate cam 623 (Figure 56) and roller 622 carried by the arm 621. It will also be remembered when the "Cash" or "Charge" key is depressed, the cam 623 (Figure 62) is shifted laterally out of engagement with the roller 622 and that the cam 767 is shifted into engagement with the roller 622. When either of the above mentioned keys is depressed the check paper feeding mechanism is operated and therefore when the type wheels carried by the above mentioned arms are moved against the platen two impressions from the said type wheels will be made upon the check after it has been cut from the strip. The cam 767 is provided with three nodes on its periphery (Figures 55 and 56), and therefore as said cam is in engagement with the roller 622 the arms 540 and 541 are given three separate oscillations first clockwise and then counter-clockwise. These three oscillations of said arms cause the type wheels carried thereby to engage the platen 629 three times whereby the check receives the first two impressions and the detail strip receives the third impression.

The movement of the arms 540 and 541 does not however control the date type wheels 567 as it will be remembered said type wheels are carried by a separate arm 568 as viewed in Figure 57. The mechanism for causing the date to be printed upon the check will now be described. It includes, an arm 795, integral with the arm 568, which carries an antifriction roller 796 that cooperates with a cam disk 797 (Figures 57 and 62) fast upon the printer cam shaft 515. The arm 795 normally rests against the pin 798 carried by the arm 621 and is held in such position by means of a spring 799 compressed between a foot 800, integral with the arm 795, and a foot 801 integral with the arm 621. The spring 799 is strong enough to normally maintain the arms 795 and 568 in the positions shown in Figure 57 thus holding the date type wheels 567 in axial alignment with the type wheels carried by the arms 540 and 541.

As the arm 621 is rocked in a clockwise direction it causes the arms 795 and 568, through the engagement of the two feet 800 and 801 with the spring 799, to receive said clockwise movement whereby the date type wheels 567 are moved against the platen at the same time as the type wheels carried by the arms 540 and 541 are moved against the platen.

From the previous description of the detail strip illustrated in Figure 65 it will be remembered that no date is printed thereupon. The means for clipping the date printing mechanism at the time the detail strip is printed upon comprises the disk 797 which has formed on the periphery thereof one node 802 as viewed in Figure 57. The disk 797 rotates in synchronism with the disk 767 due to the fact that both are secured to the printer cam shaft 515. The node 802 is so timed that as the node 769 of the cam 767 (Figure 55) is in engagement with the roller 622, said node 802 will be positioned directly beneath the roller 796 carried by the arm 795, and therefore, as the arm 621 is moved counter-clockwise by the node 769 the roller 796 engages the node 802 thereby preventing the arm 795 from being rocked clockwise to move the date type wheels against the platen. When the disk 797 is in this position the spring 799 is compressed between the feet 800 and 801. Due to the fact that the node 769 of the cam 767 is the node which controls the printing of the detail strip, from the foregoing it will be readily seen that the date type wheels are not allowed to contact the platen at this particular time thereby eliminating printing of the date from the detail strip.

As stated above, the stub check receives two separate impressions from the type wheels and therefore it is necessary to advance the check between said impressions. The mechanism for accomplishing this movement of the check includes two pairs of knurled disks 781 and 783 which it will be remembered are secured to the shafts 782 and 784 respectively, a pinion 803 (Figure 59) fast to the shaft 782, and a gear 804 meshing with said pinion. The gear 804 is loosely mounted upon a stud 805 (Figures 47 and 59) carried by the frame 562. Meshing with the gear 804 is a segment 806 integral with a bell crank 807 loosely mounted upon the shaft 655. The lower arm of the bell crank 807 has pivotally mounted thereon the forward end of a link 808 the rear end of which is pivotally secured to an arm 809 of the three armed lever 667 which it will be remembered is loosely mounted upon the shaft 509 and is plainly illustrated in Figure 59. It will be remembered that the three armed lever 667 is rocked first counter-clockwise and then clockwise by the double plate cam 670.

The contour of the double plate cam 670 is such that during its counter-clockwise rotation, the three armed lever 667 is rocked slightly counter-clockwise then held stationary for a short time, then given a further counter-clockwise rotation, then held stationary and finally rocked clockwise to its normal position. The arm 809 being integral with the lever 667 receives the above mentioned movements whereby during the first counter-clockwise movement the link 808 is moved backward causing a counter-clockwise movement of the bell crank 807 and consequently the gear 804 through the engagement of the segment 806 therewith is rotated slightly in a clockwise direction thus imparting a counter-clockwise movement to the pinion 803, shaft 782 and disks 781 thereby advancing the check the proper distance for it to receive its second impression. This second impression upon the check takes place at the time the arm 807 is held stationary by the double plate cam and consequently the disks 781 are also held stationary. During the second counter-clockwise movement of the arm 809 the disks 781 are again rotated, by the means described above, a distance sufficient to feed the printed check out of the machine so that it will lie upon the plate 794 (Figure 44).

When the middle key (Figure 21) which is the "Received-on-account" key is depressed the cam 757 (Figure 62) is shifted laterally to engage the roller 622 carried by the arm 621. This cam 757 is provided with two raised portions, and therefore, when this cam is in position to control the printing of the detail and check, the check will receive only one print from the type line and the detail strip will receive one print. The check issued at this time is what is termed the plain check because the printing from the type line is printed upon the main portion thereof. It is to be understood that all checks whether plain or stub have the perforation 739 (Figures 68 and 69) because said perforation is made at the time the check paper is passing over the electro roll 724, as previously described.

When either the top or bottom key (Figure 21) which represent "No sale" and "Paid out" respectively, is depressed, the cam 623 (Figure 62) is not shifted but allowed to remain in engagement with the roller 622, provided that this was the position for the previous operation. If not, it is shifted into engagement with said roller by means hereinbefore described. This cam 623 is provided with only one high portion which is for the purpose of controlling the printing on the detail strip as already described, and therefore, the type line is given only one impression against the platen as it will be remembered that when either the "No sale" or "Paid out" key is depressed the mechanism for actuating the check is made inoperative hence there is no necessity for more than one impression of the type line.

At certain times upon the operation of either the "No sale" or "Paid out" key it may be desired to issue either a stub check or a plain check. Likewise during a "Received on account" transaction it may be desired to issue a stub check in lieu of a plain check as issued by the machine. When any of these conditions arise it is necessary to control the issuing of said check manually. The mechanism whereby checks may be issued under the above mentioned conditions includes a knurled knob 810 (Figures 62 and 63) secured to the shaft 749 by such construction that when said knob is turned the shaft will be turned but the knob may be pulled out and still not become disconnected from the shaft. The knob is provided with three notches 811 (only one of which is shown) which fit over a pin 812 carried by the frame 160. Secured to the shaft 749 near its left hand end and as viewed in Figure 1A is a pin 813 which is shown as engaging the upper end of a slot 814 made in the sleeve 748 which it will be remembered is loose upon the shaft 749. From the above description it will be seen that if the knob 810 is turned in a clockwise direction, as viewed in Figure 63, that the sleeve, through the engagement of the pin 813 with the slot 814, will be rotated so that the shaft 704 may be rotated to drive the check issuing mechanism. As previously described, when the sleeve 748 is turned it causes either the cam 757 or 767 to be shifted into engagement with the roller 622 to effect printing on the check and detail strip, and therefore, when the knob 810 is turned so that the word "Check" as viewed in Figure 63 is opposite the arrow, the cam 757 will be shifted into engagement with the roller 622 thereby causing a plain check to be issued. Should the knob 810 be rotated until the words "St. check" are opposite the arrow, cam 767 will be shifted into engagement with the roller 622 to effect printing of a stub check.

This manual control of the check issuing mechanism works only one way, that is, through this mechanism checks may be issued with a "No sale" or "Paid out" transaction and likewise a stub check may be issued with a "Received-on-account" transaction, but should this mechanism be set so that the words "No check" are opposite the arrow as viewed in Figure 63, and either the "Cash" or "Charge" key be depressed, checks will be issued regardless of this manual control as will be readily understood from the foregoing descriptions.

However, it is to be understood that this invention is not to be limited for issuing checks for the particular operations as described as this system is for illustrative purposes only. By simply replacing the plate 740 with one having different shaped slots any desired combination may be worked out whereby checks may be issued to suit the business in which the register is to be used.

Figure 68 illustrates the front of a stub receipt as issued by the machine. The first three lines of printing are printed by an electro secured to the electro roll 724 as the receipt paper is being fed. The fourth and fifth lines of printing are printed by the type line and represent, beginning at the left, the date, the consecutive number, the next figure "13406" represents the ledger number, the next "$17.25" represents the amount purchased, the next letter "A" represents the clerk, the next three letters "F S H" represent the department, the next black star represents that the transaction was cash and the last letter "S" represents that a slip was made out and printed upon for this particular transaction. Figure 69 represents the back of the check shown in Figure 68. The printing thereon is printed by an electro secured to the electro roll 726 (Figure 49) as the check paper is being fed.

The only difference between the stub check as illustrated in Figure 68 and the plain check issued by the machine is that the stub check receives two impressions from the type line as illustrated while the plain check receives only one impression from the type line, said impression being made upon the large portion of the check, the date, consecutive number, ledger number, etc., being omitted from the stub portion of said plain check.

As previously stated the machine is designed to print upon an inserted slip or other papers. The mechanism for controlling the printing on the slip is made adjustable so that either one or two prints may be made. The feeding mechanism for the slip is also adjustable to feed various distances and also adjustable to feed in either a forward or backward direction. The mechanism for accomplishing these various results will now be described.

The type wheels for printing upon the slip as already described are upon the shaft 545 which, it will be remembered, is carried by the parallel arms 546 and 547 mounted on the shaft 509.

Secured to the base and directly beneath the lower type line is a block 815 which carries a resilient platen 816 the upper surface of which coincides with the top line of a slip table 817 (Figures 52, 53, 56 and 57).

The mechanism for moving the lower line against the platen to print upon the slip includes (Figures 58 and 62) a bell crank 818 loosely mounted upon the shaft 509. The rear arm of said bell crank carries an anti-friction roller 819 which fits within a cam race 820 formed in the side of a disk 821 secured to the printer cam shaft 515 by means of a key 8221. By this construction the disk 821 is made to revolve with the cam shaft 515 yet it may be moved laterally on said shaft as will be later described. The forward arm of the bell crank 818 is bifurcated to receive a stud 822 carried by an arm 823 pivotally connected to the side of the arm 546 as illustrated in Figure 58.

From the above description it will be seen that when the cam shaft 515 and the disk 821 are rotated counter-clockwise the bell crank 818. through the engagement of the roller 819 with the cam race 820, is rotated in a counter-clockwise direction thereby causing the arm 546 through the engagement of the bell crank with the stud 822 on the arm 823 to be rotated in a counter-clockwise direction. It will be remembered that the arm 546 and also the arm 547 are fast to the shaft 509 and therefore when the arm 546 is rotated counter-clockwise the arm 547 receives said rotation whereby the lower type line is moved against the platen 816 to print upon the inserted slip.

Figure 58:
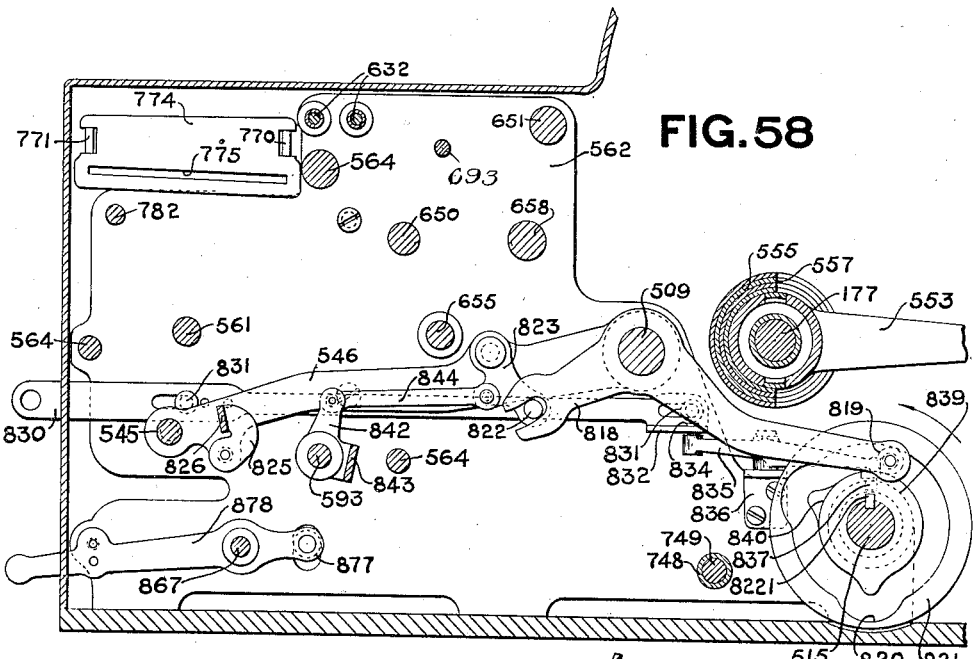
Figure 58 is a vertical sectional view taken on the line 58—58 of Figure 45 and looking in the direction indicated by the arrows.

The mechanism for aligning the type wheels of this type line after they have been disengaged from their actuating disks to print upon the slip, includes an arm 824 pivotally connected to the side of the arm 547 (Figure 53), and an arm 825 pivotally connected to the side of the arm 546 (Figure 58). The arms 824 and 825 are made integral by a yoke 826 which has a lip 827 (Fig. 57) that cooperates with the type wheels of the lower type line. The arm 824 is provided with a slot 828 which engages a pin 829 carried by the plate 563. The slot 828 is so formed that as the arms 546 and 547 are rocked counter-clockwise, as previously stated, the arms 824 and 825 are also rocked counter-clockwise thereby engaging the portion 827 of the yoke 826 with the type wheels whereby the said type wheels are positively held in alignment during the time they are disengeged from their actuating disks.

The mechanism for obtaining either one or two prints upon the inserted slip is controlled by a manually operated link 830 which extends through the front of the cabinet as viewed in Figures 44 and 58. This link is slidably mounted upon two studs 831 carried by the frame 562. The rear end of the link 830 is provided with a foot 832 formed at right angles with said link, said foot is provided with a slot 833 (Figure 62) that engages a pin 834 carried by the forward end of a lever 835 which is pivotally mounted upon an L-shaped bracket 836 (Figures 1A, 58 and 62) carried by the frame 562. The rear end of the lever 835 carries a pin 837 which fits within a groove 838 formed in a hub 839 integral with the disk 821.

As viewed in Figures 58 and 62 the mechanism just described is shown in a position to cause two impressions of the lower type line against the inserted slip.

Should it be desired to receive only one print upon the slip, the operator pushes the link 830 rearward thereby rotating the lever 835 in a counter-clockwise direction, through the engagement of the slot 833 with the pin 834 carried by said lever as is plainly illustrated in Figure 62. It will be remembered that the disk 821 is secured to the cam shaft 515 by means of a key, and therefore, when the lever 835 is rotated counter-clockwise the cam disk 821 is shifted to the left, as viewed in Figure 62, through the engagement of the pin 837 with the groove 838 formed in the hub of said disk. The distance which this disk is shifted is sufficient to cause the roller 819 (Figure 58) to be disengaged from the deeper portion of the race 820 so so that it will cooperate with the shallow portion 840 which is so located that during the counter-clockwise revolution of the disk 821 the roller 819 will pass over the top of one of the rises in the deep cam race 820, therefore causing but one oscillation of the arms 546 and 547 so that only one print is made upon the slip.

The mechanism for printing upon the inserted slip is automatically crippled when there is no slip in the machine during an operation. This crippling device comprises, an arm 841 (Figures 53 and 62) and an arm 842 (Figures 58 and 62) loosely mounted upon the shaft 593 and made integral by a yoke 843. Pivotally connected to the arm 842 is a link 844 which is also pivotally connected to the arm 823 as viewed in Figure 58. The arm 841 is provided with a slot 845 which engages a pin 846 carried by an arm 847 that is fast to the shaft 593.

It will be remembered from a previous description that the shaft 593 is oscillated, first counter-clockwise and then clockwise, and therefore the arm 847 will receive said oscillation. As this arm is rocked counter-clockwise the arms 841 and 842 are rocked counter-clockwise through the spring 874 stretched between the stud 846 and a pin 848 carried by an arm 849 integral with the arm 841. If there is no slip in the machine the arm 841 will be oscillated the full extent of the oscillation of the arm 847 and the forward end of the arm 841 will project through an opening 850 made in the slip table (Figure 53). This movement is sufficient to disengage the stud 822 (Figure 58) from the bifurcated arm of the bell crank 818, and therefore, when said bell crank is rocked counter-clockwise by the disk 841 it will move idly due to the fact that it has been disconnected from the arm 823 which, it will be remembered, is the means whereby the arms 546 and 547 are rocked to force the type line against the platen for printing.

However, if there is a slip in the machine when the arm 841 is oscillated it strikes said slip and the arm 847 continues its oscillation due to the pin and slot connection between these two arms. Although the arms 841 and 842 are oscillated when a slip is in the machine this oscillation is not sufficient to disengage the stud 822 from the bell crank 818, and therefore, when said bell crank is oscillated either one or two prints will be made upon the slip according to the position in which the link 830 is at the time of the operation.

Means is provided whereby a letter "S" is printed upon the detail strip every time that a slip is printed upon. Means is also provided for eliminating the "S" print on the detail strip when no slip is in the machine.

This mechanism includes a type wheel 851 (Figures 45 and 53) which is loosely mounted upon the shaft 539. Meshing with this type wheel is an actuating disk similar to the ones previously described and has secured to the side thereof a toothed disk 852 which meshes with a segment 853 integral with an arm 854 rotatably mounted upon one of the sleeves 555 on the shaft 177, as viewed in Figure 43. Also loosely mounted upon this sleeve is a lever 855 which carries an anti-friction roller 856 that fits within a cam race 857 formed in the side of a disk 858 mounted fast upon the printer cam shaft 515. The arm 854 is held in this normal position, as viewed in Figure 53, by means of a spring 859 stretched between said arm and a stud 860 carried by an arm 861 integral with the lever 855. The arm 854 is provided with a slot 862 the upper end of which normally engages the stud 860 as illustrated. The arm 854 also carries a pin 863 which cooperates with either a shoulder 864 or the upper end 865 of the arm 849, depending upon the presence or absence of a slip in the machine, as will be described later.

If there is a slip in the machine it will be remembered that the arm 849 is only slightly rocked in a counter-clockwise direction, and, therefore, when the disk 857 is rotated counter-clockwise it will cause the lever 855 and the arms 861 and 854, through the spring 859, to be rocked their full amount whereby the disk 852 is rotated clockwise a distance sufficient to position the type wheel 851 so that the letter "S" thereon is in position to print upon the detail strip and check. When there is a slip in the machine and the parts are moved as just described, the pin 863 cooperates with the shoulder 864 of the arm 849. However, when there is no slip in the machine it will also be remembered that the arm 841 projects through the opening 850 in the slip table, and therefore, the arm 849 is rocked until its upper end 865 lies directly beneath the pin 863 on the arm 854. When the disk 858 is rotated and the parts are in the positions as just described the lever 855 and arm 861 are given their full movement the arm 854 being rocked only until its pin 863 engages the end 865 of the arm 849. This movement of the arm 854 is not sufficient to set up the type wheel 851 so that the "S" will be in position to print upon the check or detail strip. Although the arm 854 is prevented from moving its full amount the lever 855 and arm 861 will receive their full amount of movement because of the stud 860 carried by said arm operates in the slot 862 of the arm 854 and consequently stretches the spring 859. These parts are all returned to their normal home positions when the lever 855 is rocked in a clockwise direction by the disk 858.

After a slip has been inserted into the machine to be printed upon it is gripped between two pairs of knurled rollers, printed upon, then advanced and printed upon again, provided the link 830 is set for two prints, and finally fed out of engagement with the knurled disks.

The mechanism for gripping the slip previous to printing and also for causing the slip to advance between prints and to be finally fed from the disks includes two knurled disks 866 (Figure 52) which are secured to a shaft 867 rotatably mounted at its left hand end in the frame 562 and at its right hand end in a frame 868 secured to the base of the machine. In the same plane with the disks 866 are two knurled disks 869 (Figure 56) which are loosely mounted upon arms 870 loose on the shaft 593. Each arm 870 carries a pin 871 which normally engages the lower projection of V-shaped arms 872 secured to the shaft 593 adjacent each arm 870. The arms 870 are maintained in their normal positions as shown in Figure 56 by means of a spring 873 compressed between the pin 871 and the upper extension of the V-shaped arm 872.

From this description it will be seen that when the shaft 593 is rocked counter-clockwise, as previously described, that the arms 870 will be rocked likewise under the influence of the spring 873 and the V-shaped arm 872, whereby the disks 869 will engage the slip and hold it between said disks and the knurled disks 866.

Figures 60, 61:
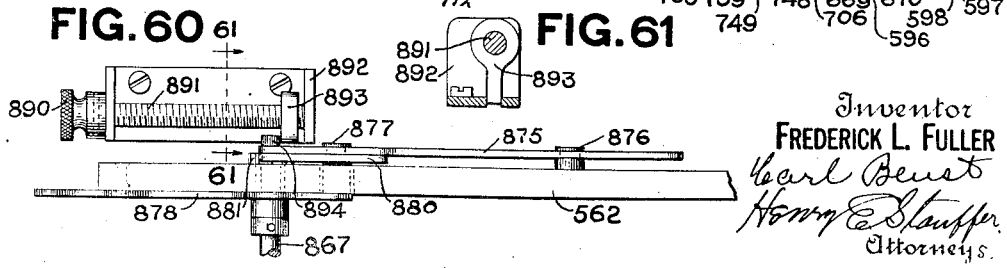
Figure 60 is a detail top plan view of the adjustment device for the slip feeding mechanism.
Figure 61 is a vertical sectional view taken on the line 61—61 of Figure 60 and looking in the direction indicated by the arrows.

The means for feeding the slip includes a bar 875 which is slidably mounted upon a stud 876 carried by the frame 562, and a stud 877 carried by the rear end of a lever 878, as is illustrated in Figures 58, 59 and 60. Secured to the side of the bar 875 are two racks 879 and 880, the former being shown in engagement with a pinion 881, secured to the shaft 867. The bar 875 has also secured to the side thereof a pin 882 which engages the bifurcated end of an arm 883 loosely mounted on the shaft 655. Loosely mounted on the shaft 655 and adjacent the arm 883 is a bell crank 884 the upper arm of which is bifurcated to receive a stud 885 carried by the arm 666 of the three armed lever 667. The lower end of the bell crank 884 carries a stud 886 which engages the rear edge of the arm 883, as shown in Figure 59. The bar 875 is held in its rearward position by means of a coiled spring 887 stretched between the arm 883 and a stud 888 carried by the frame 562.

From the previous description in connection with the feeding of the check it will be remembered that the three armed lever 667 is rocked slightly counter-clockwise then held stationary, then given a further counter-clockwise movement and finally given a clockwise movement back to normal position. By referring to Figure 59 it will be readily seen that these movements of the lever 667 cause the bell crank 884 to be oscillated first clockwise and then held stationary and oscillated still further in a clockwise direction whereby the arm 883 is given these two movements through its engagement with the stud 886 carried by the said bell crank, therefore causing the bar 875 to receive first a slight forward movement and then a greater forward movement. The rack 879 secured to the bar 875 being in engagement with the pinion 881 causes said pinion, the shaft 867 and the disks 866 to be rotated in a clockwise direction whereby the slip is advanced a short distance and then finally fed from engagement with said disks so that it may be removed by the operator.

The printing mechanism for the slip previously described is timed so that said slip receives its first impression immediately after it has been gripped between the disks 869 and 866 and before it is advanced, and given its second impression after the first slight forward movement of the bar 875, the second forward movement of the bar 875 being for the purpose of feeding the slip forward from the disks.

The slips used by different concerns may not all be alike and therefore a mechanism is provided whereby the feeding of the slip between the two impressions made thereupon may be greatly varied. This mechanism comprises a manually operated knob 890 (Figures 44, 59 and 60) which extends through the front of the cabinet, said knob is secured to a threaded shaft 891 rotatably mounted in a U bracket 892 which is secured to the base. On this threaded shaft 891 is a disk 893 the side of which engages a pin 894 carried by the bar 875. The disk 893 is prevented from turning by an extension integral therewith which fits within a slot in the bottom of the U bracket 892, as is plainly illustrated in Figure 61. The parts as illustrated are shown so that the bar 875 receives its maximum movement.

By turning the knob 890 in a clockwise direction, as viewed in Figure 44, the disk 893 will be moved to the left (Figure 60) thereby through its engagement with the pin 894 causes the bar 875 to be moved forward causing the arm 883 to be disengaged from the stud 886 (Figure 59).

Due to the fact that the forward movement of the bar 875 is caused by the engagement of the stud 886 with the arm 883 it will be readily seen that if said arm is moved away from the stud 866 before the machine is operated, during the operation of the machine there will be a lost motion between said stud and said arm which has the effect of decreasing the forward movement of the bar 875 thereby causing the slip to be fed a shorter distance between the two prints made thereupon.

There is also provided means whereby the direction in which the slip is fed or advanced between prints may be changed from a forward slip feed as described to a rearward feed. This mechanism includes the lever 878 extending through the front of the cabinet, as viewed in Figure 44, and being loosely mounted upon the shaft 867 and which it will be remembered carries the stud 877 which is one of the bearing studs for the bar 875. By referring to Figure 58 it will be seen that if the forward end of the lever 878 is moved upward that its rear end will be moved downward consequently the bar 875 will be rocked counter-clockwise around the stud 876 a distance sufficient to disengage the rack 879 from the pinion 881 and to engage the rack 880 with said pinion.

With the parts in such positions as just described it will be readily seen that when the bar 875 is moved forward the pinion 881 and consequently the disks 866 will be rotated in a counter-clockwise direction instead of a clockwise as previously described thereby causing the slip to be fed backward instead of forward.

An illustration of the slip as printed by the machine is shown in Figure 67. These slips are usually made out in duplicate the original slip being slightly smaller than the duplicate or carbon copy. The top line as shown is printed upon the carbon copy, and the second line is printed upon the original, both being printed as previously described by the slip printing mechanism. Beginning at the left the printing of each line represents the date, consecutive number, ledger number, amount, the letter "A" represents the clerk, the next two letters "MT" represents the department, the next three letters "CHG" represents that the article purchased was charged, and the remainder of the printing and writing shown on the slip is similar to the usual type of slips and therefore it is not necessary to go into detailed description of this part of the slip.

The ink ribbon for inking the type of the upper and lower type lines, and means for feeding said ribbon will now be described.

The means for supporting the ink ribbon includes a roll 895 (Figure 47) loosely mounted upon shaft 896 carried by parallel bracket arms 897 and 898 made integral by a yoke 899 secured to the frame 562 (Figures 47 and 50). There are also three rollers 900 loosely mounted in brackets 901, two of which are carried by the plate 563, the third one being carried by the frame 562. The ribbon lies just below the lower type line and just above the upper type line so that as these type lines are moved into engagement with their respective platens they will be inked to print upon the slip and check or detail strip respectively. The means for feeding the ink ribbon comprises, a ratchet 902 (Figure 50) secured to the side of the roll 895, and an arm 903 loosely mounted upon the shaft 896, and a driving pawl 904 pivotally mounted upon the arm 903 and arranged to engage the teeth of the ratchet 902. The arm 903 also carries a round headed pin 905 which is engaged by a bifurcated arm 906 (Figure 59) fast upon the shaft 593. It will be remembered from the previous description, that the shaft 593 is rocked in a counter-clockwise direction and therefore it will be understood from the above description that during this counter-clockwise movement the arm 903 will be rotated counter-clockwise (Figure 50) through the engagement of the arm 906 with the pin 905 thereby causing the pawl 904 to feed the ratchet 903 and consequently the roll 895 thereby advancing the ribbon. The ratchet 903 and roll 895 are prevented from retrograde movement by a spring pressed retaining pawl 907 which engages the teeth of said ratchet. Loosely mounted on a stud 908 carried by the end of the arm 898 is an arm 909 which carries an ink roll 910 which normally engages the outer surface of the ink ribbon so that said ribbon is always properly inked for printing. The roll 910 is held against the roll 895 by means of a compression spring 913 which lies between an arm 914 and a formed over portion of the arm 898, as viewed in Figure 50. The arm 914 is secured to the arm 909 by means of a hub (not shown) so that as the arm 914 is pushed in a counter-clockwise direction (Figure 50) the roll 910 is forced against the roll 895 thereby causing a friction on the ribbon so that it will feed easily and not slip. Tension is put on the ribbon by means of a roll 911 carried by an arm 912 loose on the stud 908. The roll 911 is held against the ribbon by gravity.

TOTAL AND SUB-TOTAL MECHANISM

In order to allow sufficient time for the selection and engagement of any desired totalizer with the actuating racks when a total or sub-total is to be printed, the main cam shaft 65 is given two continuous rotations in total and sub-total operations instead of one as is the case in adding operations.

The mechanism for controlling the two rotations of the cam shaft is practically the same as that illustrated and described in the previously mentioned Fuller Patent No. 1,242,170, and therefore it is not necessary to go into a full detailed description herein. This mechanism includes an arm 915 (Figures 3 and 72) fast on the shaft 186, and a lever 916 loose on the stud 1144. Said arm and lever are connected by a link 917. Pivotally fastened to the lower end of the lever 916 is a link 918 provided with a slot 919 which fits over the stud 148. The link 918 is provided with two pins 920 which engage a toe 921 integral with a plate 1921 which surrounds the stud 148 and slides in a groove 1924 in the plate 924 and is adapted to enter either of two notches 1471 in the gear 147. The link 918 also carries an anti-friction roller 922 which during adding operations normally rests in a notch 923 formed in a plate 924 loose on the stud 148. The plate 924 is also provided with a cam race 926 which engages the roller 922 during total and sub-total operations, as will be described later.

Figure 71:
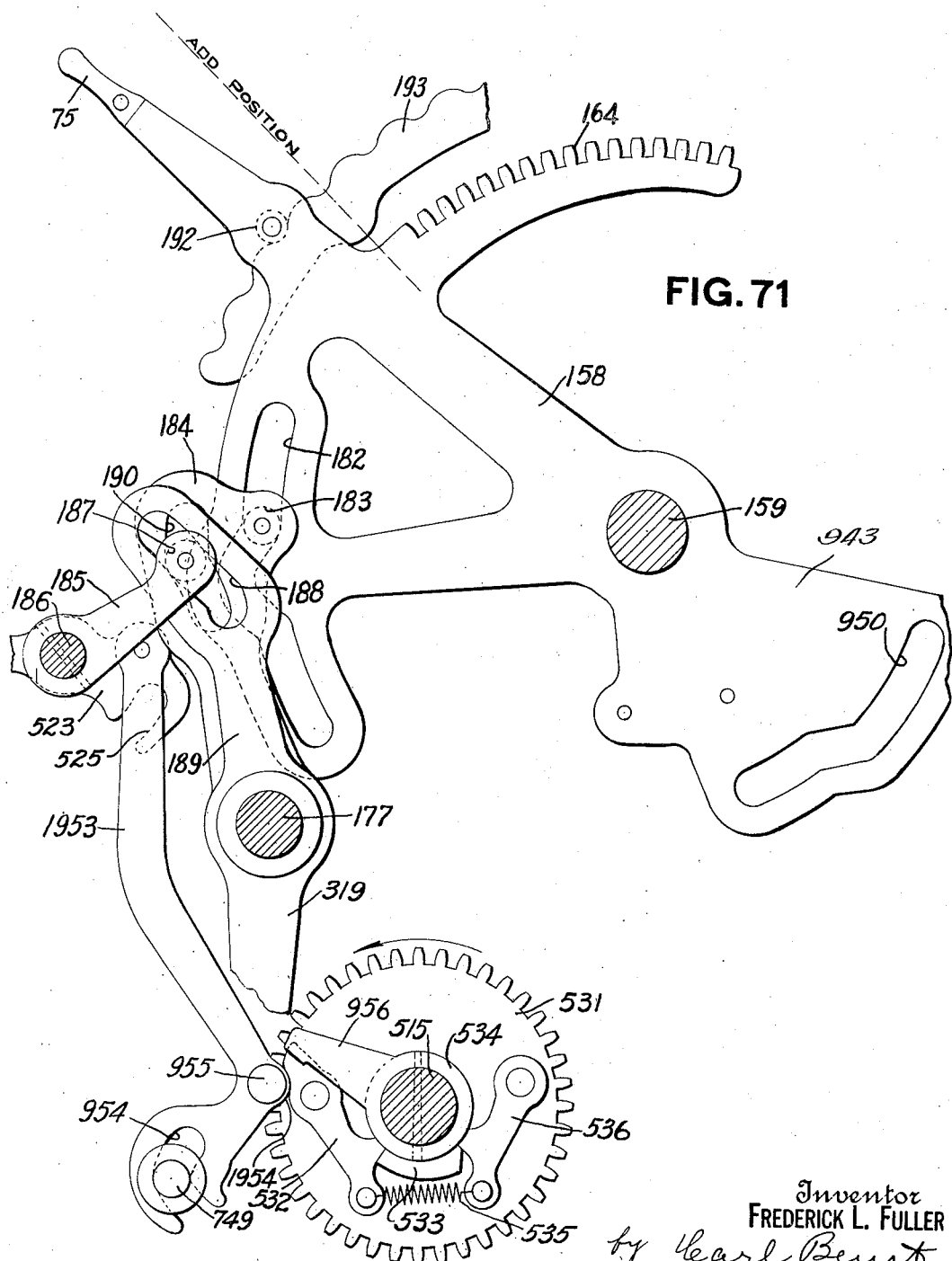
Fig. 71 is a view showing the total lever in one of its reset or grand total positions and illustrates a portion of the totalizer engaging cam control mechanism and also shows how the total lever controls the crippling of the printer drive shaft during the first revolution of the main cam shaft during totalizing operations.

From a previous description it will be remembered that when the lever 75 (Figure 10) is moved either up or down to set the machine for sub-total and total operations, the shaft 186 is rocked in a clockwise direction to the position shown in Fig. 71.

From the foregoing description it will be seen that when this rocking movement of the shaft 186 occurs that the arm 915 and lever 916 will also be rocked in a clockwise direction whereby the link 918 is moved forward so that the roller 922 engages the cam race 926 and the toe 921 is positioned so that as the large gear 147 is rotated the plate 924 will be rotated with said gear because forward movement of the link 918 causes the end 1922 (Figs. 72 and 73) of the plate 1921 to enter one of the notches 1471. In adding operations it will be remembered that this gear is given one-half a rotation but during total and sub-total operations said gear is given one full counter-clockwise rotation whereby the gear 149 and consequently the cam shaft 65 are given two continuous clockwise rotations (Figure 3).

It will also be remembered that in adding operations the cam race 146 through the arm 144 and link 141 causes the shaft 57 to be rocked counter-clockwise to release the keys. Since in totalizing operations the gear 147 is given a full rotation the arm 144 will be operated twice and therefore means is provided for preventing the release of the keys at the end of the first half rotation of the gear 147. This means includes a stud 927 carried by the link 918, which fits within a slot 928 in the lower end of the link 141. From this it will be seen that as the link 918 is moved forward the link 141 will be rocked in a clockwise direction around the stud 139 a distance sufficient to cause the pin 143 on the arm 144 to move idly in the longest portion of the slot 142 the first time said arm is rocked clockwise by the cam race 146. Since the pin 143 carried by the arm 144 moves idly in the long portion of the slot 142 of the link 141, the shaft 57 is not rocked counter-clockwise (Figure 3) to release the keys, but allowed to remain in the position to which it was rocked by the spring 1142 which, it will be remembered, rocks the shaft 57 in a clockwise direction (Figure 3) to release the motor clutch as previously described.

It will also be remembered that the pin 69 carried by the gear 63 (Figure 5) engages the portion 70 of the link 67 near the end of the rotation of the gear 63 to rock the locking member 54 in a clockwise direction to stop the motor, after which the arm 56 is rocked clockwise to engage the upper portion of the locking lever 54 thus maintaining said lever in locked position.

Since the shaft 57 and consequently the arm 56 are not rocked in a clockwise direction at the end of the first rotation in totalizing, even though the link 67 is moved upward by the pin 69 and rocks the locking lever 54 in a clockwise direction, said locking lever will not be held in this position because its spring 58 will immediately cause it to be rocked again in a counter-clockwise direction (the time between the disengaging of the pin 69 from the bottom of the link 67 to the time when the locking lever 54 normally engages a clutch to stop the motor is sufficient for the spring 58 to rock said lever as just mentioned) and therefore the clutch instead of receiving two rotations as in adding operations will receive four rotations whereby the cam shaft 65 through the gear 63 and gear 64 is given two complete rotations which also causes, as mentioned above, the large gear 147 (Figure 3) to receive one full rotation during total and sub-total operations.

As the gear 147 starts the last half of its complete rotation the link 918 is moved rearwardly by the cam race 926 so that as the arm 144 is operated the second time the pin 143 will be engaged with the middle step of the slot 142, as shown in Figure 3, and therefore the link 141 will be moved downward to rock the shaft 57 to release the keys just before the end of the second operation during totalizing. Just before the shaft 57 is rocked, as just stated, the link 67 (Figure 5) is moved upwardly by the pin 69 to rock the lever 54 clockwise, and therefore when the shaft 57 and arm 56 rock clockwise said arm engages the upper end of the lever 54 and holds it so that it will engage the clutch and stop the motor.

When the shaft 186 is rocked clockwise by the movement of the total lever 75, the rod 188 (Figure 7) is moved down and engages the tail 191 of the levers 82, which, it will be remembered, support the lower ends of the flexible detents 79 of the amount keys 71, thus holding the detents against movement whereby the keys 71 are prevented from depression by the pins 85 engaging the shoulders 84 of said keys. As a consequence when the levers 82 are so held they prevent the zero stop pawls 87 from being rocked, and therefore during the first operation of the cam shaft 65 the latches are all disconnected from their drivers in the zero position, but as the shaft 186 is rotated still further by the cam race 926, which moves the link 918 forward to accomplish this extra movement of the shaft 186, the rod 188 engages tails 929 integral with the zero stop pawls 87 and causes said pawls to be rocked in a counter-clockwise direction (Figure 7) so that during the second rotation of the cam shaft 65 the latches will not disconnect in the zero position but will travel until disconnected by the engagement of the long tooth of the totalizer wheels with the totalizer zero stop pawls as will be next described.

The mechanism for causing the latches to disconnect commensurate with the amount upon the totalizer so that the indicators may be set and also so that the printing mechanism may be positioned for printing the amounts includes: three zero stop pawls 930 (Figures 7 and 64) for each amount bank, pivotally mounted upon a link 931 slidably mounted upon the shaft 227 and the rod 217. The lower end of the link carries a stud 932 which fits within the bifurcated end of an arm 933 fast to the shaft 294. The zero stop pawls 930 are held in their normal positions by means of a spring 934 stretched between the link 931 and a link 935 which is pivotally connected to the rear end of each of the pawls 930 (Figure 64). The lower end of the link 935 engages a shoulder 936 formed on the link 931 which prevents the pawls from being rocked beyond their normal positions. Integral with the center pawl 930 is a downwardly projecting arm 937 having a formed toe 938 which is adapted to cooperate with teeth 939 formed on the rear edge of the lever 228. Secured to the end of the shaft 294, as viewed in Figure 3, is an arm 940 which has pivotally connected thereto a link 941 which carries two anti-friction rollers 942 that cooperate with the periphery of the plate 924.

From the above description it will be seen that when the plate 924 is rotated in a counter-clockwise direction (Figure 3), through its engagement with the rollers 942, the link 941 will be moved upward whereby the arm 940 and the shaft 294 will be rocked in a counter-clockwise direction. This causes the arm 933 to be rotated in a clockwise direction, as viewed in Figure 64, whereby the link 931 and the pawls 930 and also the link 935 will be moved upward so that said pawls will be in position to cooperate with the long tooth of the totalizer wheels as will be described later.

As previously stated, the zero stop pawls 87 for the amount banks cause the latches to disconnect in the zero positions during the first rotation of the cam shaft 65 and consequently the actuating racks 267 are held in their normal positions during this first rotation at which time the selected totalizer is engaged therewith as will be hereinafter described. However, during the second operation of the cam shaft 65 it will also be remembered that the zero stop pawls 87 are rocked so that the differential members 222 and 228 will be oscillated beyond zero distances depending upon the positions in which the long teeth of the totalizer are located previous to the taking of a total or sub-total. After the totalizer wheels of a selected totalizer have engaged the racks 267 the differentially movable members 222 and 228 are rotated in a clockwise direction (Figure 7) and the actuating racks 267 are moved downward thereby causing the totalizer wheels to be rotated in a counter-clockwise direction until the long teeth strike the zero stop pawls 930. When this occurs each pawl so struck will be rocked in a counter-clockwise direction (Figure 64) whereby the arm 937 is rocked likewise to engage one of the teeth 939 of the differentially movable member 228 thereby causing the members 222 and 228 to be stopped to rock the latch pawl 237 clockwise, by the segment 221, and engage one of the notches 240 (Figure 7) thus causing the associated actuating rack to stop. When the totalizer wheels 266 are rotated as just described until the long tooth of each wheel engages its respective pawl 930, the totalizer wheels are then in their zero positions. If a total operation is being taken the totalizer wheels are disengaged from the actuating racks before said racks are moved to their normal positions thereby leaving said totalizer wheels in their zero positions. However, during a read or sub-total operation the totalizer wheels are held in engagement with the actuating racks until said racks are returned to their normal positions whereby the amount taken from said totalizer wheels is put back upon them so that when they disengage from the racks they will not set at zero but will have the same amount thereupon as before said read or sub-total operation was taken. The mechanism for controlling the timing of the disengagement of said totalizer wheels as just described is automatically controlled by the setting of the total lever 75, as will be described later.

The mechanism for controlling the engagement of the totalizer lines for total operations will be described first after which the mechanism for controlling the engagement and disengagement of the totalizers during a read or sub-total operation will be described.

Integral with the total lever 75 is a segmental portion 943 which has secured thereto a segment 944 which meshes with a segment 945 loose on the cam shaft 65. Integral with the segment 945 is a segment 946 which meshes with a pinion 947 secured to the sleeve 293 which, it will be remembered, is loose upon the shaft 294, as viewed in Figure 10. It will also be remembered that clamped to the sleeve 293 are three disks (Figure 17) provided with cam races which operate pitmans cooperating with the lifting bars 281, 282 and 283 for rocking the totalizer lines as previously described. The cam disk 297 (Figures 17 and 18) is associated with the transaction bank, the disk 305 (Figures 17 and 19) is associated with the departmental bank and the disk 306 (Figures 17 and 16) is associated with the clerk's bank. By referring to Figure 1B it will be seen that the positions for the total lever 75 are inscribed on the plate 162 and it will also be seen that for "Read" or sub-total operations said lever is moved upward whereas for "Resetting" or total operations the lever 75 is moved downward to either the "Transaction", "Department" or "Clerk's" position. For example, if the total lever is moved downward for a "Resetting" operation until its position is opposite the word "Clerk's", it will through the engagement of the segments 944, 945 and 946 and the pinion 947 rotate all three disks 297, 305 and 306. This rotation of the disks will cause the pitman 301 to be moved to the right, as viewed in Figure 16, whereby it will engage the lifting bar 283 associated with the clerk's bank. The disk 305 will cause the pitman 300 to be moved to the right (Fig. 19) to engage the pitman 300 with the lifting bar 282 for the department bank but will cause said pitman to also be disengaged before the operation of the machine is started, as will be readily seen by the configuration of the race 303 in Figure 19. The disk 297 (Figure 18) will cause the pitman 292 to be moved to the left, as viewed in this figure, thereby disengaging said pitman from the lifting bar 281 associated with the transaction bank.

It will be remembered that during adding operations the rod 308 is elevated to engage at least one of the sets of totalizers with the actuating racks and would also cause either two or three sets of totalizers to be engaged with the actuating racks provided the selecting bar 269 was shifted to engage all three lifting bars 281, 282 and 283, which, it will be remembered, is under the control of the keys in the transaction bank. However, during totalizing operations whether taking a total or sub-total, only one totalizer line is rocked into engagement with the actuators at a time, as will be readily understood from the above description of the movement of the disks 297, 305 and 306. After the totalizer line has been rocked into position the totalizer for any desired clerk on this line may be selected by the depression of any key in the clerk's bank which controls the differential mechanism and disconnects the latch so that the rack 252 will revolve the drum 272 (Figure 12) thereby shifting the shaft 261 and the plate 269 so that the proper totalizer will be engaged with the actuating racks 267.

As before stated the timing for the engaging and disengaging of the totalizers with the actuating racks for a total and sub-total operation is different. Means for controlling this differential timing includes a bell crank 948 (Figures 10 and 29) the upper arm of which carries a roller 949 which engages a slot 950 formed in the segment 943 which, it will be remembered, is integral with the totalizer lever 75. The lower arm of said bell crank is provided with a pin 951 which engages a slot 952 formed in the link 324. This lower arm of the bell crank 948 is also provided with a slot 953 which cooperates with the pin 322 carried by the upper end of the lever 317.

From the above description it will be readily seen that when the total lever 75 is moved downward for a reset or total operation, the bell crank 948 through the slot 950 and roller 949 will be rocked in a counter-clockwise direction whereby the notch 953 of the lower arm of said bell crank engages the pin 322 carried by the lever 317. The counter-clockwise rocking of the bell crank 948 through the pin 951 and slot 952 causes the link 324 to be rocked counter-clockwise a distance sufficient to disengage the hooked end 323 of said link from the pin 322 so that when the plate cams 329 on the cam shaft 65, as viewed in Figure 29, are rotated the bell crank 326 will be oscillated by said cams but will cause no movement of the lever 317 to cause the link 315 to be moved to the right as viewed in Figure 10, to rock the totalizer lines.

It will be remembered that the shaft 186 is rocked in a clockwise direction, first by the movement of the total lever to the position shown in Fig. 71 and second by the movement of the cam race 926 to the position shown in Fig. 72 and then moved counter-clockwise to the position shown in Fig. 71 by said cam race and finally moved to normal position (Fig. 10) by the total lever. The first clockwise movement of the shaft 186 does not effect any movement of the arm 189 and its integral arm 319 because the upper portion of the slot 188 in said arm is radial with the center of the shaft 186. However, during the clockwise movement of said shaft which is caused by the cam race 926, the arm 189 and consequently the arm 319 are rocked in a counter-clockwise direction to the position shown in Fig. 72 which causes the lever 317 to be rocked counter-clockwise (Fig. 10) with the pin 322 as the pivot point, as it will be remembered the slot 953 in the bell crank 948 is hooked over said pin during a total taking operation which disconnected the link 324 so that the plate cams 329 (Figure 29) will have no effect whatever upon the lever 317. The counter-clockwise movement of the lever 317 just described causes the link 315 to be moved rearward so that its roller 314 will engage the upper horizontal portion 313 in the stationary plate 312 thereby raising the rod 308 to rock the selected totalizer into engagement with the actuating racks. Clockwise movement of the shaft 186, by the cam race 926, from the position shown in Fig. 71 to the position shown in Fig. 72, does not rock the arm 184 because the lower portion of the slot 190 in said arm is concentric with the shaft 186, consequently the arm 184 and the roller 183 will not be moved by the action of the roller 187 as it rocks the arm 189 counter-clockwise. As the cam race 926 (Figures 3 and 72) rocks the shaft 186 counter-clockwise back to the position shown in Fig. 71 it also causes the arms 189 and 319 to be rocked in a clockwise direction whereby the lever 317 is moved about its pivot point 322 so that the link 315 will be drawn forward and its roller 314 will again engage the lower portion of the slot 313 which effects the disengaging of the selected totalizer from the actuating racks. As the total lever 75 is moved back to its normal adding position the bell crank 948 is rocked clockwise so that its slot 953 will be disengaged from the pin 322 and the link 324 will again engage said pin. This movement of said lever also rocks shaft 186 to normal position (Fig. 10).

During a sub-total or "Read" operation when the lever 75 is moved upward or in a clockwise direction, as viewed in Figure 10, the slot 950 being radial with the center of the shaft 159 causes no movement whatever of the bell crank 948. Therefore, when the plate cams 329 (Figure 29) are rotated in a clockwise direction the bell crank 326 is rocked in a clockwise direction whereby the link 324 is moved forward to rock the lever 317 about its pivot 318 in a counter-clockwise direction to move the link 315 so that its roller 314 will engage the upper forward portion of the slot 313 thereby rocking the selected totalizer into engagement with the actuating racks as previously described.

After the roller 314 has been moved to engage the selected totalizer, as just described, the cam race 926 (Figure 3), through the roller 922, link 918, lever 916, link 917, and arm 915 rocks the shaft 186 in a clockwise direction thereby rocking the arm 189 and its integral arm 319 in a counter-clockwise direction to the position shown in Fig. 72 whereby the lever 317 is rotated counter-clockwise about the pin 322 which causes the link 315 to be moved still further toward the rear of the machine whereby the roller 314 carried by said last mentioned link is moved to the rear horizontal portion of the slot 313 (Figure 10).

Just before the roller 314 reaches the rear portion of the slot 313, the plate cams 329 cause the bell crank 326 (Figure 29) to be rocked in a counter-clockwise direction whereby the link 324 is moved rearward and rocks the lever 317 about the pivot point 318 (Figure 10) which causes the link 315 to be moved forward. This last mentioned forward movement of the link 315 causes the roller 314 to again be positioned in the forward horizontal portion of the slot 313.

Due to the fact that the plate cams 329 are given two continuous rotations in total and sub-total operations and also due to the fact that in sub-total "Read" operations the link 324 is not disengaged from the totalizer engaging lever 317, the cam race 926 (Figures 3 and 72) is so timed that as the bell crank 326 is rocked in a clockwise direction the second time, said cam race 926 causes, as before stated, the arms 189 and 319 to be rocked in a clockwise direction. The forward movement of the link 324 and the simultaneous clockwise movement of the arm 319 neutralizes the movement of the link 315 so that it will remain stationary during these two movements whereby the roller 314 will be left in the forward horizontal portion of the slot 313 thus maintaining the selected totalizer in engagement with the actuating racks.

From the description of the above movements it will be seen that it is possible to hold the selected totalizer in engagement with the actuating racks until said racks have been returned to their normal positions whereby the amount taken from the totalizer is put back upon it after which during the latter part of the second rotation of the cam shaft 65 the bell crank 326 is again rocked in a counter-clockwise direction whereby the link 324 is moved rearwardly thus rocking the lever 317 about its pivot 318 which causes the link 315 to be moved forwardly to its normal home position thereby moving the roller 314 from the upper horizontal portion of the slot 313 to the lower portion, as viewed in Figure 10, whereby the totalizer is rocked out of engagement with the actuating racks.

The operation of the indicating mechanism during total and sub-total operations will now be described. It will be remembered from previous description that during adding operations the indicators are set commensurate with the differential positioning of the actuating racks which is determined by the depression of keys which cause the latch to be disconnected from the differential driver thereby stopping the differential segment. It will also be remembered that during the first rotation of the cam shaft in totalizing operations the zero stop pawls 87 (Figure 7) are held in their normal positions thereby causing the latches to be disconnected in the zero positions. This, of course, causes the indicators through the beam 403 to be set in zero positions. Therefore, when they are elevated during the first rotation of the cam shaft they will indicate zero. However, upon the second rotation of the cam shaft and after the zero stop pawls have been released and the differential members are positioned commensurate with the stopping of the totalizer and the beam is actuated to position the indicators so that when they are lifted by the mechanism previously described, they will indicate the amount which was upon the selected totalizer whether said totalizer is turned to zero or whether the amount is put back upon it.

The operation of the printing mechanism for total and sub-total operations will now be described. During the first rotation of the cam shaft 65 for these above mentioned operations, the printing mechanism is crippled by means of a link 1953 (Figures 10, 71 and 72) which is pivotally connected to the rear end of the lever 523 and lies in the plane of the pawl 532 (Fig. 1B). The extreme lower end of the link 1953 is provided with a cam slot 954 which fits over the shaft 749. From the above description it will be seen that when the shaft 186 is rocked clockwise by the total lever 75, the link 1953 will be moved downward and at the same time rocked slightly in a clockwise direction with the shaft 749 as a pivot. This movement is sufficient to position the portion 1954 beneath the tail of the printer cam shaft driving pawl 532 (Fig. 71) so that as the gear 531 is driven by the gear 530 on the cam shaft, the pawl 532 will be rocked in a clockwise direction to disengage it from the flange 533 of the driving sleeve 534 secured to the printer cam shaft 515. This movement just described takes about 5° of time and therefore the shaft 515 will be slightly rocked and to prevent any overthrow there is secured to said shaft an arm 956 which engages a pin 955 of the link 1953 immediately after the pawl 532 has been disengaged from the flange 533 whereby said shaft cannot be oscillated or rotated during the first rotation of the cam shaft 65. However, just before the second rotation of the cam shaft, the shaft 186 is rocked still further in a clockwise direction thereby causing the link 1953 to be moved downward still further and due to the shape of the cam slot 954 said link will be moved forward to the position shown in Fig. 72 and will not interfere with the driving pawl 532 on the gear 531 and therefore the gear 531 and consequently the sleeve 534 through the engagement of the pawl 532 with the flange 533 integral with said sleeve will be given one counter-clockwise rotation as viewed in Figures 10, 71 and 72.

The operation of the printing mechanism during the last rotation of the cam shaft 65 in total or sub-total operations is the same as for adding operations and therefore no description of it is necessary here. The autographic feature is not generally used for total or sub-total operations and therefore the lever 690 for controlling the autographic spacing or feeding of the detail strip is set to the position shown in Figs. 57 and 77 so that said strip will be printed as illustrated in Figure 66. It will be noticed by referring to Figure 66 that the ledger number is not printed upon the detail strip for total and sub-total operations. This is accomplished by moving the levers 582 to the position below the zero or non-print position. The type wheels 579 have no type below the '0.' There is, however, a letter printed just after the amount which indicates whether a total or sub-total operation was taken or in other words indicates whether the selected totalizer was turned to zero or whether the amount thereupon was simply read and put back on the totalizer again. These two operations are distinguished by letters "Z" and "X", "Z" representing that a total was taken and the totalizer turned to zero and the "X" representing that a sub-total was taken and the amount on the totalizer was simply read from the indicators and put back on the totalizer again. The mechanism for causing these prints upon the detail strip will now be described and comprises: A segment 957 secured to the side of the total lever segment 158 which meshes with a segment 958 (Figures 10 and 43) secured to the innermost sleeve 555, as viewed at the right hand end of Figure 43, the left hand end of said sleeve is provided with an arm 959 similar to the arm 854, as viewed in Figure 53. The arm 959 is provided with a segmentary portion (Fig. 79) which meshes with a toothed disk 966 similar to the disk 852 secured to the side of a disk 960 (Figures 45 and 47) which meshes with two type wheels 961 one of which is on each of the shafts 539 and 545. These type wheels are each provided with type "Z" and "X". On each wheel 961 there is one "X" for each "read" or sub-total position of the total lever 75 and one "Z" for each "reset" or total position of said lever (Figs. 45, 47 and 79). These type are so located that when the total lever 75 and total lever segment 158 are moved downward (Figure 10) for a total or reset operation the segment 958 and arm 959 are rotated a distance sufficient to position the type wheels 961 (Figures 47 and 45) so that a "Z" will be in position to print upon the detail strip and also upon a slip provided one is used in this operation. If the total lever 75 and segments 158 are moved upward the segments 957 and 958 are moved in the opposite direction from that described above so that they will position the type wheels 961 to set up an "X" to print upon the detail strip and slip provided a slip is being used.

OPERATION

To set up an item on the machine the amount keys 71 must be depressed first and then a key in the transaction bank, one key in the departmental bank and also one key in the clerk's bank. As it will be remembered, it requires a depression of a key in each of the last three mentioned banks to release the motor clutch. After the keys have been depressed, as above stated, and the total lever 75 is set in the add position (in which position said total lever must be otherwise the release banks cannot be operated) the cam shaft 65 is given one complete rotation through the gears 62, 63 and 64 which cooperate with the motor driving mechanism, that is provided when the machine is electrically driven. If the machine is to be operated by hand the crank handle is placed on the stud 2148 (Figure 3) and given two complete rotations in a clockwise direction whereby the gear 147 is given a half rotation in a counter-clockwise direction which causes the gear 149 and consequently the cam shaft 65 to receive one clockwise rotation.

During the rotation of the cam shaft 65 the shaft 159 and consequently the driving segments 221, which it will be remembered are secured to said shaft, are rocked first in a clockwise direction (Figures 7 and 9) and then in a counter-clockwise direction. The clockwise movement causes the differential members 228 to be rocked likewise until the portion 230 of the latch contacts the depressed key thereby causing said latch to be disconnected which disengages the differentially movable member 228 from the segment 221 whereby the actuating racks, which it will be remembered are in mesh with the teeth integral with the differentially movable members 228, are stopped and held in positive alignment until after the totalizers have been rocked into engagement with said actuating racks. During the counter-clockwise movement of the shaft 159 and driving segments 221, the differentially positioned members 228 are brought back to their normal home positions thus moving the actuating racks to their home positions whereby the amount commensurate with the keys depressed is accumulated upon the totalizers which have been selected, by the depression of the keys, after which said totalizers are rocked out of engagement with said actuating racks.

As the differentially movable members 228 are being set, the lower ends of the driving beams 403 for the actuators, which it will be remembered are pivotally connected to said differentially movable members, are also positioned after which the actuating racks are returned to normal positions, and the beams 403 are positively driven to position the arms 412 so that as the indicator brackets are lifted the amount shown in the indication will be commensurate with the keys which have been depressed.

As previously stated the mechanism for feeding and printing a check is normally under the control of the transaction keys 72. For a "No sale" or "Paid out" operation no check will be issued. For a "Received on account" operation a plain check will be issued and for a "Cash" or "Charge" operation a stub check will be issued.

For illustration let it be assumed that the "Cash" key has been depressed for the transaction so that the machine will issue a stub check. The printer cam shaft 515 (Figures 45 and 62) drives the shaft 704 through beveled gears 701 and 702. The amounts commensurate with the keys depressed are set upon the type lines through the L-shaped levers 553 (Figs. 9 and 54) which mesh with the teeth 552 of the members 409 that are positioned by the beams 403 to set up the indication, and the tubes 555 which have secured thereto the arms 556 which in turn mesh with the pinions 560 that drive the actuating disks meshing with the type wheels. After the type wheels have been positioned the upper type line is moved into engagement with the platen to print upon the check which has been fed by the mechanism illustrated in Figure 48, after which said check is ejected onto the table 794 (Figure 44).

The ledger number is set up by means of the levers 582 (Figure 54) which it will be remembered mesh with the pinions 581 that drive the actuating disks 580 which are in mesh with the set of ledger number type wheels.

If there is to be a slip printed upon such as illustrated in Figure 67 or one similar to this slip it is placed on the table 817. It will be remembered that the presence of a slip in the machine automatically controls whether or not the lower type line is to be actuated to print. It also controls a printing mechanism for indicating to the proprietor whether or not a slip is printed upon during the operation, this indication being the printing of a letter "S" upon the detail strip at the right hand end of the printing, as is illustrated in Figure 63.

If there is no slip in the machine the arm 841 (Figure 53) is oscillated a distance sufficient to disengage the arm 823 from the driving bell crank 818 (Figure 58) and therefore said bell crank will move idly and not cause any oscillation of the arms 546 and 547 to cause an impression of the lower type line against its platen. If the autographic feature is desired the lever 680, illustrated in Figure 44, is moved forward thereby causing the detail feeding mechanism to be advanced a greater distance than when the autographic feature is not to be used. The result of this may readily be seen by referring to Figures 65 and 66, Figure 65 representing a portion of the detail strip where the autograph has been used and Figure 66 representing a portion of the detail strip where no autograph representations were made thereupon.

Should the "No sale" or "Paid out" key be depressed, the cam 623 being in engagement with the roller 622 as shown in Fig. 62, causes the upper type line to receive only one movement instead of three as is the case where a stub check is printed.

When no check is desired the entire feeding mechanism for the check paper is crippled through the disengagement of the driving pawl 707 (Figure 2) from the flange 710 which, it will be remembered, is integral with the driving sleeve 711 secured to the shaft 704.

In total and sub-total operations the amount keys are locked out, that is they are locked against depression by means of the rod 188 which, it will be remembered, is rocked by the total lever 75 so that said rod is positioned in front of the flexible detent arm 82. During the first rotation of the cam shaft in totalizing operations this rod 188 holds the zero stop pawls 87 in their normal positions thereby causing the latches to be disconnected in zero positions to make it possible for the totalizers to be rocked into mesh with their actuating racks so that a total or sub-total may be taken therefrom.

In totalizing operations it will also be remembered that instead of being compelled to depress a key in all three of the normal adding release banks which are, the transaction, departmental and clerk's bank, the depression of only one key is made to release the machine through the shifting of the sleeve 118. In other words if the lever 75 is set so that it will be opposite the word "Clerk's" then any key in the clerk's bank 74 will release the machine, if the lever is moved opposite the word "Trans.", any key in the transaction bank 72 will release the machine, and if said lever is positioned opposite the word "Dept.", any key of the departmental bank 73 will release the machine. The shifting of the sleeve 118 as above mentioned is caused through the engagement of the teeth 164, which it will be remembered, are integral with the totalizing lever 75, with the gear 165 (Figure 10) which, it will also be remembered, is secured to the drum 166 (Figure 24) that is provided with the cam race 167 through which, and the roller 168, said sleeve 118 is shifted commensurate with the positioning of the total lever 75.

The shifting of the total lever 75 to any of the above mentioned positions, controls the zero stop pawls 103 associated with the transaction, departmental and clerk's banks, through the segments 174 and 176 and the disks 178, as is illustrated in Figure 31. It will be seen by referring to this figure that when the total lever 75 is positioned opposite the word "Clerk's" the right hand disk 178, as viewed in this figure, will be positioned so that a notch in its integral flange 179 lies directly beneath the tail 181 of the zero stop pawl associated with said disk. It will also be noticed that the center and left hand disks will be simultaneously positioned so that the flanges 179 integral therewith will be positioned directly beneath the projections 181 of the zero stop pawls 103 so that should anyone try to depress a key in any of these two banks to release the machine they would not be able to do so due to the fact that the tails 181 of the zero stop pawls are in contact with the above mentioned flanges and therefore said pawls cannot be oscillated which in turn prevents the flexible detent from being moved to effect the releasing mechanism which in adding operations is operated. However, any key in the clerk's bank can be depressed because there is a notch in the flange 179 positioned beneath the tail 181 of the zero stop pawl thereby allowing the flexible detent to be moved downwardly in order to rock said zero stop pawl so that the latch will not be disconnected in the zero position but will disconnect in a position commensurate with whichever key has been depressed.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of printing elements for printing upon record material any desired data, means adapted to be moved to press the printing elements against the record material, a plurality of cams for giving said means one or more movements as desired, a plurality of keys, and means controlled thereby for establishing a cooperative relation between said means and any desired one of said cams.

2. In a machine of the class described, the combination of printing elements for printing upon record material any desired data, supporting means for the printing elements, a plurality of cams for giving said supporting means one or more impressing movements according to the number of impressions desired, a plurality of keys, and means controlled thereby for bringing the desired one of said cams into cooperative relation with said supporting means.

3. In a machine of the class described, the combination of printing elements for printing upon record material any desired data, means adapted to be moved to impress the printing elements against the record material, a plurality of cams for giving said means one or more impressing movements according to the number of impressions desired, a plurality of keys, means controlled thereby for establishing a cooperative relation between said means and any desired one of said cams, and an additional adjustable element for controlling said cams regardless of the key operated.

4. In a machine of the class described, the combination of printing elements for printing upon record material any desired data, means for causing an impression on the record material from the printing elements, said means including a plurality of adjustably mounted cams for giving one or more impressing movements to the printing elements according to the number of impressions desired, a plurality of keys, means controlled thereby for moving said cams to select any desired one of the same, and an additional adjustable element for controlling said cams regardless of the key operated.

5. In a machine of the class described, the combination of printing elements for printing upon record material any desired data, means adapted to be moved to impress the printing elements against the record material to effect an impression thereon, a plurality of cams for giving said means one or more impressing movements according to the number of impressions desired, a plurality of keys, means controlled thereby for bringing the desired one of said cams into cooperative relation with said means, and an additional adjustable element for controlling said cams regardless of the key operated.

6. In a machine of the class described, the combination of a plurality of printing elements, impression means for taking an impression of the same, means normally effective for moving all of said printing elements relative to said impression means when certain records are desired, and means for preventing the movement of certain of said printing elements when the record of a different class is desired.

7. In a machine of the class described, the combination of printing mechanism comprising a plurality of printing elements arranged in groups, an impression means, independent supporting means for each of said groups, means for moving said supporting means to effect a relative movement between all of said printing elements and said impression means, manipulative means and connections controlled thereby for preventing the movement of the supporting means of certain of said groups.

8. In a machine of the class described, the combination of manipulative devices, actuators controlled thereby, printing mechanism including printing elements controlled adjustably by said actuators, feeding mechanism also included in said printing mechanism for feeding record material relative to said printing elements whereby an impression may be taken from said printing elements on said record material, a main actuator, operating connections intermediate the main actuator and said printing mechanism for driving the latter upon an operation of the former, clutch mechanism intermediate the main actuator and said operating connections, said clutch consisting of a two-flanged member and a driving pawl normally engaging one of said flanges, an arm normally engaging said pawl and a notch in one of the flanges, and means controlled by certain of said manipulative devices for disengaging said arm from the pawl and notch whereby the feeding mechanism may be operated.

9. In a machine of the class described, the combination of printing elements, means for taking a plurality of impressions from the same upon record material, means for feeding said record material between impressions and a manipulative device for controlling the direction of said feed.

10. In a machine of the class described, the combination of printing elements for printing upon record material any desired data, means having a fixed lateral position, said means being adapted to be operated to impress the printing elements against the record material, a plurality of cams for giving said means one or more impressing movements according to the number of impressions desired, a plurality of keys, and means controlled thereby for moving said cams laterally to bring any desired one into cooperative relation with said means.

11. In a machine of the class described, the combination of printing elements for printing upon record material any desired data, means adapted to be moved to impress the printing elements against the record material, said means having a fixed lateral position, a plurality of cams for giving said means one or more impressing movements according to the number of impressions desired, a plurality of keys, means controlled thereby for moving said cams laterally to bring any desired one into cooperative relation with said means, and an additional adjustable element connected to the key controlled means to also control the lateral position of said cams when desired.

12. In a machine of the class described, the combination of printing elements for printing upon record material any desired data, means adapted to be moved to impress the printing elements against the record material to make an impression on the record material from the printing elements, a plurality of cams for giving said impression means one or more impressing movements according to the number of impressions desired, means including a spiral shifting device operatively connected to said cams for bringing any desired one of the same into operative relation with first mentioned means, a plurality of keys, and means operated by the keys to move the spiral shifting device.

13. In a machine of the class described, the combination of printing elements for printing upon record material any desired data, means adapted to carry the printing elements into contact with the record material to make an impression on the record material from the printing elements, a plurality of cams for giving said carrying means one or more movements according to the number of impressions desired, a member operatively connected to said cams for bringing any desired one of the same into operative relation with said carrying means, a plurality of keys, means controlled thereby for controlling the movements of said member, and an additional adjustable element operable to supplement the control of said member as determined by certain of said keys, thus bringing another cam into cooperative relation with said carrying means.

14. In a machine of the class described, the combination of printing elements for printing upon record material any desired data, means adapted to be moved to impress the printing elements against the record material to make an impression on the record material from the printing elements, a plurality of cams for giving said means one or more impressing movements according to the number of impressions desired, a shaft, a sleeve having a pin and slot connection with the shaft, a spiral cam secured to said sleeve for establishing cooperative relation between said means and any desired one of said cams, a series of keys, means connected to said sleeve and operable by said keys to move the sleeve to control said spiral cam, and an additional adjustable element attached to said shaft to turn the same and the sleeve to control said spiral cam.

15. In a machine of the class described, the combination of printing elements for printing upon record material any desired data, means carrying the printing elements and adapted to be operated to move the printing elements against the record material to make an impression on the record material from the printng elements, a plurality of cams for giving said carrying means one or more impressing movements according to the number of impressions desired, a shaft, a sleeve surrounding the shaft, the sleeve having a slot cooperating with a projection on said shaft whereby the latter may turn the sleeve, a spiral cam secured to said sleeve for establishing cooperative relation between said carrying means and any desired one of said cams, an adjustable member attached to the shaft to operate the same to control the spiral cam, a series of keys, and means operated by certain of said keys to operate said sleeve to supplement the control of said spiral cam by the adjustable member.

16. In a machine of the class described, the combination of type carriers, means for differentially positioning the type carriers, record strip supporting means comprising a supply roll, guide frame and a receiving roll, impression means for taking an impression from said type carriers on the record strip said strip being fed from the supply roll over said guide frame between said impression means and type carriers past a writing point again over said guide frame to the receiving roll, means for moving said frame to give the record strip a movement so that the portion thereof at the writing point is moved so as to have an impression made adjacent thereto and for restoring said frame to normal to give said strip a movement to bring the newly made impression to a position adjacent the writing point, and connections intermediate the receiving roll and said frame for giving said record strip additional movement.

17. In a machine of the class described, the combination of type carriers, means for differentially positioning the type carriers, autographic record strip supporting means comprising a supply roll, guiding means and a receiving roll, impression means for taking an impression from said type carriers on the record strip, means for moving said guiding means to give the record strip a movement so that the portion thereof at the writing point is moved so as to have an impression made adjacent thereto and for restoring said guiding means to normal to give said strip a movement to bring the newly made impression to a position adjacent the writing point, and connections intermediate the receiving roll and the guiding means and actuated by said guiding means for giving said strip an additional movement.

18. In a machine of the class described, the combination of type carriers, means for differentially positioning the type carriers, autographic record strip supporting means comprising a supply roll, guiding means and a receiving roll, impression means for taking an impression from said type carriers on the record strip, means for moving said guiding means to give the record strip a movement so that the portion thereof at the writing point is moved so as to have an impression made adjacent thereto and for restoring said guiding means to normal to give said strip a movement to bring the newly made impression to a position adjacent the writing point, and connections intermediate the receiving roll and the guiding means and actuated by the restoring movement of said guiding means for giving said strip an additional movement.

19. In a machine of the class described, the combination of type carriers, means for differentially positioning the type carriers, record strip supporting means comprising a supply roll, guide rollers and a receiving roll, impression means for taking an impression from said type carriers on the record strip, said strip being fed from the supply roll over one of said guide rollers between said impression means and type carriers past a writing point over the other guide roller to the receiving roll, a pivoted frame supporting said guide rollers, means for moving said frame to give the record strip a movement so that the portion thereof at the writing point is moved so as to have an impression made adjacent thereto and for restoring said frame to normal to give said strip a movement to bring the newly made impression to a position adjacent the writing point, and means controlled by said pivoted frame for giving the record strip additional movement to present a new portion thereof at the writing point.

20. In a machine of the class described, the combination of a plurality of sets of totalizers, actuating mechanism therefor, printing elements, means intermediate the printing elements and the totalizer actuating mechanism for setting said elements to positions commensurate with the amounts entered in said totalizers, means carrying the printing elements and adapted to be moved to take an impression on record material from said printing elements, a plurality of cams for giving said carrying means one or more impressing movements according to the number of impressions desired, a plurality of sets of depressible keys, means controlled by said keys for selecting totalizers for actuation, and means actuated directly by said keys for establishing a cooperative relation between said carrying means and any desired one of said cams depending upon the totalizers selected.

21. In a machine of the class described, the combination of a plurality of totalizers, actuating mechanism therefor, printing elements, means intermediate the printing elements and the totalizer actuator mechanism for setting said elements to positions commensurate with the amounts entered in said totalizers, means adapted to be moved to impress the printing elements against record material to make an impression on the record material from said printing elements, a plurality of cams for giving said last mentioned means one or more impressing movements according to the number of impressions desired, and a plurality of sets of depressible keys adapted to control the selection of totalizers for actuation and the number of impressing movements given to said last-mentioned means.

22. In a machine of the class described, the combination of a plurality of totalizers, differential actuating mechanism therefor, printing elements, totalizer adjusting mechanism, supporting means for the printing elements, a plurality of cams for giving said supporting means one or more movements to move said printing elements into the printing position, a plurality of control keys adapted to control the totalizer adjusting mechanism and said plurality of cams, means controlled by said keys for bringing the desired one of said cams into cooperative relation with said supporting means depending upon the selection of the totalizer, and manipulative means for controlling said cams.

23. In a machine of the class described, the combination of a plurality of totalizers, differential actuating mechanism therefor, printing elements, totalizer adjusting mechanism, impression means, means carrying the printing elements and adapted to impress the printing elements against the record material, a plurality of cams for giving said carrying means one or more impressing movements, a plurality of control keys adapted to control the totalizer adjusting mechanism and said plurality of cams, means controlled by said keys for bringing the desired one of said cams into cooperative relation with said carrying means depending upon the selection of the totalizer, and an additional adjustable element for controlling said cams when operated in conjunction with said keys.

In testimony whereof I affix my signature.

FREDERICK LINCOLN FULLER.